United States Patent [19]

Yamada et al.

[11] Patent Number: 5,244,595
[45] Date of Patent: Sep. 14, 1993

[54] MESOMORPHIC COMPOUND AND LIQUID CRYSTAL COMPOSITION CONTAINING SAME FOR USE IN LIQUID CRYSTAL DEVICE AND DISPLAY APPARATUS

[75] Inventors: Yoko Yamada, Atsugi; Takao Takiguchi; Takashi Iwaki, both of Tokyo; Takeshi Togano, Yokohama; Shinichi Nakamura, Atsugi, all of Japan

[73] Assignee: Canon Kabushiki Kaisha, Tokyo, Japan

[21] Appl. No.: 729,740

[22] Filed: Jul. 15, 1991

[30] Foreign Application Priority Data

Jul. 16, 1990 [JP] Japan .................. 2-188490

[51] Int. Cl.$^5$ ............... C09K 19/34; C09K 19/52; C07D 333/02; G02F 1/13
[52] U.S. Cl. .................. 252/299.61; 252/399.63; 252/299.01; 544/246; 544/298; 544/335; 546/1; 549/1; 549/29; 359/103
[58] Field of Search ............ 252/299.11, 299.01, 252/299.66, 299.67; 549/1, 29, 59; 544/242, 245, 298, 333, 335; 546/1, 208, 209; 359/103, 104

[56] References Cited

U.S. PATENT DOCUMENTS

| | | | |
|---|---|---|---|
| 4,367,924 | 1/1983 | Clark et al. | 359/56 |
| 5,034,151 | 7/1991 | Shinjo et al. | 252/299.61 |
| 5,116,530 | 5/1992 | Togano et al. | 252/299.61 |
| 5,118,441 | 6/1992 | Mori et al. | 252/299.61 |
| 5,176,845 | 1/1993 | Yamada et al. | 252/299.61 |

FOREIGN PATENT DOCUMENTS

| | | |
|---|---|---|
| 364923 | 4/1990 | European Pat. Off. |
| 56-107216 | 8/1981 | Japan |
| 2255635 | 10/1990 | Japan |

OTHER PUBLICATIONS

Butcher, J. L., Banning, J. D., et al. *Unusual Smectic Polymorphism of 3-Fluoro-4 octyloxyphenyl 4-(5-octyl-2-thienyl) benzoate*, Mol. Crys. and Liq. Crys. Letters, Series 2, vol. 7, No. 3 pp. 75-77 Jul. 1990 (London).
Schadt et al. "Applied Physics Letters", vol. 18, No. 4, pp. 127-128 (1971).

*Primary Examiner*—Robert L. Stoll
*Assistant Examiner*—Shean C. Wu
*Attorney, Agent, or Firm*—Fitzpatrick, Cella, Harper & Scinto

[57] ABSTRACT

1. A mesomorphic compound represented by the following formula 8 I]:

$$R_1-A^1 \underset{S}{\boxed{\phantom{XX}}} \underset{\phantom{X}}{\overset{X^1 \quad X^2}{\boxed{\phantom{XXX}}}} (Y-A^2)_{\overline{n}} R^2 \qquad (I)$$

wherein $R_1$ and $R_2$ respectively denote a straight chain or branch chain alkyl group having 1-18 carbon atoms, wherein $-CH_2-$ in the alkyl group may be substituted by $$-\underset{\underset{O}{\|}}{C}-, \quad -O-, \quad -\underset{\underset{F}{|}}{CH}-, \quad -\underset{\underset{CF_3}{|}}{CH}-, \quad -\underset{\underset{Cl}{|}}{CH}-,$$

$$-\underset{\underset{CN}{|}}{CH}- \quad \text{or} \quad -\underset{\underset{CN}{|}}{\overset{CH_3}{\underset{|}{C}}}-$$

on condition that hetero atoms are not adjacent each other, $R^2$ may be hydrogen atom, halogen atom, cyano group and trifluoromethyl group; n is 0 or 1, with the proviso that $A^1$ denotes a single bond, (Abstract continued on next page.)

24 Claims, 4 Drawing Sheets

-continued
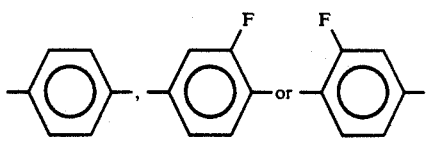
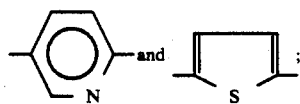
when n is 0, $A^1$ denotes a single bond when n is 1; $A^2$ denotes any one of
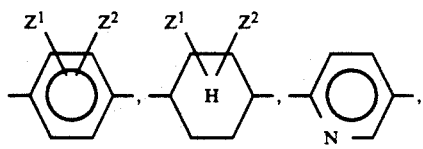
and $X^1$, $X^2$, $Z^1$ and $Z^2$ denote independently any one of hydrogen atom, halogen atom, cyano group and trifluoromethyl group, with proviso that $X^1$, $X^2$, $Z^1$ and $Z^2$ may not be all hydrogen atoms; Y denotes any one of
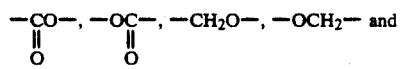
a single bond.

MESOMORPHIC COMPOUND AND LIQUID CRYSTAL COMPOSITION CONTAINING SAME FOR USE IN LIQUID CRYSTAL DEVICE AND DISPLAY APPARATUS

BACKGROUND OF THE INVENTION

1. Field of the Invention

The present invention relates to a novel mesomorphic compound, a liquid crystal composition containing the compound. The present invention also relates to a liquid crystal device using the composition and a display apparatus. In particular, the present invention relates to a liquid crystal which provides a liquid crystal composition with improved responsiveness to an electric field, as well as to a liquid crystal device for use in a liquid crystal display apparatus, a liquid crystal-optical shutter, etc.

2. Related Background Art

Hitherto, liquid crystal materials have been used in various fields as an electro-optical device. Most liquid crystal devices which have been put into practical use have employed twisted nematic (TN) type liquid crystals, as shown in "Voltage-Dependent Optical Activity of a Twisted Nematic Liquid Crystal" by M. Schadt and W. Helfrich "Applied Physics Letters" Vol. 18, No. 4 (Feb. 15, 1971) pp. 127–128.

These TN devices are based on the dielectric alignment effect of a liquid crystal in which the average molecular axis direction of the liquid crystal molecule is directed to a specific direction in response to an applied electric field because of its dielectric anisotropy. However, the accepted lower limit of response speed of such TN materials is on the order of milli-seconds, which is too slow for many uses. Additionally, while a simple matrix system of driving is considered to be the most promising for use as a large-area flat display considering such cost, productivity, etc. The matrix system uses an electrode arrangement for multiplex driving wherein an address signal is sequentially, periodically and selectively applied to scanning electrodes in synchronism with prescribed data signals which are selectively applied in parallel to signal electrodes the address signal.

However, when the TN liquid crystal is used with a matrix driving system, an electric field is applied to certain regions called "half-selected points", i.e., those regions where a scanning electrode is selected and signal electrodes are not selected, or regions where a scanning electrode is not selected and a signal electrode is selected. TN display devices operate normally when the difference between a voltage applied to the selected points versus a voltage applied to the half-selected points is sufficiently large, and the threshold voltage level required for aligning liquid crystal molecules perpendicularly to an electric field is between the values of the voltages of the selected and half selected pants. However, as the number (N) of scanning lines increases, a time (duty ratio) during which an effective electric field is applied to one selected point decreases with a ratio of 1/N when an image area (corresponding to one frame) is scanned. Accordingly, as the number of scanning lines increases, the voltage difference of an effective value applied to selected and non-selected points when scanning is effected repeatedly decreases. As a result, drawbacks such as lowered image contrast or occurrence of interference (or crosstalk) occur. These phenomena are regarded as essentially unavoidable when driving liquid crystals which are not bistabile, i.e. liquid crystal molecules which are horizontally or vertically oriented with respect to the electrode surface only when an electric field is effectively applied using a time storage effect. To overcome these drawbacks, the voltage averaging and multiple matrix methods, etc. have been proposed. However, since no method is sufficient to overcome the duty ratio problem, development of display devices with large image areas or high packaging densities is delayed because it is difficult to sufficiently increase the number of scanning lines.

To overcome drawbacks with such prior art liquid crystal devices, display devices using liquid crystal materials having bistability has been proposed by Clark and Lagerwall (e.g. Japanese Laid-Open Patent Appln. No. 56-107216, U.S. Pat. No. 4,367,924, etc.). In this instance, as the liquid crystals having bistability, ferroelectric liquid crystals (FLC) having chiral smectic C (SmC*) or smectic H (SmH*) phase are generally used. These liquid crystals are bistable, e.g., exhibit first and second stable states with respect to an electric filed applied thereto. Accordingly, as different from optical modulation devices in which TN liquid crystals are used, the bistable FLC molecules are oriented to first and second optically stable states with respect to one and the other electric field vectors and retain the resultant state even in the absence of an electric field.

In addition to the above-described characteristic of bistability, FLC also exhibit an excellent high-speed responsiveness because the spontaneous polarization of the FLC and an applied electric field directly interact with each other to induce transition of orientation states. The resultant response speed is faster than the response speed due to the interaction between dielectric anisotropy and an electric field of TN materials by 3 to 4 magnitudes.

Thus, a ferroelectric liquid crystal potentially has excellent characteristics which make possible essential improvements to many of the problems with conventional TN devices. Particularly, the application to a high-speed optical shutter and a display of high density and a large picture is expected. For this reason, there has been made extensive research with respect to liquid crystal materials showing ferroelectricity. However, ferroelectric liquid crystal materials developed heretofore may not sufficiently satisfy necessary characteristics required for a liquid crystal device including low-temperature operation characteristic, high-speed responsiveness, etc. For instance, among response time ($\tau$), magnitude of spontaneous polarization (Ps) and viscosity $\eta$, the following relationship exists: $\tau = \eta/(Ps \cdot E)$, where E is an applied voltage. Accordingly, a high response speed can be obtained by (a) increasing the spontaneous polarization (b) lowering the viscosity or (c) increasing the applied voltage. However, the driving voltage has a maximum acceptable upper limit since it is driven with an IC, etc., and actually should desirably be as low as possible. Accordingly, it is necessary either to lower the viscosity or increase the spontaneous polarization.

Generally, a ferroelectric chiral smectic liquid crystal having a large spontaneous polarization provides a large internal electric field in a cell and is liable to pose many constraints on the device construction of the device. Further, an excessively large spontaneous polarization is liable to accompany an increase in viscosity, so that a noticeable increase in response speed may not necessarily be attained as a result.

Further, since the actual operation temperature of a display device is generally from about 5°-40° C., over which the response speed changes by a factor of about 20, the change in response speed actually exceeds the range controllable by driving voltage and frequency.

As described hereinabove, commercialization of a FLC device requires a liquid crystal composition assuming a chiral smectic phase which has not only a large spontaneous polarization but also a low viscosity, a high-speed responsiveness and a minimal temperature-dependence of response speed.

SUMMARY OF THE INVENTION

An object of the present invention is to provide a mesomorphic compound and a liquid crystal composition, particularly a chiral smectic liquid crystal composition, containing the mesomorphic compound for providing a ferroelectric liquid crystal device and apparatus having a high response speed with a smaller temperature-dependence of the response speed.

According to the present invention, there is provided a mesomorphic compound represented by the following formula (I):

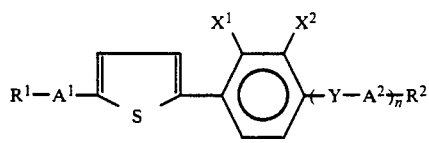

wherein $R^1$ and $R^2$ independently denote a straight chain or branch chain alkyl group having 1-18 carbon atoms, wherein $-CH_2-$ in the alkyl group may be substituted by

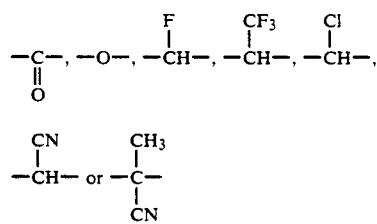

on the condition that hetero atoms are not adjacent each other, $R^2$ may be hydrogen atom, halogen atom, cyano group and trifluoromethyl group; n is 0 or 1, with the provisos that (1) $A^1$ denotes a single bond,

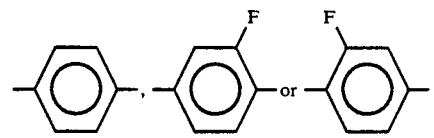

when n is 0, and (2) $A^1$ denotes a single bond when n is 1; $A^2$ denotes any one of

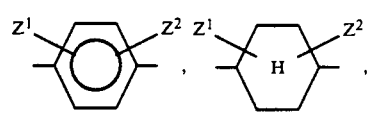

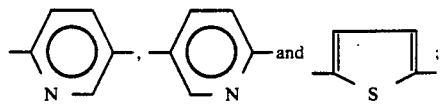

$X^1$, $X^2$, $Z^1$ and $Z^2$ denotes independently any one of hydrogen atom, cyano group and trifluoromethyl group (with the proviso that $X^1$, $X^2$, $Z^1$ and $Z^2$ may not all be hydrogen atoms); Y denotes any one of

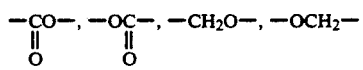

and a single bond.

The present invention further provides a liquid crystal composition comprising at least one of the mesomorphic compound represented by the above general formula (I) and preferably another mesomorphic compound.

Further according to the present invention, there is provided a liquid crystal device comprising a pair of electrode substrates having the liquid crystal composition described above disposed between the electrode substrates and a display apparatus comprising the liquid crystal device.

These and other objects, features and advantages of the present invention will become more apparent upon consideration of the following description of the preferred embodiments of the present invention taken in conjunction with the accompanying drawings.

DETAILED DESCRIPTION OF THE PREFERRED EMBODIMENTS

Figure 1:
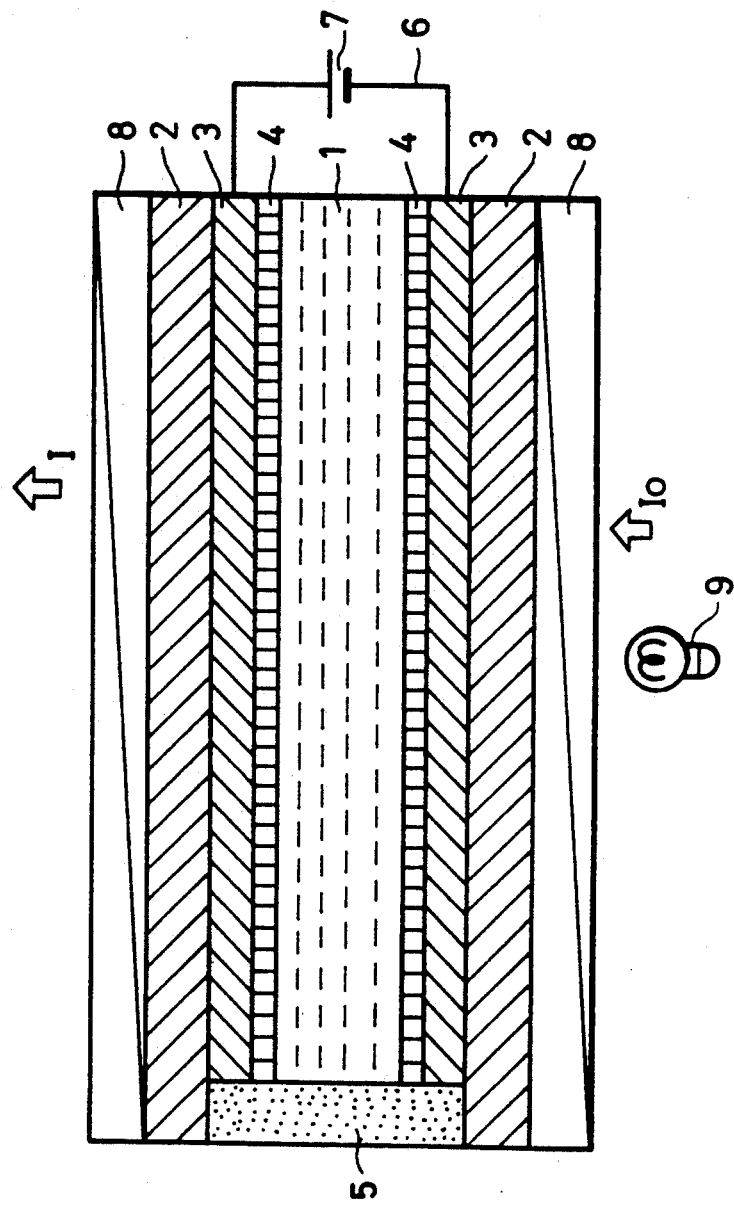
FIG. 1 is a sectional view of a liquid crystal display device using a liquid crystal composition of the present invention.

We have found that the liquid crystal composition of the present invention provides a liquid crystal device with improved properties such as high speed responsiveness and decreased temperature-dependence of response speed to provide a display apparatus having a good display characteristic.

The present invention is described in detail as follows.

In the mesomorphic compound represented by the general formula (I), $R^1$ and $R^2$ independently denote a straight or branched chain alkyl group having 1-18 and preferably 2-16 carbon atoms.

At least one of $-CH_2-$ in the alkyl group may be substituted by

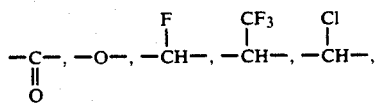

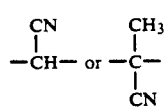

on the condition that hetero atoms are not adjacent each other.

Preferred examples of $R^1$ and $R^2$ may include the following groups (i) to (v).

 (i)

wherein Y denotes any one of a single bond,

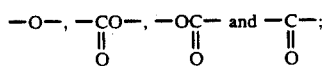

n is an integer of 0-17, preferably 4-16;

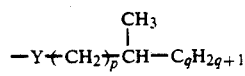 (ii)

wherein Y denotes any one of a single bond,

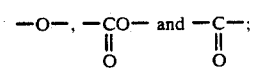

p is an integer of 0-7; q is an integer of 1-10 (optically active or inactive);

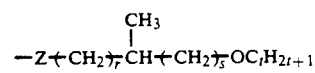 (iii)

wherein Z denotes any one of

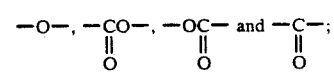

r is an integer of 0-7; s is an integer of 0 or 1; t is an integer of 1-14 (optically active or inactive);

 (iv)

wherein W denotes any one of

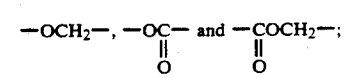

m is an integer of 0-14; and

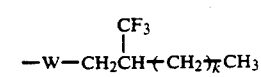 (v)

wherein w denotes any one of

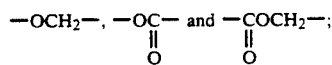

k is an integer of 0-12.

Preferred examples of $R^2$ may include hydrogen atom, halogen atom, cyano group and trifluoromethyl group, more preferably hydrogen atom, fluorine atom, cyano group and trifluoromethyl group, n is 0 or 1, with the provisos that (1) $A^1$ denotes a single bond,

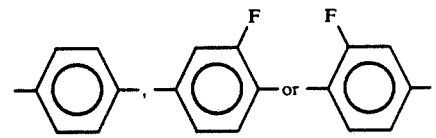

when n is 0 and (2) $A^1$ denotes a single bond when n is 1. Thus, the mesomorphic compound represented by the general formula (I) has a structure with 2 or 3 cyclic groups.

$A^2$ denotes;

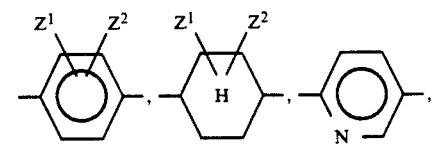

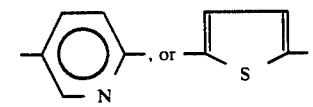

$X^1$, $X^2$, $Z^1$ and $Z^2$ independently denotes hydrogen atom, halogen atom, cyano group and trifluoromethyl group, preferably hydrogen atom, fluorine atom, cyano group and trifluoromethyl group, more preferably hydrogen atom or fluorine atom (with the proviso that $X^1$, $X^2$, $Z^1$ and $Z^2$ cannot all be hydrogen atoms);

Y denotes

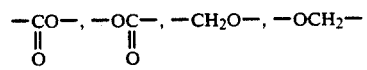

or a single bond.

Further preferred examples of the compound represented by the general formula (I) may include those denoted by the following formulas (Ia) to (Id).

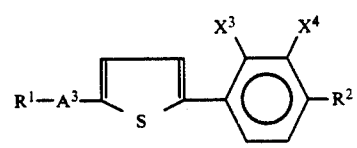 (Ia)

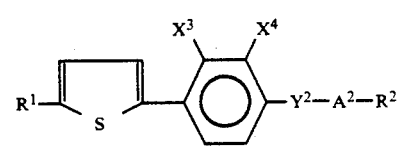 (Ib)

-continued

(Ic)

(Id)

wherein $R^1$, $R^2$ and $A^2$ are the same as defined above; $A^3$ denotes

$A^4$ denotes

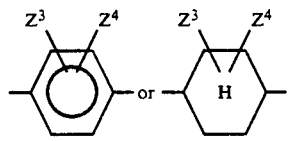

$X^3$ and $X^4$ denote fluorine atom, cyano group, trifluoromethyl group or hydrogen atom, preferably fluorine atom (with the proviso that both $X^3$ and $X^4$ are not hydrogen atoms);

$Y^2$ denotes $$-\text{OC}-,\ -\text{OCH}_2- \\ \parallel \\ \text{O}$$

or a single bond, preferably $$-\text{OC}- \\ \parallel \\ \text{O}$$

or a single bond; $Z^3$ and $Z^4$ denote fluorine atom, cyano group, trifluoromethyl group or hydrogen atom, preferably fluorine atom, trifluoromethyl group or hydrogen atom, with the proviso that both $Z^3$ and $Z^4$ are not hydrogen atoms.

The mesomorphic compound represented by the general formula (I) may be synthesized through the following reaction scheme.

(i) In the case where n is 0.

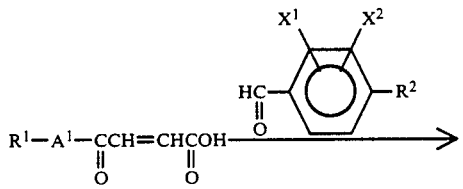

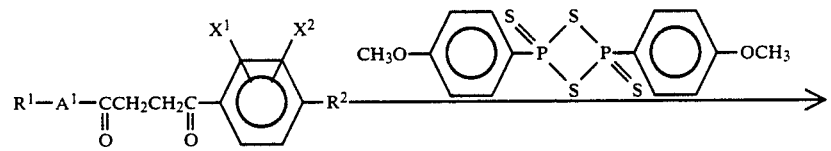

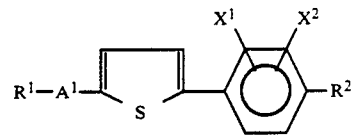

(ii) (a) In the case where n is 1 and Y is not a single bond:

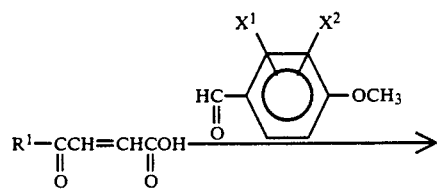

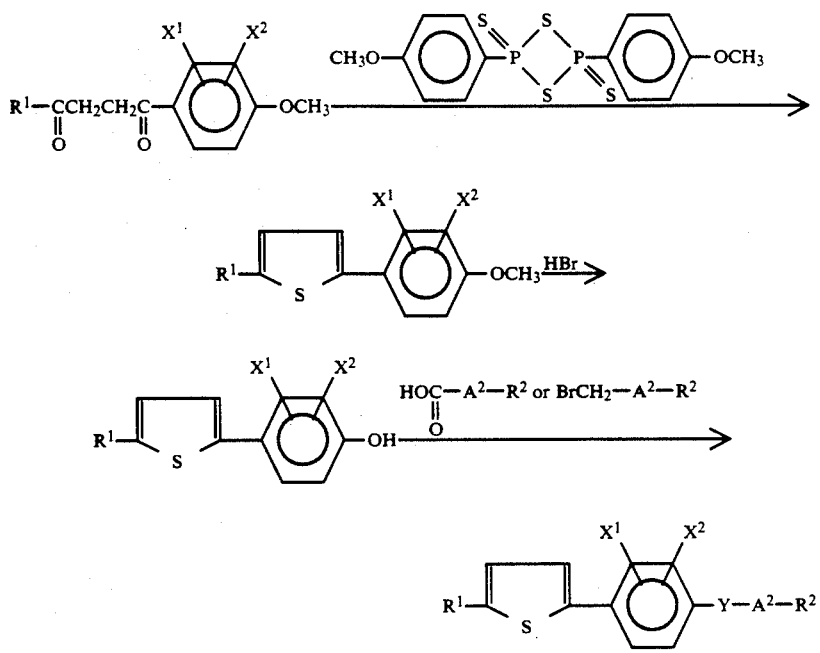

(ii) (b) In the case where n is 1 and Y is a single bond:

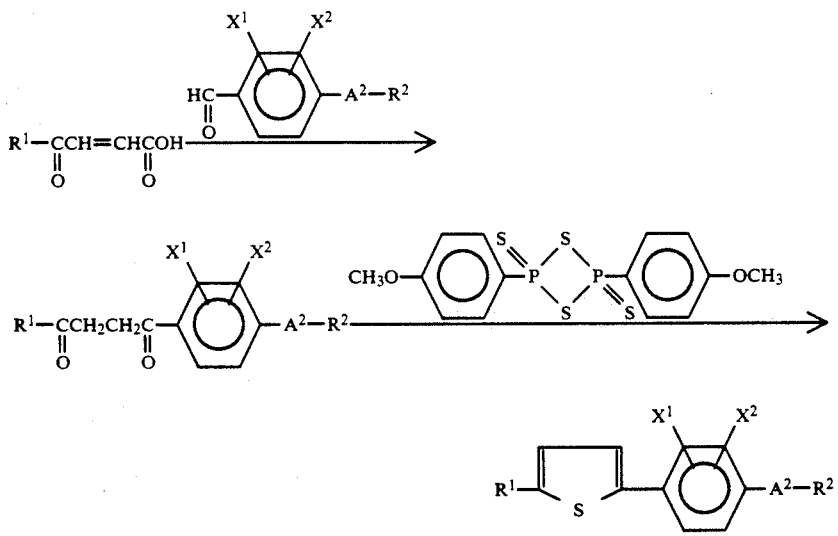

wherein $R^1$, $R^2$, $A^1$, $A^2$, $X^1$, $X^2$ and Y are the same as defined above; in a case where a group —$CH_2CH_2$— adjacent to a cyclic group in $R^1$ or $R^2$ is replaced with $$-\underset{\underset{O}{\|}}{C}O- \text{ or } -O\underset{\underset{O}{\|}}{C}-,$$

or a group —$CH_2$— adjacent to a cyclic group is replaced with —O—, it is possible to obtain an objective by attaching hydrogen group or carboxylic group connected to a cyclic group with a detachable protective group, followed by eliminating the protective group after ring closure is effected to form a thiophene ring.

Specific examples of the mesomorphic compounds represented by the general formula (I) may include those shown by the following structural formulae.

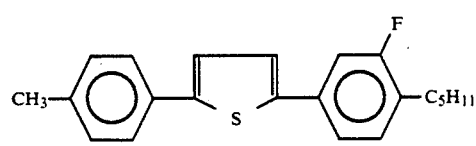

(I-1)

-continued
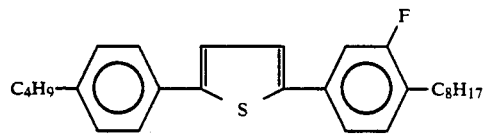 (I-2)
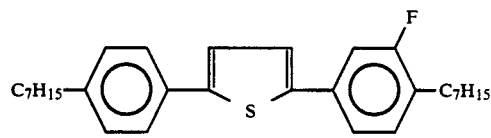 (I-3)
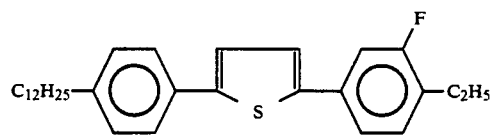 (I-4)
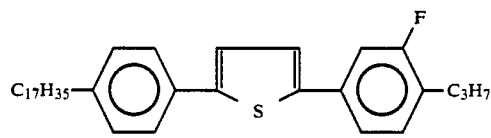 (I-5)
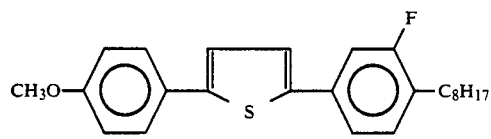 (I-6)
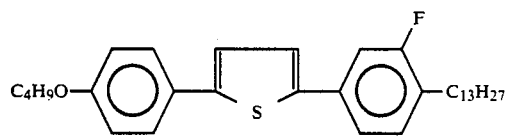 (I-7)
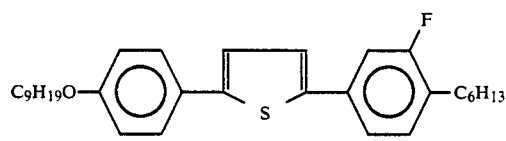 (I-8)
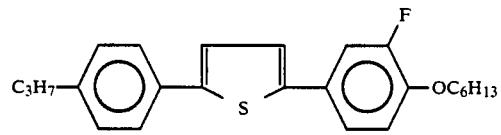 (I-9)
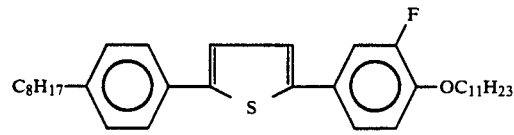 (I-10)
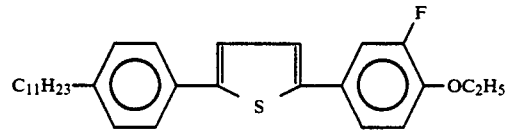 (I-11)
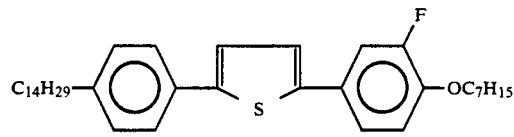 (I-12)

-continued
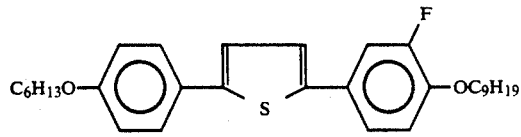 (I-13)
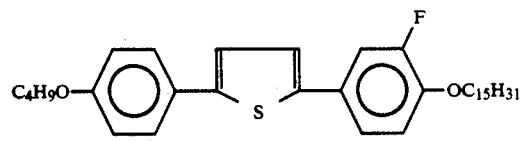 (I-14)
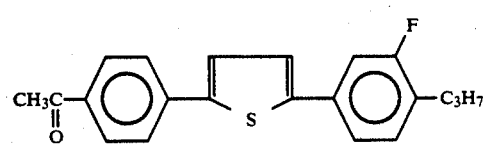 (I-15)
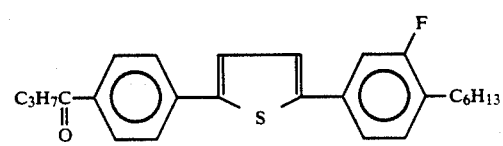 (I-16)
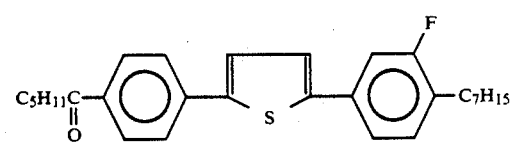 (I-17)
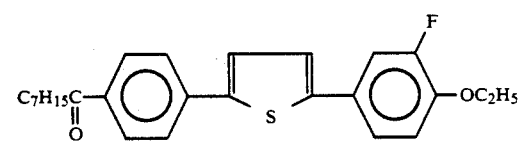 (I-18)
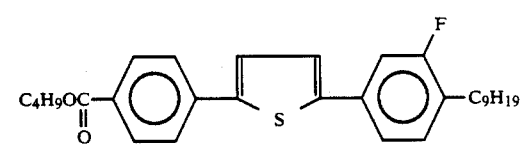 (I-19)
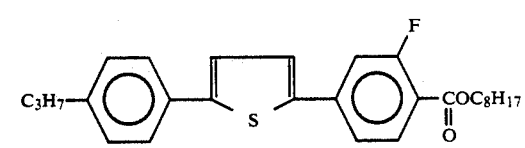 (I-20)
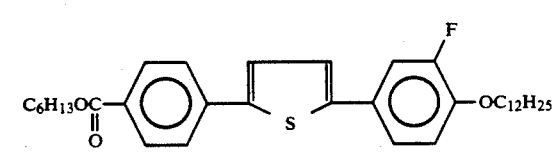 (I-21)
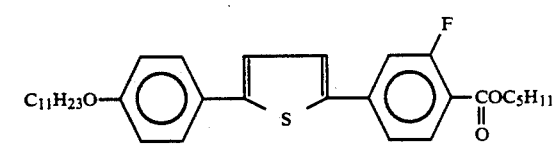 (I-22)
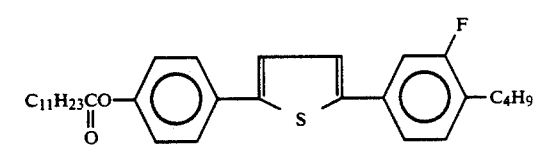 (I-23)

-continued
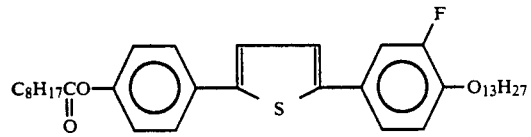 (I-24)
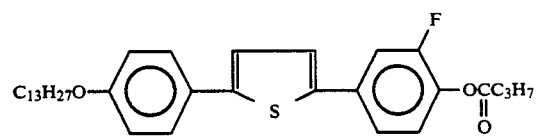 (I-25)
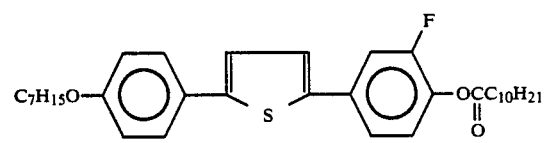 (I-26)
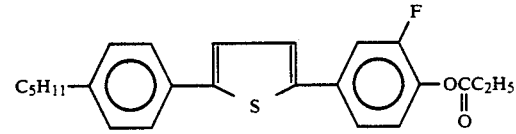 (I-27)
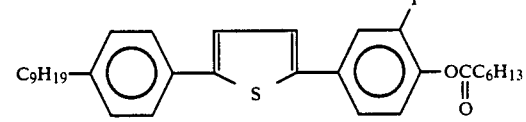 (I-28)
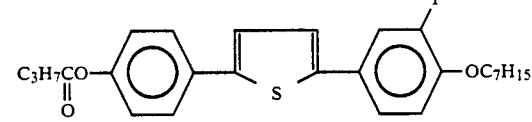 (I-29)
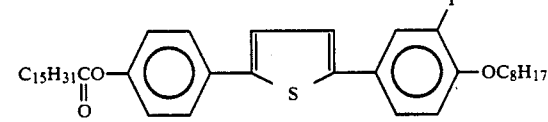 (I-30)
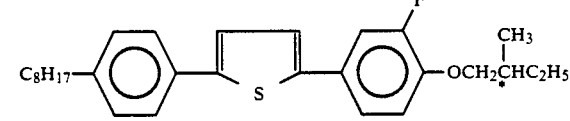 (I-31)
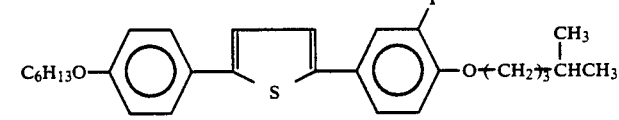 (I-32)
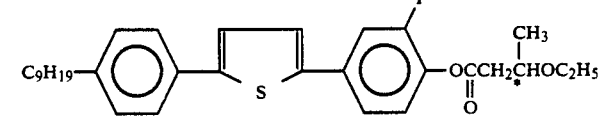 (I-33)
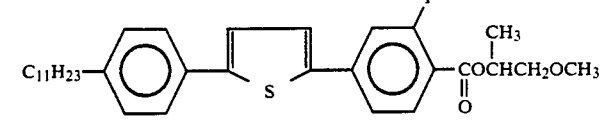 (I-34)

-continued
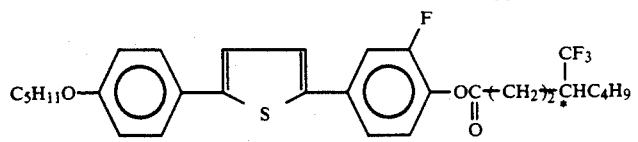 (I-35)
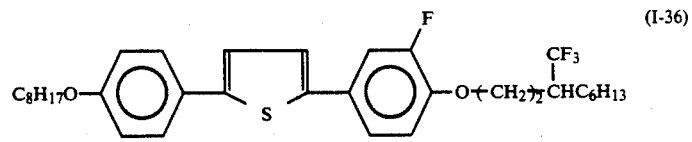 (I-36)
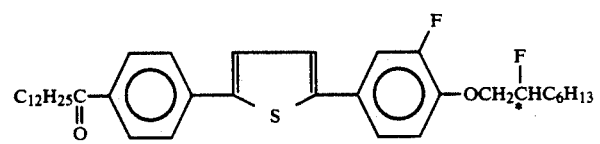 (I-37)
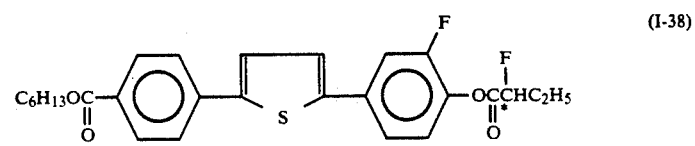 (I-38)
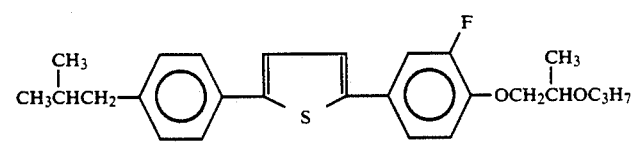 (I-39)
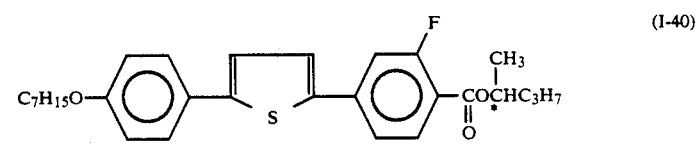 (I-40)
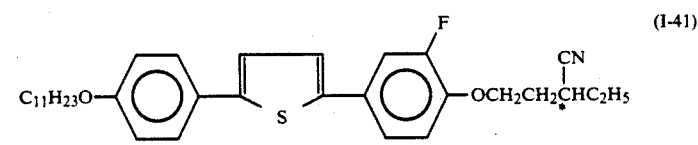 (I-41)
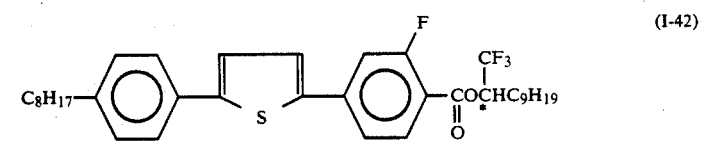 (I-42)
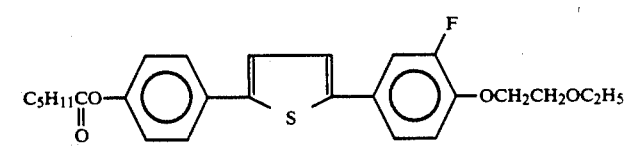 (I-43)
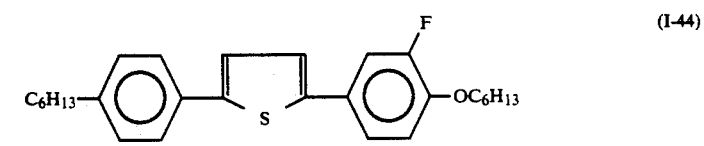 (I-44)
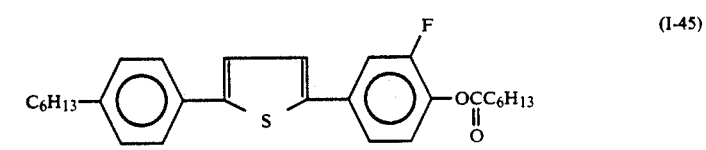 (I-45)

-continued
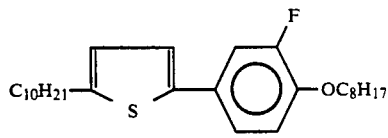 (I-46)
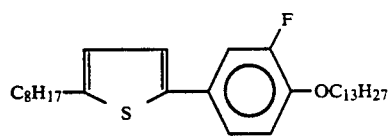 (I-47)
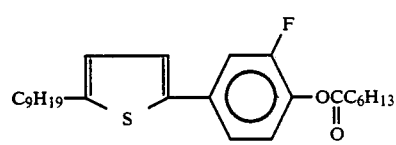 (I-48)
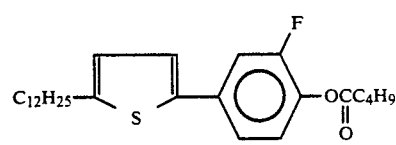 (I-49)
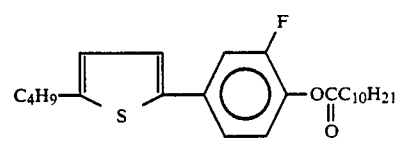 (I-50)
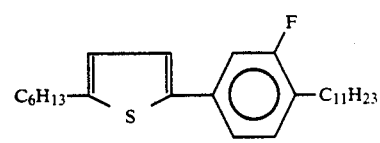 (I-51)
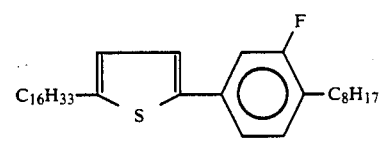 (I-52)
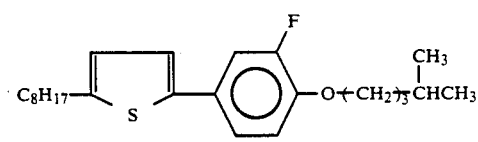 (I-53)
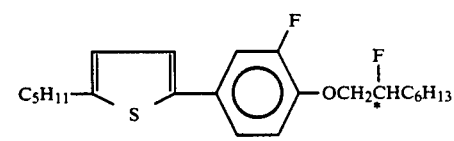 (I-54)
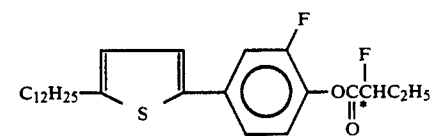 (I-55)
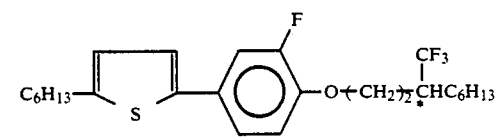 (I-56)

-continued
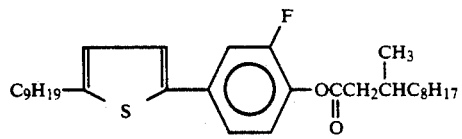 (I-57)
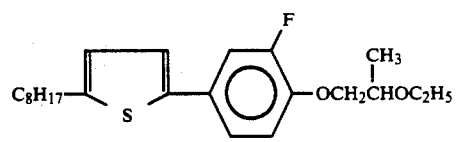 (I-58)
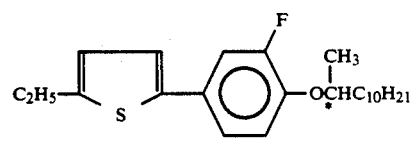 (I-59)
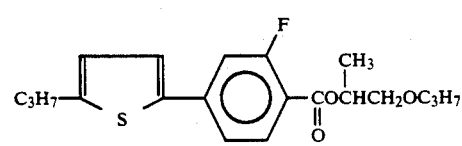 (I-60)
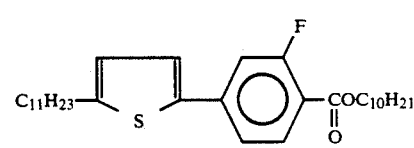 (I-61)
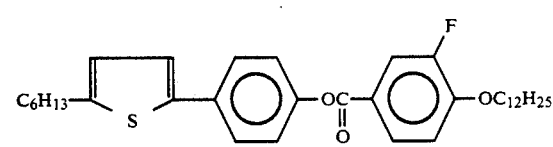 (I-62)
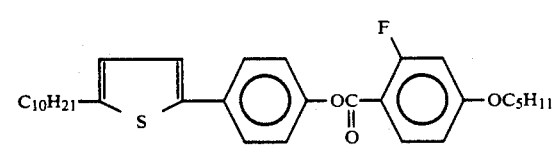 (I-63)
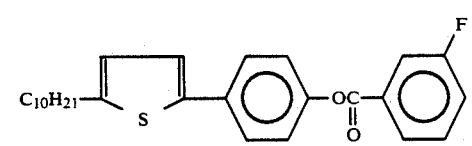 (I-64)
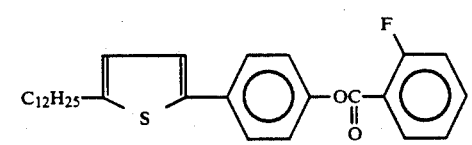 (I-65)
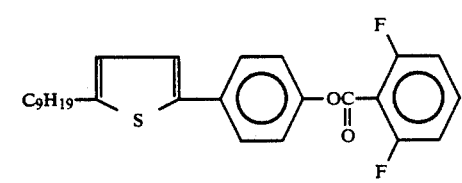 (I-66)
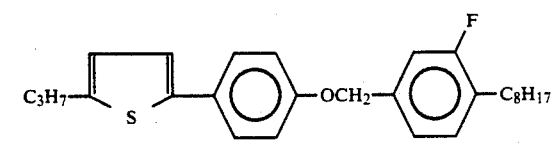 (I-67)

-continued
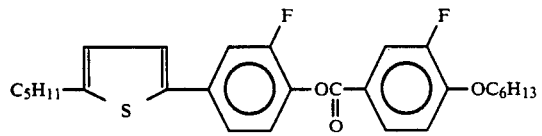
(I-68)
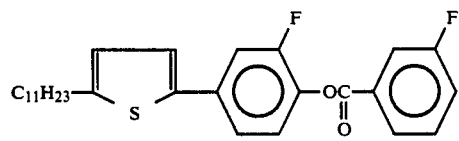
(I-69)
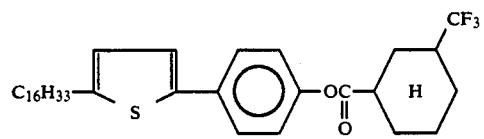
(I-70)
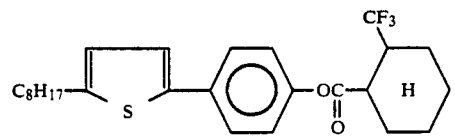
(I-71)
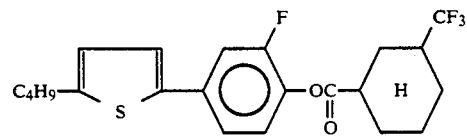
(I-72)
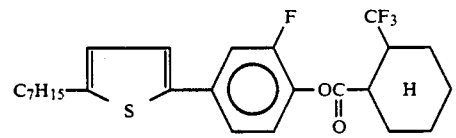
(I-73)
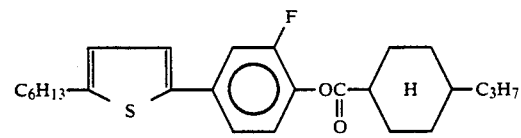
(I-74)
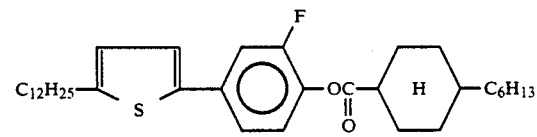
(I-75)
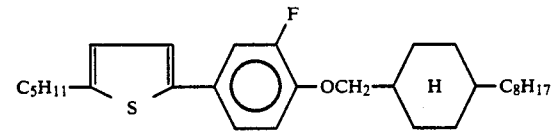
(I-76)
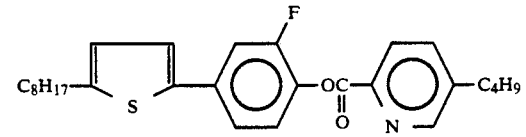
(I-77)
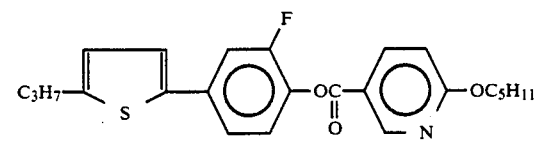
(I-78)

-continued
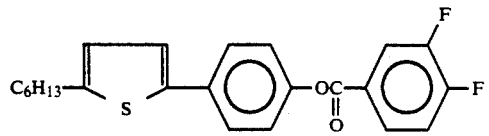 (I-79)
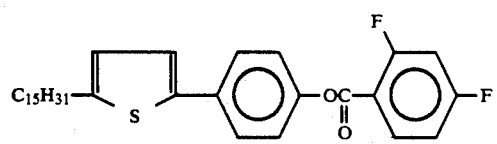 (I-80)
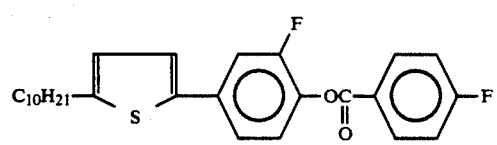 (I-81)
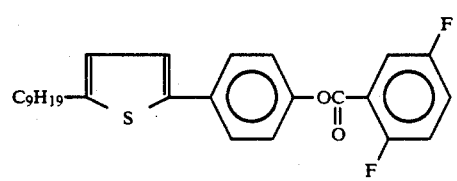 (I-82)
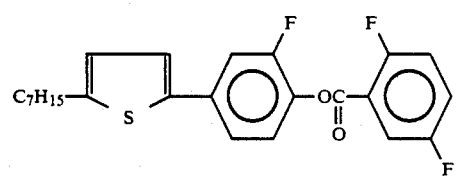 (I-83)
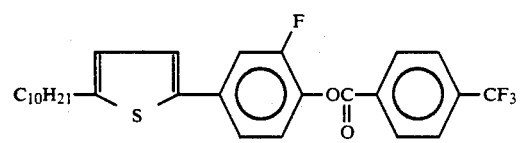 (I-84)
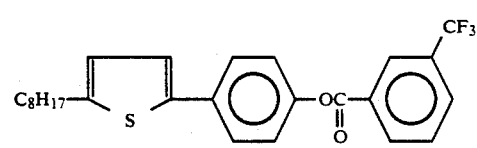 (I-85)
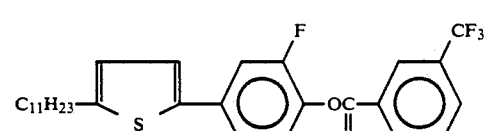 (I-86)
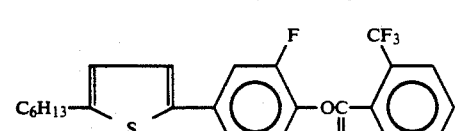 (I-87)
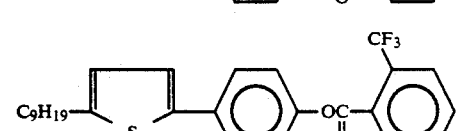 (I-89)
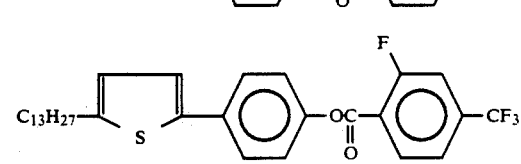 (I-90)

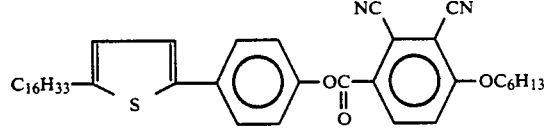 (I-91)
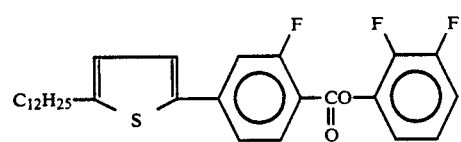 (I-92)
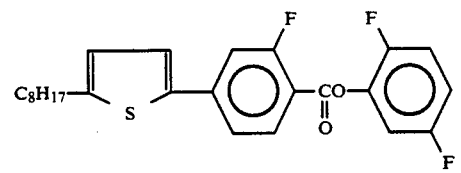 (I-93)
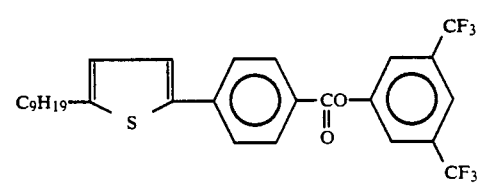 (I-94)
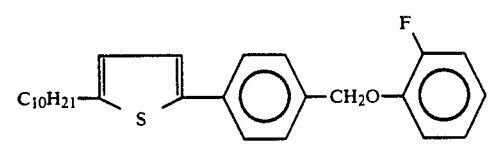 (I-95)
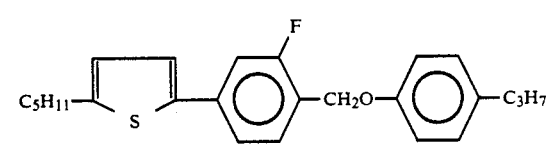 (I-96)
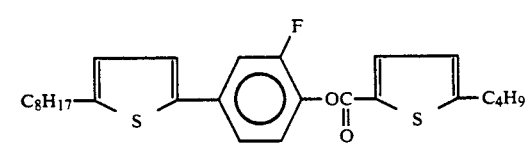 (I-97)
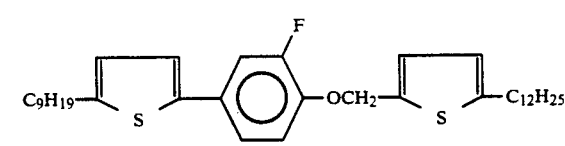 (I-98)
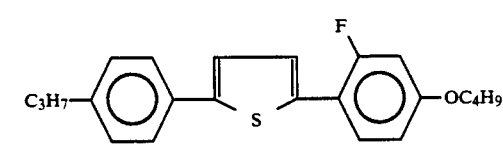 (I-99)
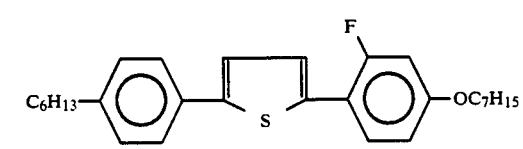 (I-100)
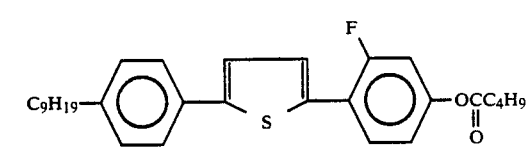 (I-101)

-continued
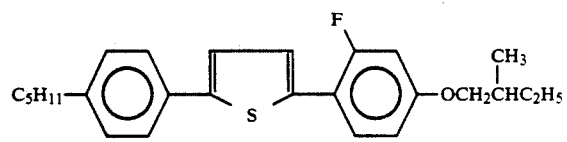 (I-102)
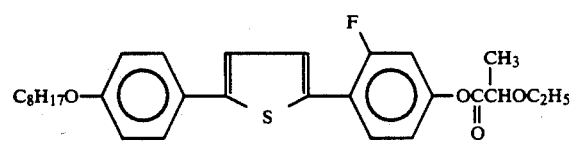 (I-103)
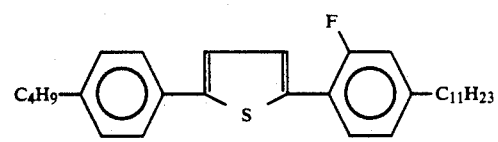 (I-104)
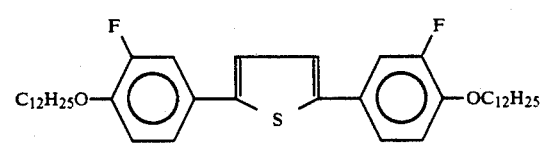 (I-105)
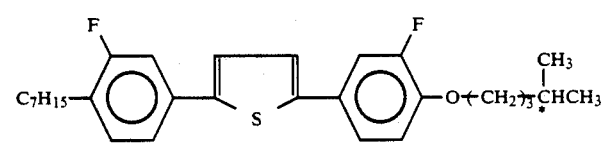 (I-106)
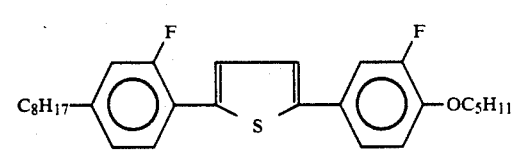 (I-107)
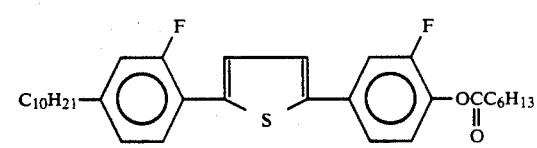 (I-108)
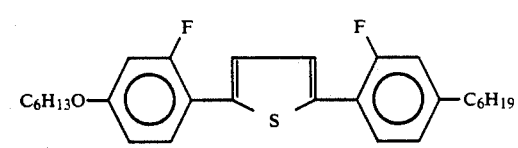 (I-109)
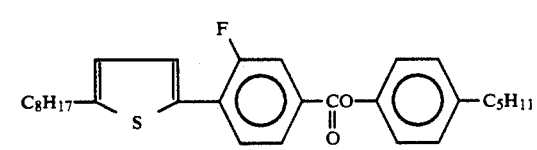 (I-110)
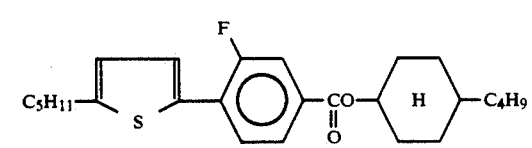 (I-111)
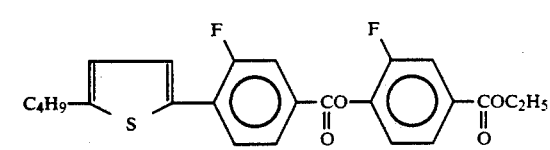 (I-112)

-continued
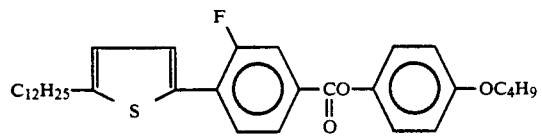
(I-113)
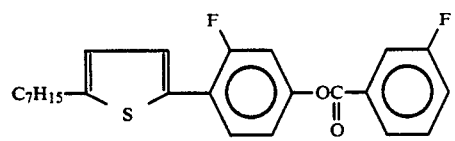
(I-114)
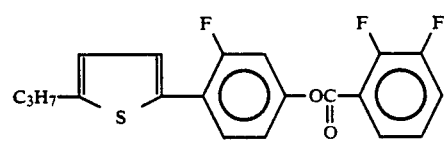
(I-115)
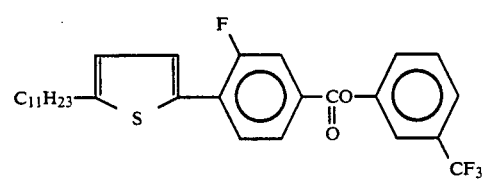
(I-116)
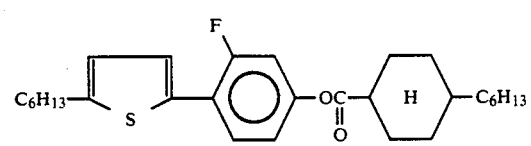
(I-117)
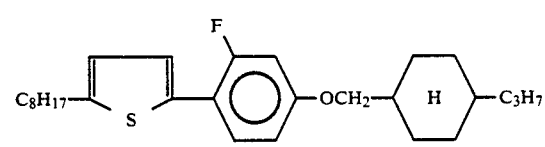
(I-118)
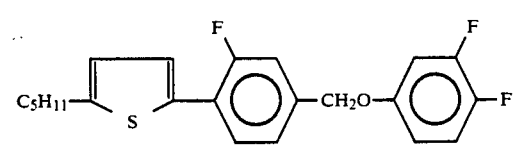
(I-119)
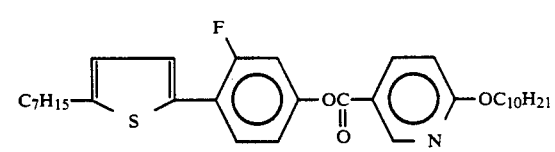
(I-120)
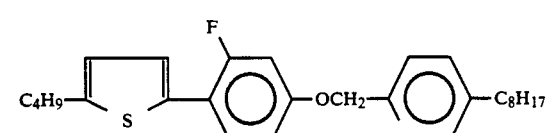
(I-121)
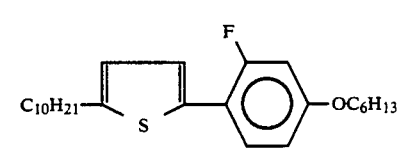
(I-122)
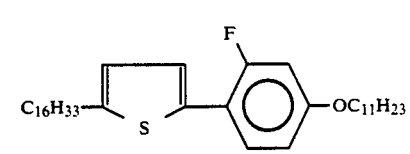
(I-123)

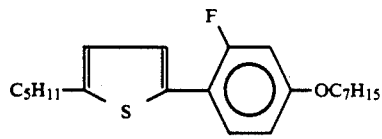 (I-124)
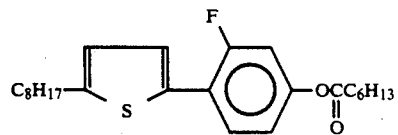 (I-5)
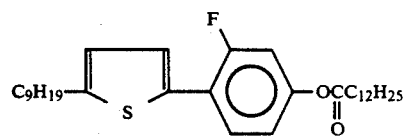 (I-6)
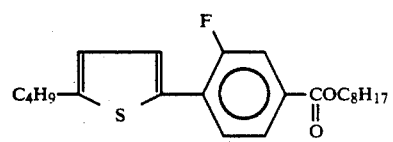 (I-7)
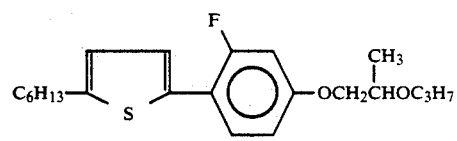 (I-8)
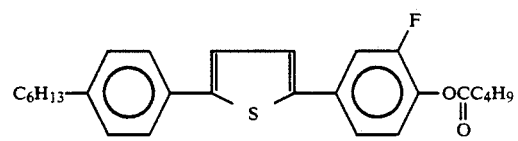 (I-9)
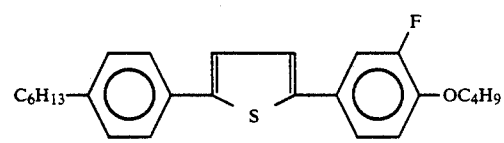 (I-130)
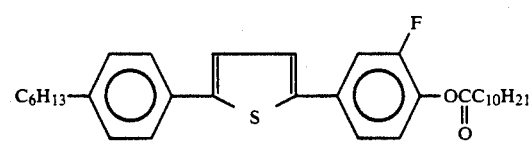 (I-31)
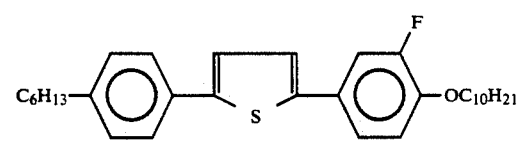 (I-2)
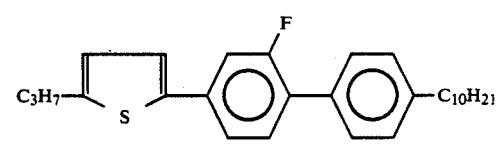 (I-3)
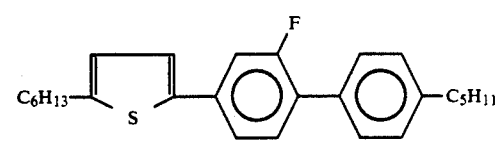 (I-4)

-continued

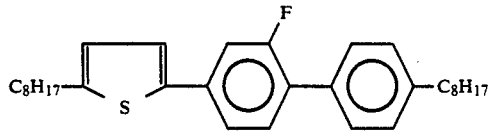 (I-5)

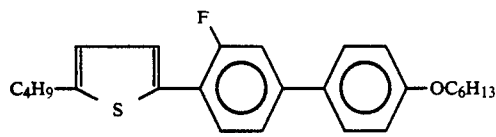 (I-6)

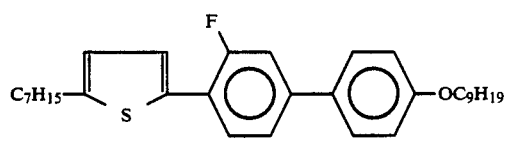 (I-7)

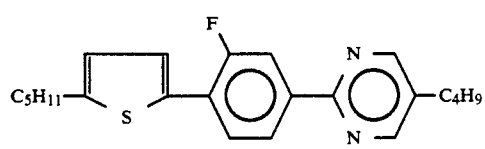 (I-8)

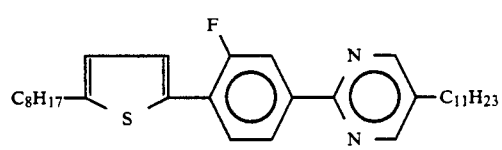 (I-9)

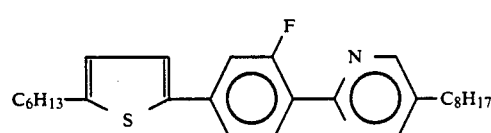 (I-140)

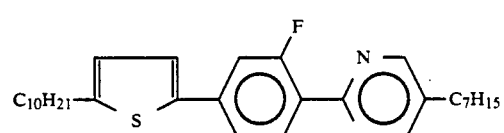 (I-141)

The liquid crystal composition according to the present invention may be obtained by mixing at least one species of the compound represented by the formula (I) and another mesomorphic compound in appropriate proportions. In formulating the liquid crystal composition by mixing the mesomorphic compound according to the present invention with at least one species of an above-mentioned mesomorphic compound or a liquid crystal composition, the resultant liquid crystal composition may desirably contain 1 to 80 wt. %, preferably 1 to 60 wt. %, more preferably 1 to 40 wt. % of the mesomorphic compound according to the present invention.

Further, when two or more species of the compound according to Formula I are used, the resultant liquid crystal composition may desirably contain 1 to 80 total wt. %, preferably 1 to 60 total wt. %, more preferably 1 to 40 total wt. % of the two or more species of the compounds according to Formula I.

The liquid crystal composition according to the present invention may preferably be formulated as a liquid crystal composition capable of utilizing ferroelectricity, particularly a liquid crystal composition showing a chiral smectic phase.

Specific examples of the other mesomorphic compound for use in the composition with the compound of Formula I may include those denoted by the following formulae (II) to (XI).

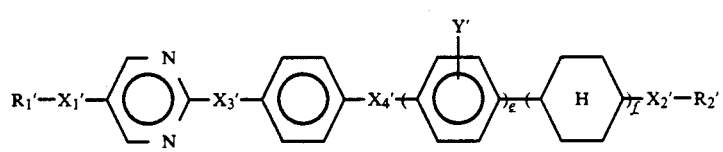 (II)

wherein e denotes 0 or 1 and f denotes 0 or 1 with proviso that e+f=0 or 1; Y' denotes H, halogen, CH$_3$ or CF$_3$; X$_1$' and X$_2$' denote a single bond,

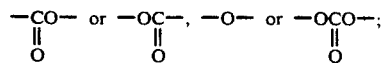

and $X_3'$ and $X_4'$ denote a single bond,

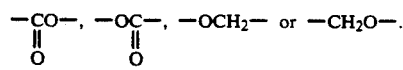

In Formula (II), preferred compounds thereof include those represented by the following Formulae (IIa) to (IId):

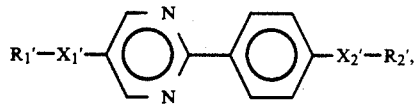  (IIa)

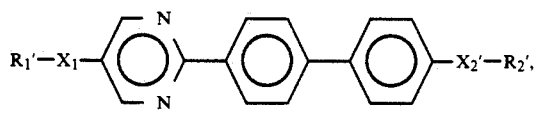  (IIb)

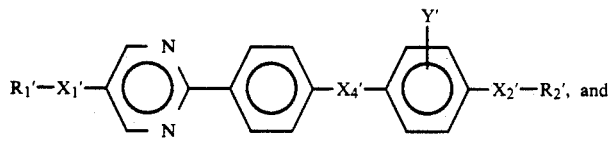  (IIc)

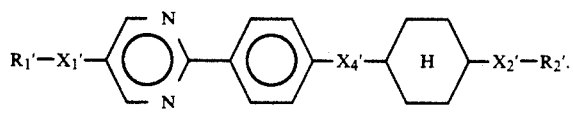  (IId)

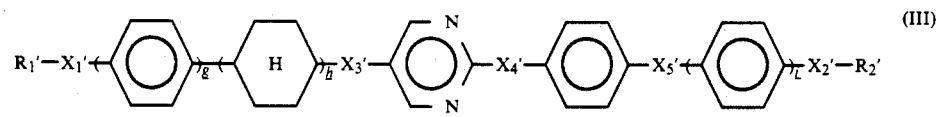  (III)

wherein g and h denote 0 or 1 with the proviso that g+h=1; i denotes 0 or 1; $X_1'$ and $X_2'$ denote a single bond,

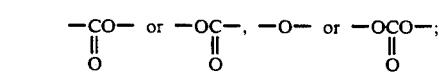

and $X_3'$, $X_4'$, and $X_5'$ denote an single bond,

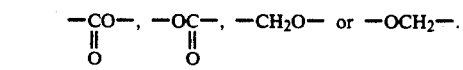

In the formula (III), preferred compounds thereof include those represented by the following Formulae (IIIa) to (IIIc):

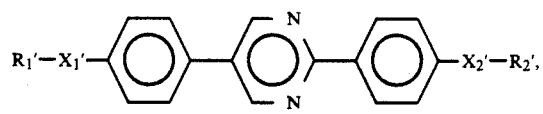  (IIIa)

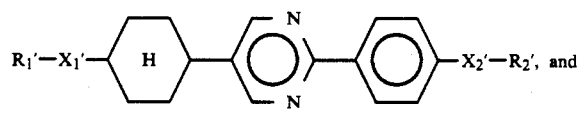  (IIIb)

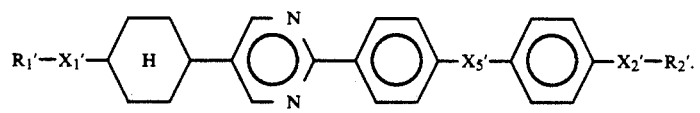  (IIIc)

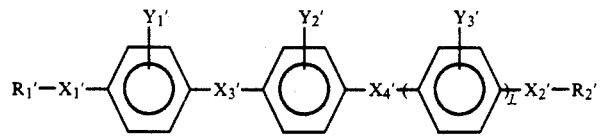  (IV)

wherein j denotes 0 or 1; $Y_1'$, $Y_2'$ and $Y_3'$ denotes H, halogen, $CH_3$ or $CF_3$; $X_1'$ and $X_2'$ denote a single bond,

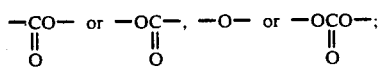

and $X_3'$ and $X_4'$ denote a single bond,

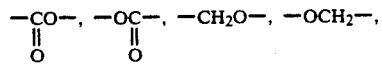

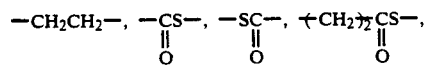

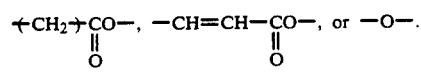

In Formula (IV), preferred compounds thereof may include those represented by the following Formulae (IVa) to (IVb):

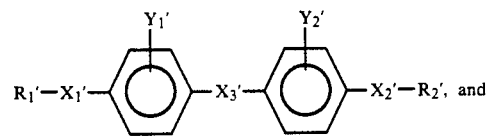
(IVa)

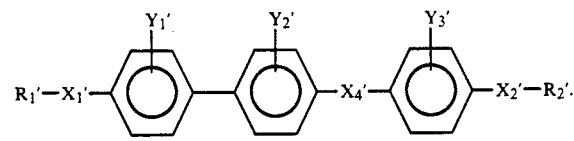
(IVb)

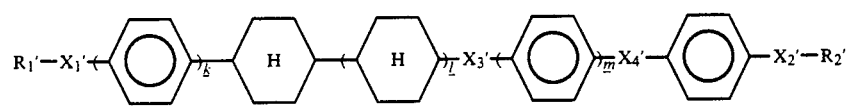
(V)

wherein k, l, and m denote 0 or 1 with the proviso that $k+l+m=0$, 1 or 2; $X_1'$ and $X_2'$ denote a single bond,

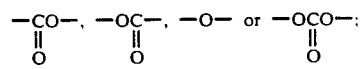

and $X_3'$ and $X_4'$ denote a single bond,

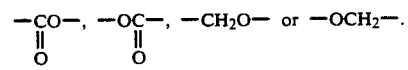

In the formula (V), preferred compounds thereof may include those represented by the following Formulae (Va) to (Vf):

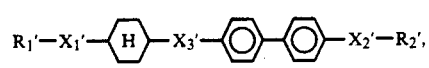
(Va)

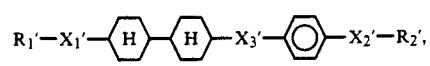
(Vb)

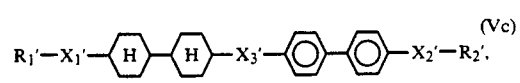
(Vc)

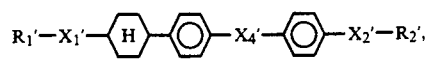
(Vd)

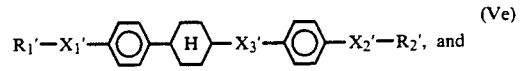
(Ve)

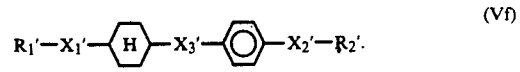
(Vf)

Herein, $R_1'$ and $R_2'$ denote a linear or branched alkyl group having 1-18 carbon atoms capable of including one or two or more non-neighboring methylene groups which can be replaced with —CHX— (wherein X is halogen) and capable of further including one or two or more non-neighboring methylene groups other than those directly connected to $X_1'$ or $X_2'$ which can be replaced with at least one species of

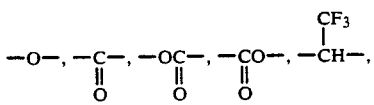

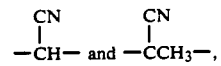

with proviso that $R_1'$ and $R_2'$ do not connect to a ring structure when $R_1'$ and $R_2'$ denote a halogenated alkyl group containing one methylene group replaced with

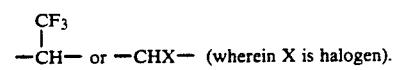

Preferred examples of $R_1'$ and $R_2'$ include those represented by the following groups (i) to (ix):

i) a linear alkyl group having 1-15 carbon atoms;

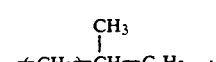
ii)

(optically active or inactive) wherein p denotes an integer of 0-5 and g denotes an integer of 1-11;

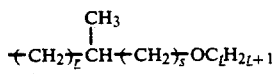

iii)

(optically active or inactive) wherein r denotes an integer of 0-6, s denotes 0 or 1, and t denotes an integer of 1-14;

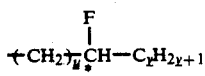

iv)

wherein u denotes 0 or 1 and v denotes an integer of 1-16;

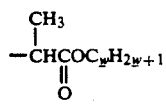

v)

(optically active or inactive) wherein w denotes an integer of 1-15;

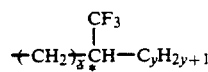

vi)

wherein x denotes an integer of 0-2 and y denotes an integer of 1-15;

vii)

wherein z denotes an integer of 1-15;

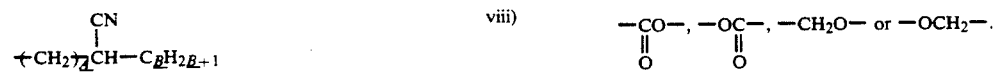

viii)

(optically active or inactive) wherein A denotes an integer of 0-2 and B denotes an integer of 0-15; and

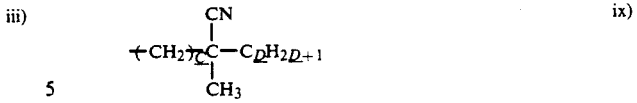

ix)

(optically active or inactive) wherein C denotes an integer of 0-2 and D denotes an integer of 1-15

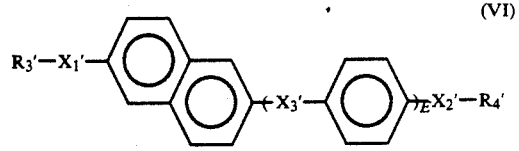

(VI)

wherein E denotes 0 or 1; $X_1'$ and $X_2'$ denote a single bond,

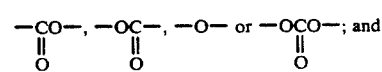; and $X_3'$ denotes a single bond,

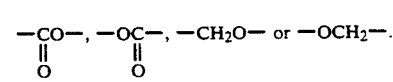.

In the formula (VI), preferred compounds thereof include those represented by the following Formulae (VIa) to (VIb):

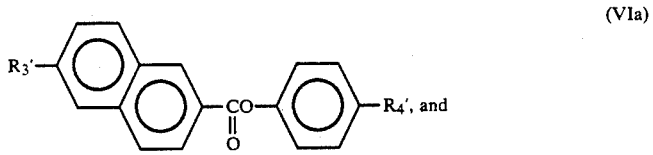

(VIa)

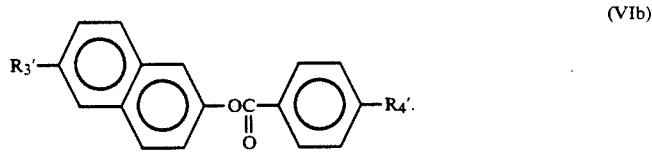

(VIb)

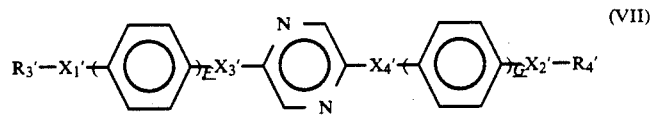

(VII)

wherein F and G denote 0 or 1; $X_1'$ and $X_2'$ denote a single bond,

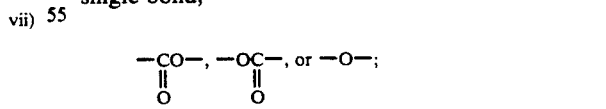

and $X_3'$ and $X_4'$ denote a single bond,

—CO—, —OC—, —CH$_2$O— or —OCH$_2$—.
  ‖      ‖
  O      O

In the above Formula (VII), preferred compounds thereof include those represented by the following Formulae (VIIa) and (VIIb).

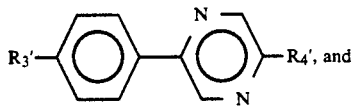
(VIIa)

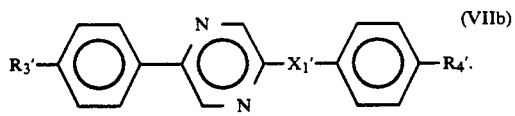
(VIIb)

Herein, $R_3'$ and $R_4'$ denote a linear or branched alkyl group having 1-18 carbon atoms capable of including one or two or more non-neighboring methylene groups which can be replaced with —CHX— (wherein X is halogen) and capable of further including one or two or more non-neighboring methylene groups other than those directly connected to $X_1'$ or $X_2'$ which can be replaced with at least one species of

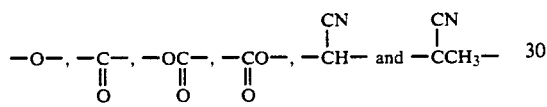

with proviso that $R_3'$ and $R_4'$ do not connect to a ring structure when $R_3'$ and $R_4'$ denote a halogenated alkyl group containing one methylene group replaced with —CHX— (wherein X is halogen).

Further, preferred examples of $R_3'$ and $R_4'$ include those represented by the following groups (i) to (vii):

i) a linear alkyl group having 1-15 carbon atoms;

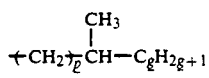
ii)

(optically active or inactive) wherein p denotes an integer of 0-5 and g denotes an integer of 1-11;

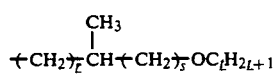
iii)

(optically active or inactive) wherein r denotes an integer of 0-6, s denotes 0 or 1, and t denotes an integer of 1-14;

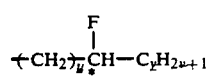
iv)

wherein u denotes an integer of 0-5 and v denotes an integer of 1-16;

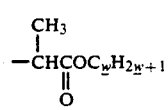
v)

(optically active or inactive) wherein 2 denotes an integer of 1-15;

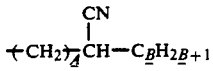
vi)

(optically active or inactive) wherein A denotes an integer of 0-2 and B denotes an integer of 1-15; and

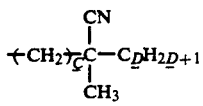
vii)

(optically active or inactive) wherein C denotes an integer of 0-2 and D denotes an integer of 1-15.

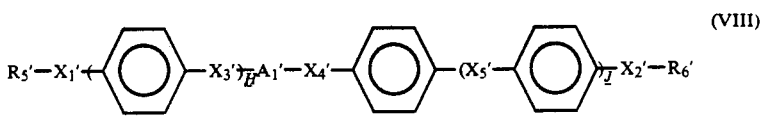
(VIII)

wherein H and J denote 0 or 1 with proviso that H+J=0 or 1; $X_1'$ and $X_2'$ denote a single bond,

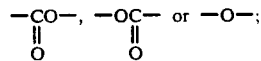

$A^1$, denotes

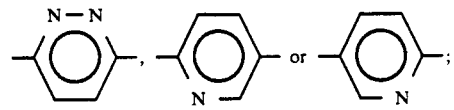

and $X_3'$ and $X_4'$ respectively denote a single bond,

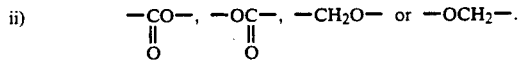

In the above formula (VIII), preferred compounds thereof include those represented by the following Formulae (VIIIa) and (VIIIc):

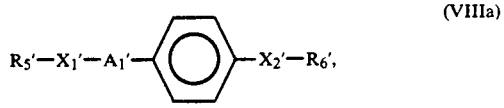
(VIIIa)

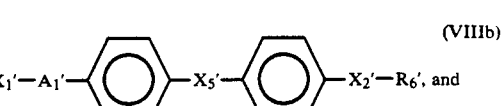
(VIIIb)

(IIIc)

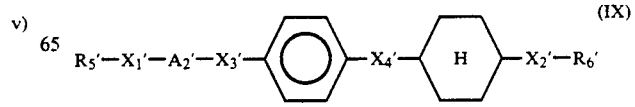
(IX)

wherein $X_1'$ and $X_2'$ denote a single bond,

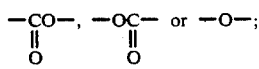

$A_2'$ denotes;

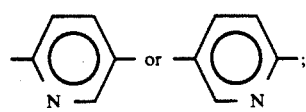

and $X_3'$ and $X_4'$ denote a single bond,

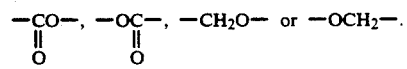

In the above Formula (IX), preferred compounds thereof include those represented by the following Formulae (IXa) to (IXb):

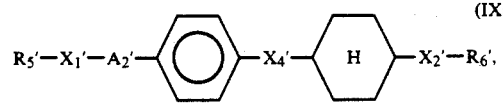

and

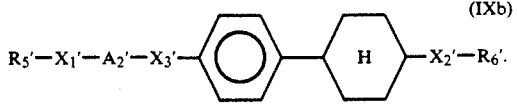

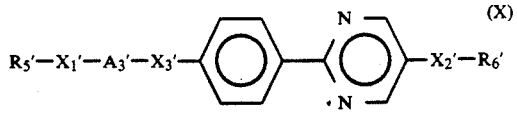

wherein $X_1'$ and $X_2'$ denote a single bond,

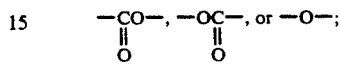

$A_3'$ denotes

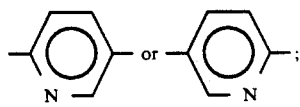

and $X_3'$ denotes a single bond,

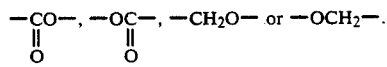

In the above formula (X), preferred compounds thereof include those represented by the following Formulae (Xa) and (Xg):

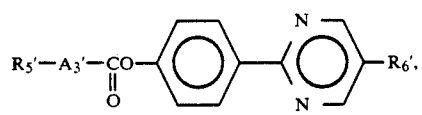

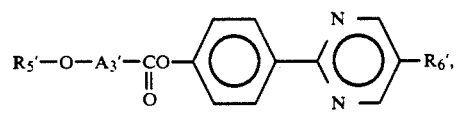

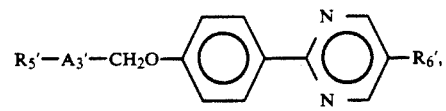

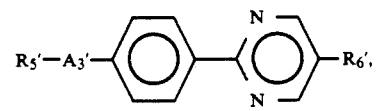

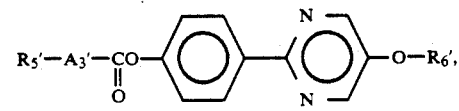

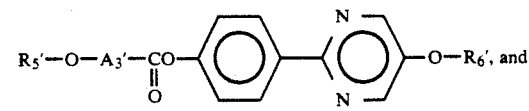

-continued

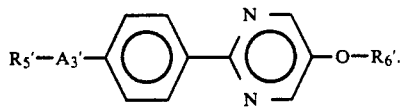
(Xg)

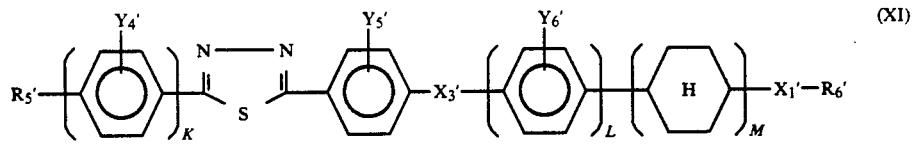
(XI)

wherein K, L and M independently denote 0 or 1 with proviso that K+L+M=0 or 1: $Y_4'$, $Y_5'$ and $Y_6'$ denote H or F; $X_1'$ denotes a single bond,

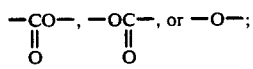

$X_3'$ denotes a single bond,

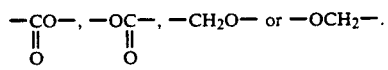

In the above-mentioned formula (XI), preferred compounds thereof may include those represented by the following formulas (XIa) and XId):

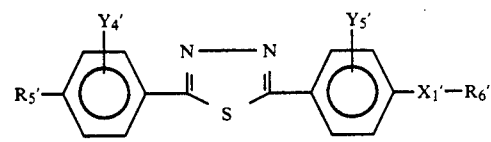
(XIa)

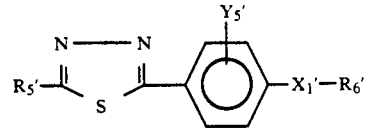
(XIb)

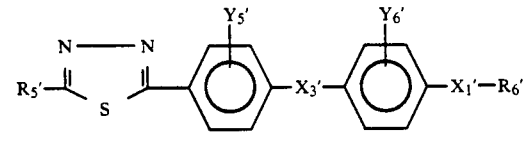
(XIc)

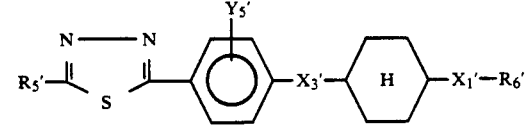
(XId)

Herein, $R_5'$ and $R_6'$ denote a linear or branched alkyl group having 1-18 carbon atoms capable of including one or two or more non-neighboring methylene groups other than those directly connected to $X_1'$ or $X_2'$ which can be replaced with at least one species of

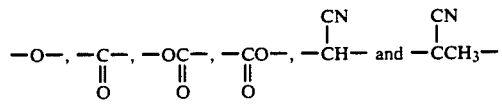

Further, preferred examples of $R_5'$ and $R_6'$ include those represented by the following groups (i) to (vi):

i) a linear alkyl group having 1-15 carbon atoms;

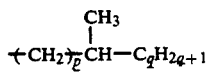  ii)

(optically active or inactive) wherein p denotes an integer of 0-5 and g denotes an integer of 1-11;

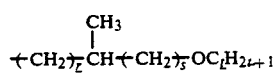  iii)

(optically active or inactive) wherein r denotes an integer of 0-6, s denotes 0 or 1, and t denotes an integer of 1-14;

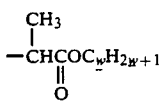  iv)

(optically active or inactive) wherein w denotes an integer of 1-15;

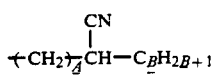  v)

(optically active or inactive) wherein A denotes an integer of 0-2 and B denotes an integer of 1-15; and

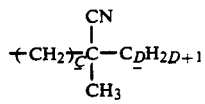  vi)

(optically active or inactive) wherein C denotes an integer of 0-2 and D denotes an integer of 1-15.

In the above-mentioned Formulae (IIa) to (IId), more preferred compounds thereof include those represented by the Formulae (IIaa) to (IIdc):

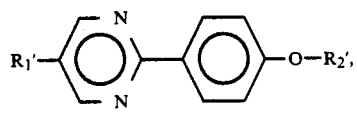
(IIaa)

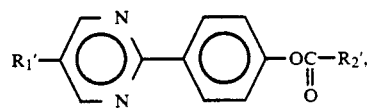
(IIab)

-continued

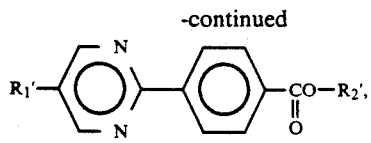 (IIac)

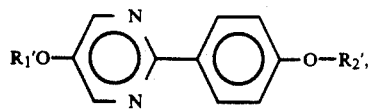 (IIad)

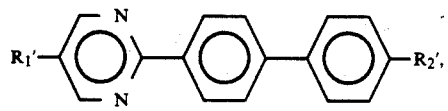 (IIba)

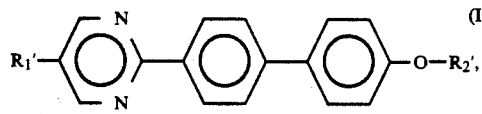 (IIbb)

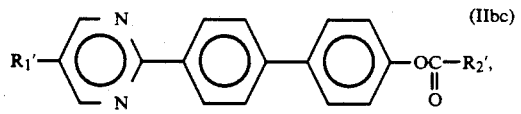 (IIbc)

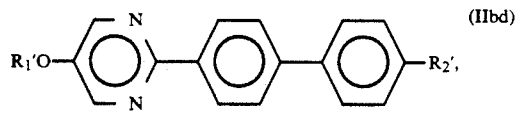 (IIbd)

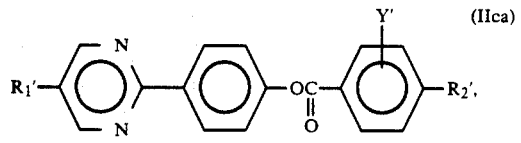 (IIca)

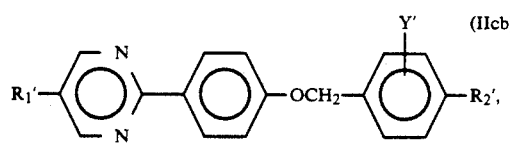 (IIcb)

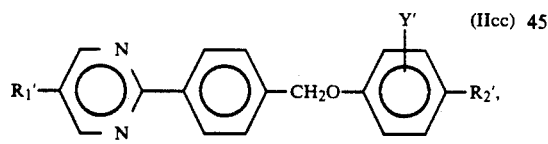 (IIcc)

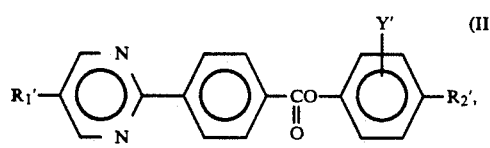 (IIcd)

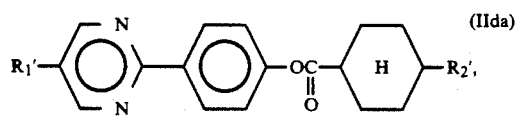 (IIda)

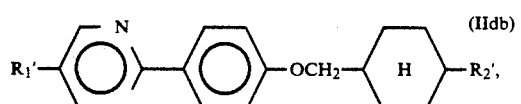 (IIdb)

and

-continued

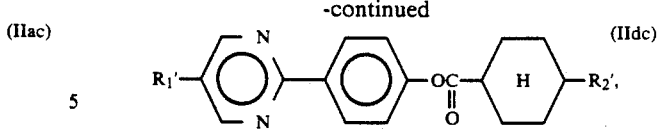 (IIdc)

In the above-mentioned Formulae (IIIa) to (IIIc), more preferred compounds thereof include those represented by the Formulae (IIIaa) to (IIIcb);

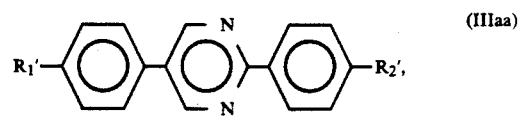 (IIIaa)

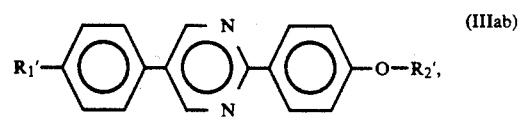 (IIIab)

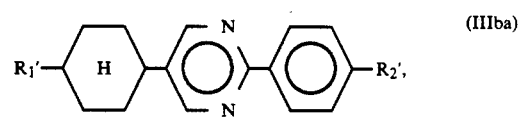 (IIIba)

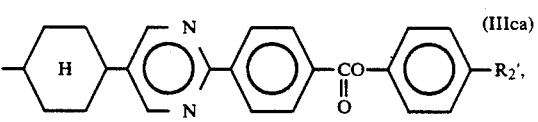 (IIIca)

and

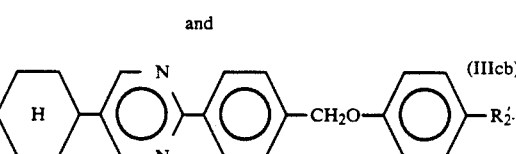 (IIIcb)

In the above-mentioned Formulae (IVa) to (IVb), more preferred compounds thereof include those represented by the Formulae (IVaa) to (IVbf):

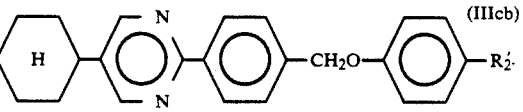 (IVaa)

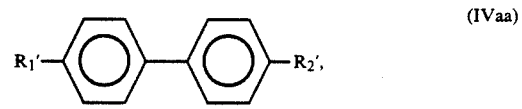 (IVab)

 (IVac)

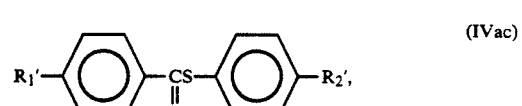 (IVad)

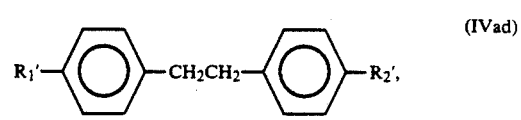 (IVae)

-continued

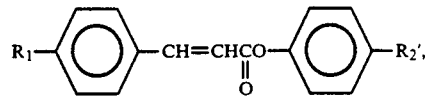 (IVaf)

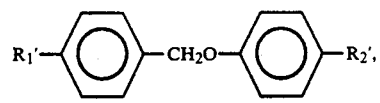 (IVag)

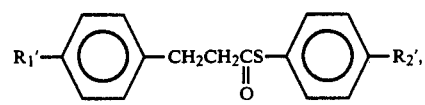 (IVah)

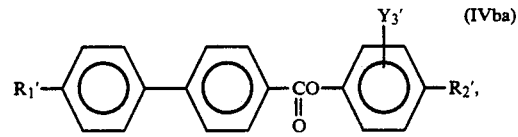 (IVba)

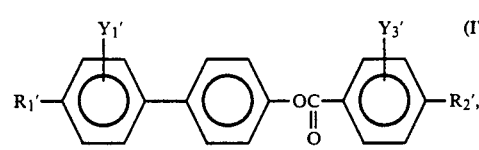 (IVbb)

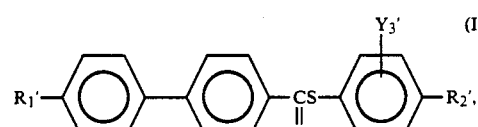 (IVbc)

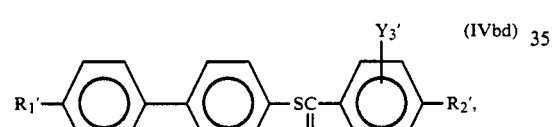 (IVbd)

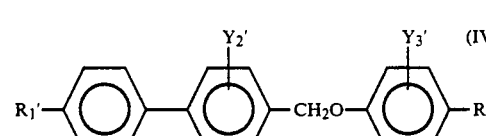 (IVbe)

and

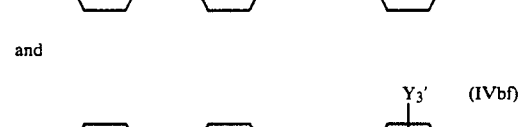 (IVbf)

In the above-mentioned Formulae (Va) to (Vf), more preferred compounds thereof include those represented by the Formulae (Vaa) to (Vfa):

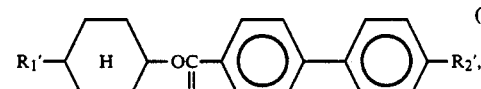 (Vaa)

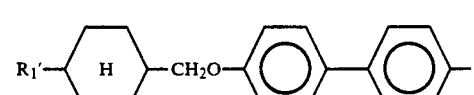 (Vab)

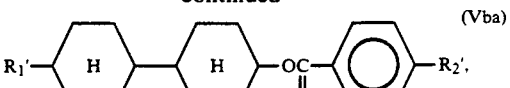 (Vba)

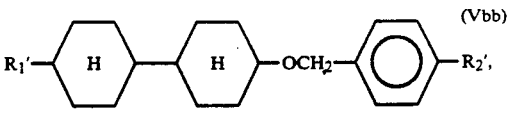 (Vbb)

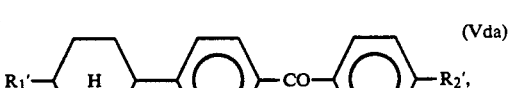 (Vda)

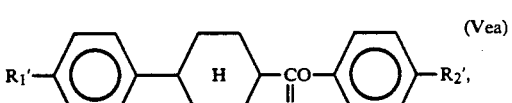 (Vea)

and

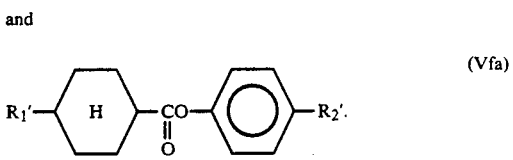 (Vfa)

More preferred compounds of Formula (VIIa) to (VIIb) may include those represented by the Formulae (VIIaa) to (VIIbb):

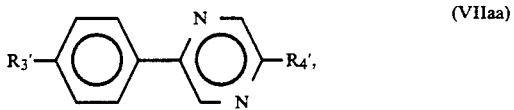 (VIIaa)

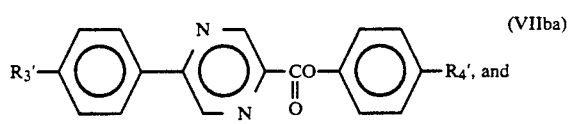 (VIIba)

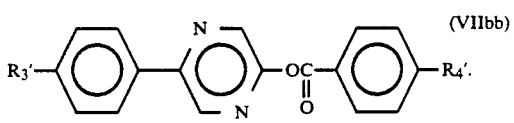 (VIIbb)

In the above-mentioned Formulae (VIIIa) to (VIIIc), more preferred compounds thereof include those represented by the Formulae (VIIIaa) to (VIIIcc):

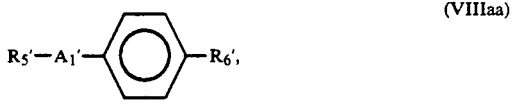 (VIIIaa)

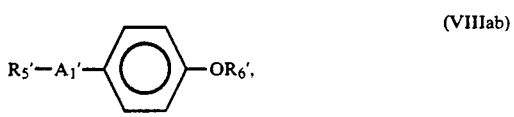 (VIIIab)

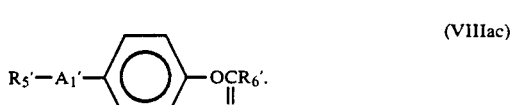 (VIIIac)

-continued

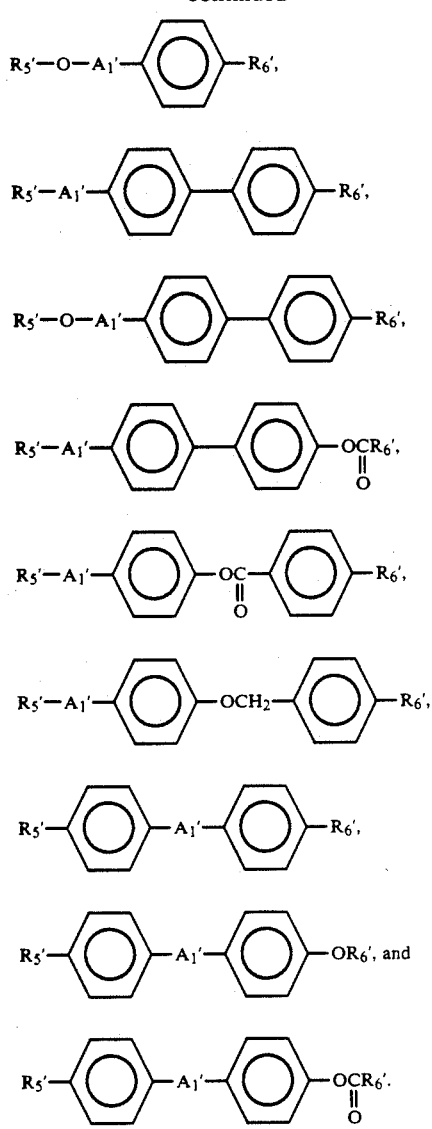

In the above-mentioned Formulae (IXa) to (IXb), more preferred compounds thereof include those represented by the Formulae (IXaa) to (IXbb):

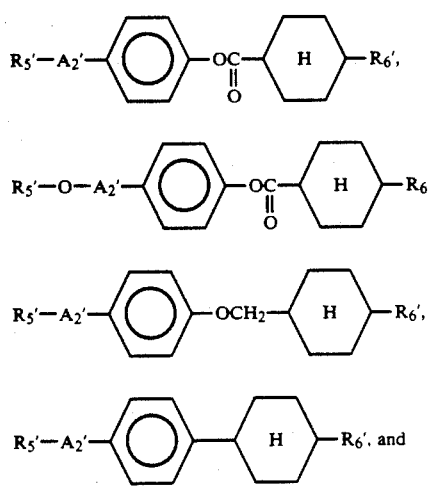

-continued

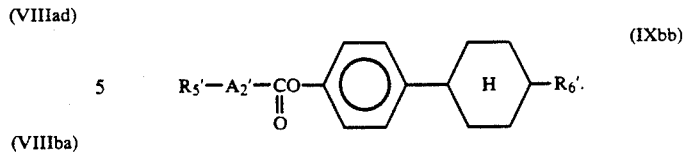

In the above-mentioned formula (XIa) to (XId), more preferred compounds thereof may include those represented by the following formulas (XIaa) and (XIdb):

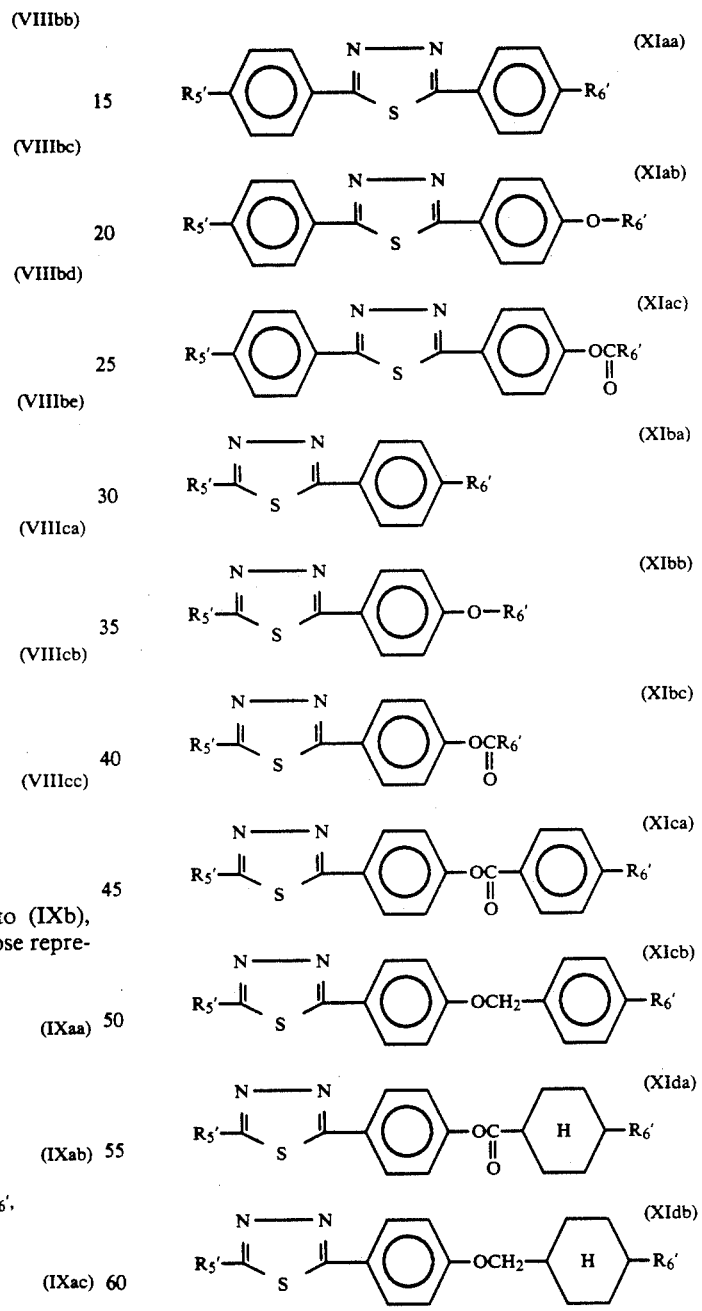

The liquid crystal device according to the present invention may preferably be prepared by heating the liquid crystal composition prepared as described above into an isotropic liquid under vacuum, filling a blank cell comprising a pair of oppositely spaced electrode plates with the composition, gradually cooling the cell to form a liquid crystal layer and restoring the normal pressure.

FIG. 1 is a sectional view of an embodiment of the liquid crystal device utilizing ferroelectricity prepared as described above for explanation of the structure thereof.

Referring to FIG. 1, the liquid crystal device includes a liquid crystal layer 1 assuming a chiral smectic phase disposed between a pair of glass substrates 2 each having thereon a plurality of transparent electrodes 3 of $In_2O_3$, $SnO_2$ or indium-tin-oxide (ITO) and an insulating alignment control layer 4. Lead wires 6 are connected to the electrodes 3 so as to apply a driving voltage to the liquid crystal layer 1 from a power supply 7. Outside the substrates 2, a pair of polarizers are 8 disposed so as to modulate incident light $I_0$ from a light source 9 in cooperation with the liquid crystal 1 to provide modulated light I. The liquid crystal device is thus of the transmission-type.

The insulating alignment control layer 4 is formed by rubbing a film of a polymer such as polyamide with gauze or acetate fiber-woven cloth so as to align the liquid crystal molecules in the rubbing direction. Further, it is also possible to compose the alignment control layer of two layers, e.g., by first forming an insulating layer of an inorganic material, such as silicon nitride, silicon nitride containing hydrogen, silicon carbide, silicon carbide containing hydrogen, silicon oxide, boron nitride, boron nitride containing hydrogen, cerium oxide, aluminum oxide, zirconium oxide, titanium oxide, or magnesium fluoride, and forming thereon an alignment control layer of an organic insulating material, such as polyvinyl alcohol, polyamide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin, acrylic resin, or photoresist resin. Alternatively, it is also possible to form an insulating alignment control layer of a single organic or inorganic layer. An inorganic insulating alignment control layer 4 may be formed by vapor deposition, while an organic insulating alignment control layer may be formed by applying a solution of an organic insulating material or a precursor thereof in a concentration of 0.1 to 20 wt. %, preferably 0.2-10 wt. %, by spinner coating, dip coating, screen printing, spray coating or roller coating, followed by curing or hardening under prescribed hardening condition (e.g., by heating). The insulating alignment control layer may have a thickness of ordinarily 30 Å–1 micron, preferably 30–3000 Å, most preferably 50–1000 Å. The two glass substrate 2 having transparent electrodes 3 (which may be inclusively referred to herein as "electrode plates") and insulating alignment control layers 4 thereon are maintained at a prescribed arbitrary gap using spacer 5. For example, a cell structure with a desired gap may be formed by sandwiching spacers 5 of silica beads or alumina beads having a prescribed diameter between two glass plates and then sealing the periphery of the glass plates with, e.g., an epoxy adhesive. Alternatively, a polymer film or glass fibers may also be used as a spacer. Between the two glass plates, a ferroelectric liquid crystal is sealed up to provide a liquid crystal layer 1 in a thickness of generally 0.5 to 20 microns, preferably 1 to 5 microns.

Figure 2:
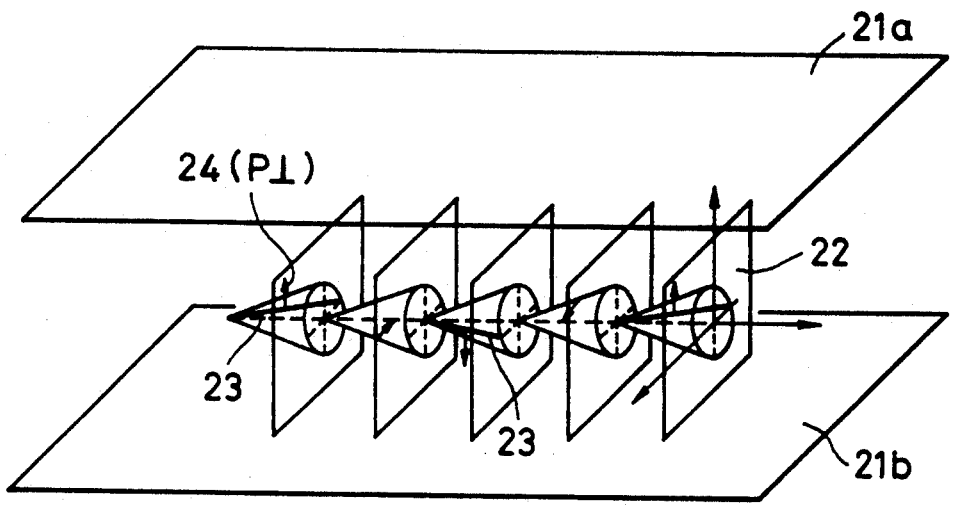
FIGS. 2 and 3 are perspective views of a device cell embodiment for illustrating the operation of the present invention.

FIG. 2 is an illustration of a liquid crystal cell utilizing ferroelectricity for explaining operation thereof. Reference numerals 21a and 21b denote substrates (glass plates) on which a transparent electrode of, E.g., $In_2O_3$, $SnO_2$, ITO (indium-tin-oxide), etc., are disposed. A liquid crystal of an SmC*-phase (chiral smectic C phase) or SmH*-phase (chiral smectic H phase) in which liquid crystal molecular layers 22 are aligned perpendicular to surfaces of the glass plates is hermetically disposed therebetween. Full lines 23 show liquid crystal molecules. Each liquid crystal molecule 23 has a dipole moment (P⊥) 24 in a direction perpendicular to the axis thereof. The liquid crystal molecules 23 continuously form a helical structure in the direction of extension of the substrates. When a voltage higher than a certain threshold level is applied between electrodes formed on the substrates 21a and 21b, a helical structure of the liquid crystal molecule 23 is unwound or released to change the alignment direction of respective liquid crystal molecules 23 so that the dipole moments (P⊥) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arrange functions as a liquid crystal optical modulation device of which optical characteristics vary depending upon the polarity of an applied voltage.

Figure 3:
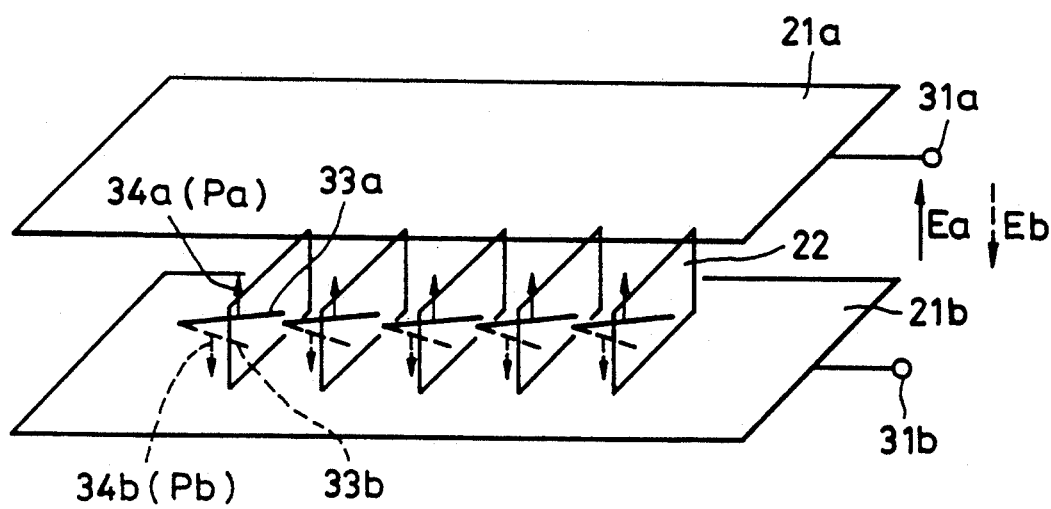

Further, when the liquid crystal cell is made sufficiently thin (e.g., less than about 10 microns), the helical structure of the liquid crystal molecules is unwound to provide a non-helical structure even in the absence of an electric field, whereby the dipole moment assumes either of the two states, i.e., Pa in an upper direction 34a or Pb in a lower direction 34b as shown in FIG. 3, thus providing a bistable condition.

When an electric field Ea or Eb higher than a certain threshold level and different from each other in polarilty as shown in FIG. 3 is applied to a cell having the above-mentioned characteristics by using voltage applications means 31a and 31b, the dipole moment is directed either in the upper direction 34a or in the lower direction 34b depending on the vector of the electric field Ea or Eb. In correspondence with this, the liquid crystal molecules are oriented in either of a first stable state 33a and a second stable state 33b.

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 3. When the dielectric field Ea is applied to the liquid crystal molecules, they are oriented in the first stable state 33a. This state is stably retained even if the electric field is removed. On the other hand, when the electric field Eb of which direction is opposite to that of the electric field Ea is applied thereto, the liquid crystal molecules are oriented to the second stable state 33b, whereby the directions of molecules are change. This state is similarly stably retained even if the electric field is removed. Further, as long as the magnitude of the electric field Ea or Eb being applied is not above a certain threshold value, the liquid crystal molecules are placed in the respective orientation states.

Figure 4:
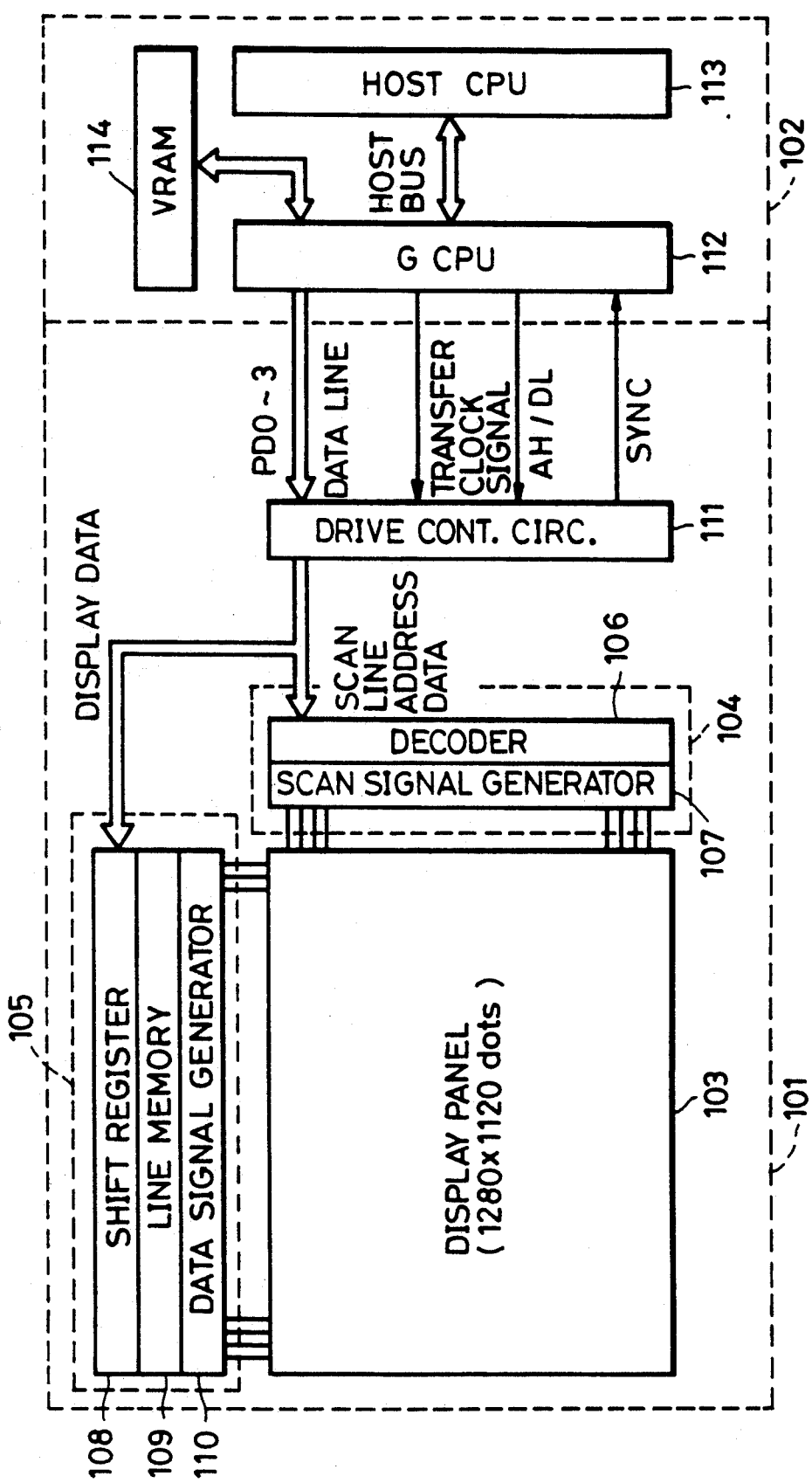
FIG. 4 is a block diagram showing a display apparatus comprising a liquid crystal device utilizing the liquid crystal cell of FIG. 1.
Figure 5:
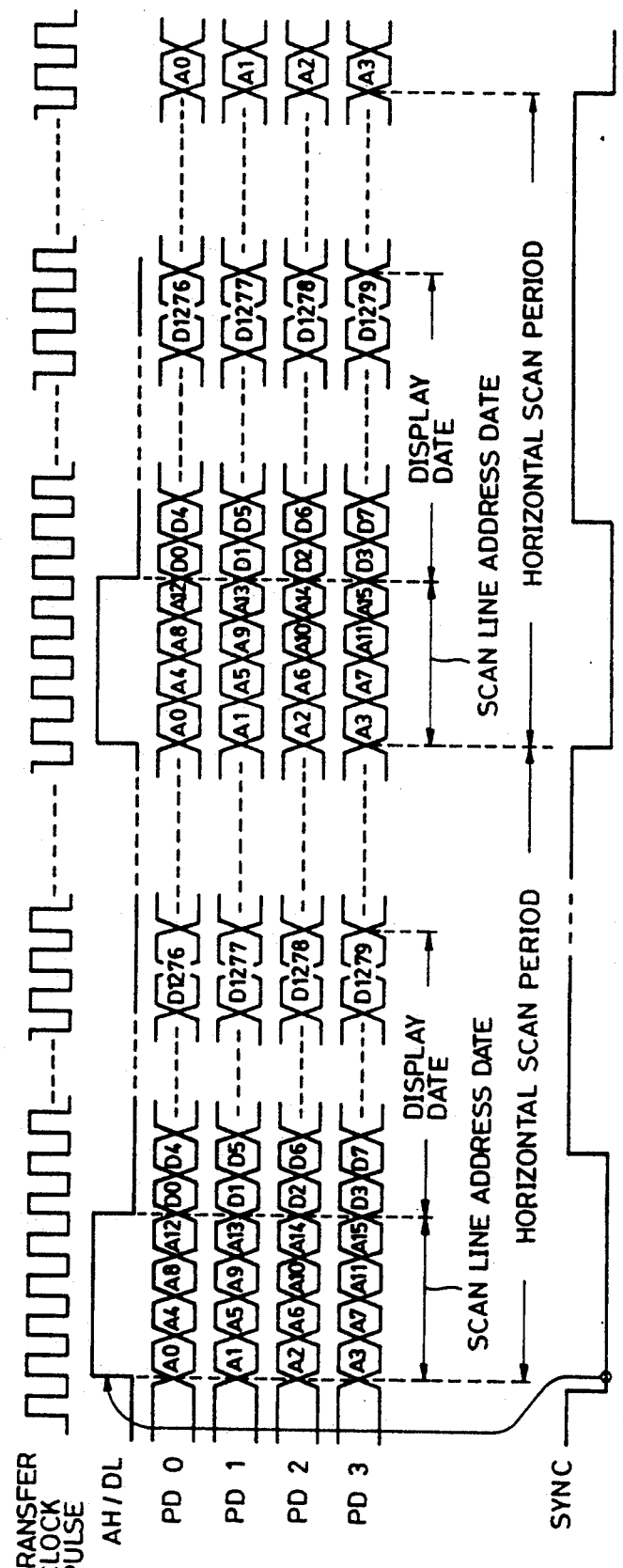
FIG. 5 is a time chart of image data communication showing time correlation between signal transfer and driving with respect to the liquid crystal display apparatus of FIG. 4 and a graphic controller.

Based on the arrangement and data format comprising image data accompanied with scanning line address data and by adopting communication synchronization using a SYNC signal as shown in FIGS. 4 and 5, there is provided a liquid crystal display apparatus of the present invention which uses the liquid crystal device according to the present invention as a display panel portion.

Image data are generated in a graphic controller 102 in an apparatus body and transferred to a display panel 103 by signal transfer means shown in FIG. 4 and 5. The graphic controller 102 principally comprises a CPU (central processing unit, hereinafter referred to as "GCPU") 112 and a VRAM (video-RAM, image data storage memory) 114 is in charge of management and communication of image data between a host CPU 113 and the liquid crystal display apparatus (FLCD) 101. The control method according to the present invention is principally realized in the graphic controller 102. A light source is disposed at the back of the display panel 103.

Hereinbelow, the present invention will be explained more specifically with reference to examples. It is however to be understood that the present invention is not restricted to these examples.

"Parts" indicates "Parts by Weight" in the following examples.

Example 1

2-(3-fluoro-4-hexyloxyphenyl)-5-(4-hexylphenyl) thiophene was synthesized through the following steps (1) to (5):

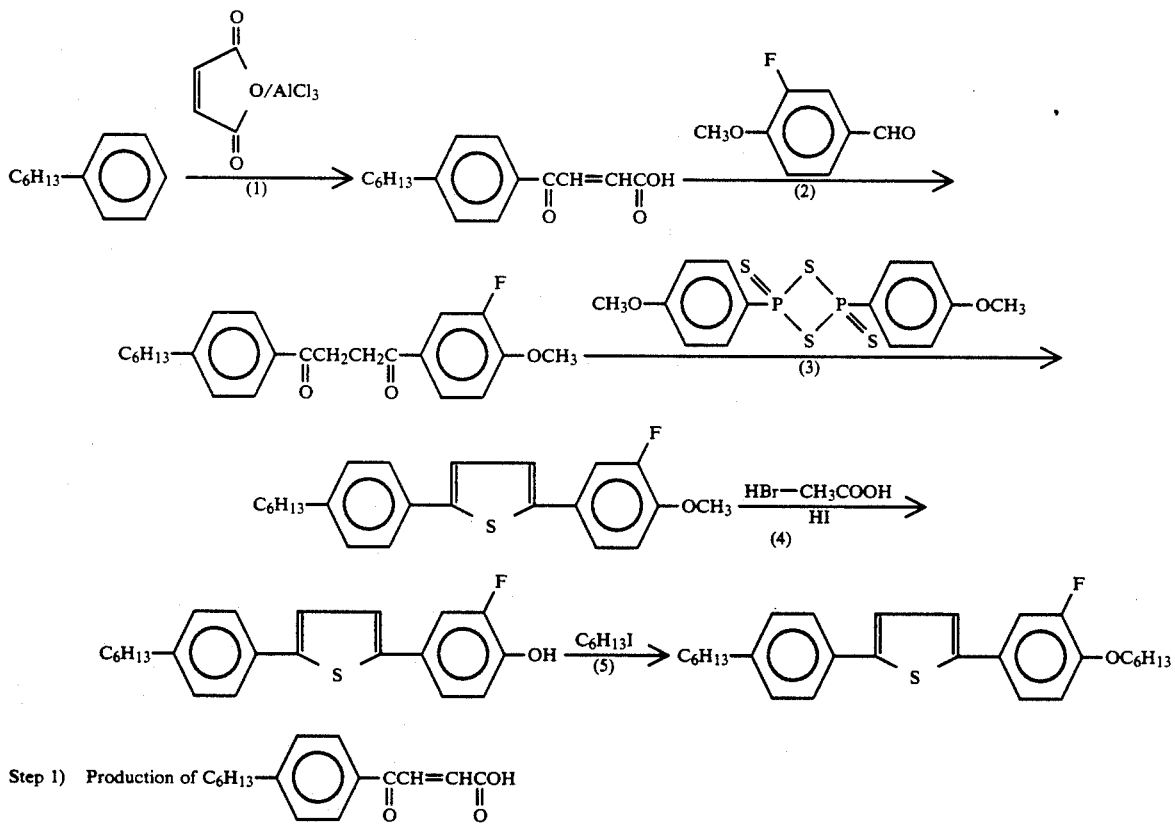

Step 1) Production of

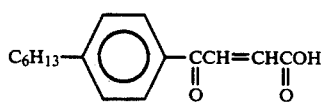

In a 200 ml-reaction vessel, 10 g ($6.17 \times 10^{-2}$ mol) of n-hexylbenzene, 6.65 g ($6.79 \times 10^{-2}$ mol) of maleic anhydride and 60 ml nitrobenzene were placed and cooled below 0° C. To the mixture, 18.3 g ($1.37 \times 10^{-1}$ mol) of anhydrous Aluminum chloride was slowly added under 0° C. while stirring for 60 minutes, followed by reaction for 24 hours while the temperature was gradually raised to room temperature. To the reaction mixture, a mixture solution of 50 ml of water and 14 ml of concentrate chloric acid was added, followed by extraction with ethyl acetate, washing with water, drying and distilling-off of ethyl acetate to obtain an oil. The oil was dissolved in benzene, followed by filtration to remove an unsolved product. The filtrate was poured into 500 ml. of hexane to obtain a crystal. The crystal was filtered and dried to obtain 2.7 g of a refined product. (Yield: 16.8%).

Production of Step 2)

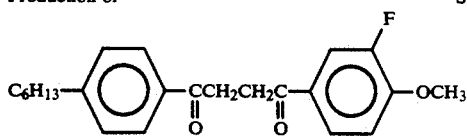

In a 200 ml-reaction vessel, 16.0 g ($6.15 \times 10^{-2}$ mol) of 6.53 g ($6.16 \times 10^{-1}$ mol) of sodium carbonate and 65 ml of ethanol were placed, followed by stirring for 40 minutes at room temperature. The 9.48 g ($6.16 \times 10^{-1}$ mol) of 3-fluoro-4-methoxybenzaldehyde, 1.92 g of 3-ethyl-5-(2-hydroxymethyl)-4-methyl-1.3-thiazolium bromide and 6.24 g ($6.18 \times 10^{-1}$ mol) of triethylamine were added to the mixture, followed by heat-refluxing for 7 hours.

After the heat-refluxing, reaction solution was distilled off to obtain a resultant. To the resultant, 100 ml of water and 200 ml of chloroform were added, followed by extraction to obtain an organic layer. The organic layer was washed twice with 40 ml of a 10% sulfuric acid solution, 40 ml of a 5% sodium bicarbonate solution and 40 ml of water, dried with anhydrous sodium sulfate and distilled-off of the solvent to obtain a crude crystal. The crude crystal was recrystallized from ethanol to obtain a 15.0 g of a refined product. (Yield: 65.9%).

Production of Step 3)

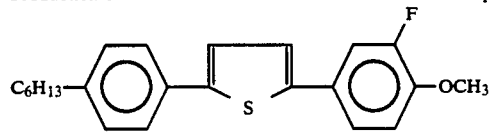

In a 200 ml-reaction vessel, 15.0 g (4.05×10$^{-2}$ mol) of

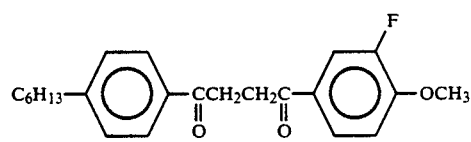

16.4 g (4.05×10$^{-2}$ mol) of Lawesson's and 80 ml of toluene were placed followed by heat-refluxing for 3 hours, distilled-off of the solvent to obtain a resultant. The resultant was purified by column chromatography (eluent: n-hexane/ethylacetate=6/1) to obtain 15.0 g of a refined product.

Production of Step 4)

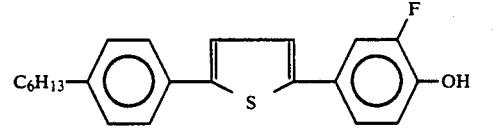

In a 300 ml-reaction vessel, 15.0 g (4.08×10$^{-2}$ mol) of

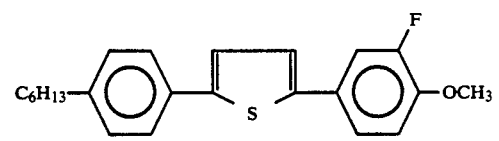

150 ml of a 25% acetic acid solution of hydrogen iodide and 7 ml of a 57% hydrogen iodide solution were placed, followed by heat-stirring for 26 hours at 100° C. The reaction solution was poured into 1 l of water to obtain a crystal. The crystal was filtered, washed with water and dried, followed by purification by silica gel column chromatography (eluent: benzene/hexane=2/1) to obtain 4.4 g of an objective product.

Production of Step 5)

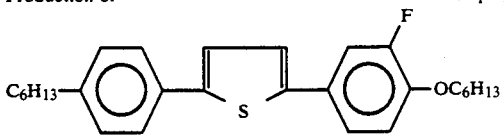

A solution was prepared by dissolving 0.19 g (2.8×10$^{-3}$ mol) of potassium hydroxide and 0.71 g (2.0×10$^{-3}$ mol) of

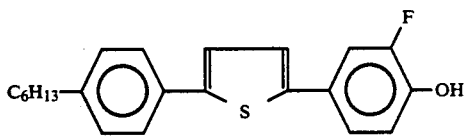

in 2 ml of butanol. To the solution, 0.47 g (2.2×10$^{-3}$ mol) of hexane iodide and 1 ml of butanol were added following by heat-refluxing for 3 hours.

After the reaction, the reaction solution was poured into water, followed by addition of chloric acid to make acidic and extraction with ethyl acetate to obtain an organic layer. The organic layer was dried with anhydrous sodium sulfate followed by distilling-off of the solvent, purification by silica gel column chromatography (eluent:toluene/hexane=⅓) and recrystallizing from a mixture solvent of methanol and toluene to obtain 0.43 g of an objective product (Yield: 49%.

Phase Transition Temperature (°C.)

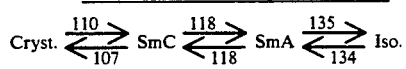

Production of Step 1) to 4)

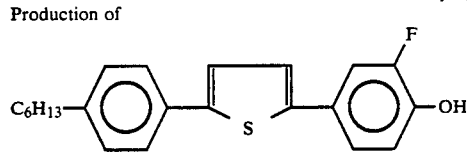

The above compound was synthesized in the same manner as Step (1) to (4) in Example 1.

Production of Step 5)

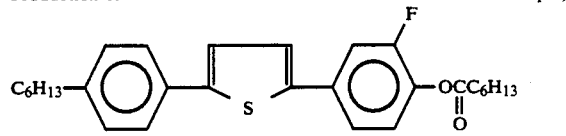

0.71 g (2.0×10$^{-3}$ mol) of

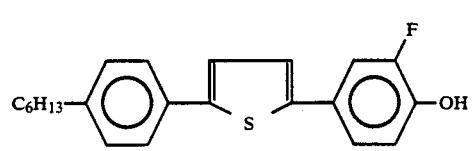

0.26 g (2.0×10$^{-3}$ mol) of heptanoic acid, 0.42 g of N,N'-dicyclohexylcarbodiimide and 40 mg of 4-pyrrolidinopyridine were dissolved in 20 ml of dichloromethane, followed by reaction under stirring for a day at room temperature. An unsolved material was filtered off, followed by distilling-off of the solvent, purification by silica gel column chromatography (eluent:hexane/toluene=1/1) and recrystallization from a mixture solvent of methanol and toluene to obtain 0.32 g of an objective product (Yield: 34%).

Example 2

2-(3-fluoro-4-heptanoyloxyphenyl)-5-(4-hexylphenyl) thiophene was synthesized through the following steps (1) to (5):

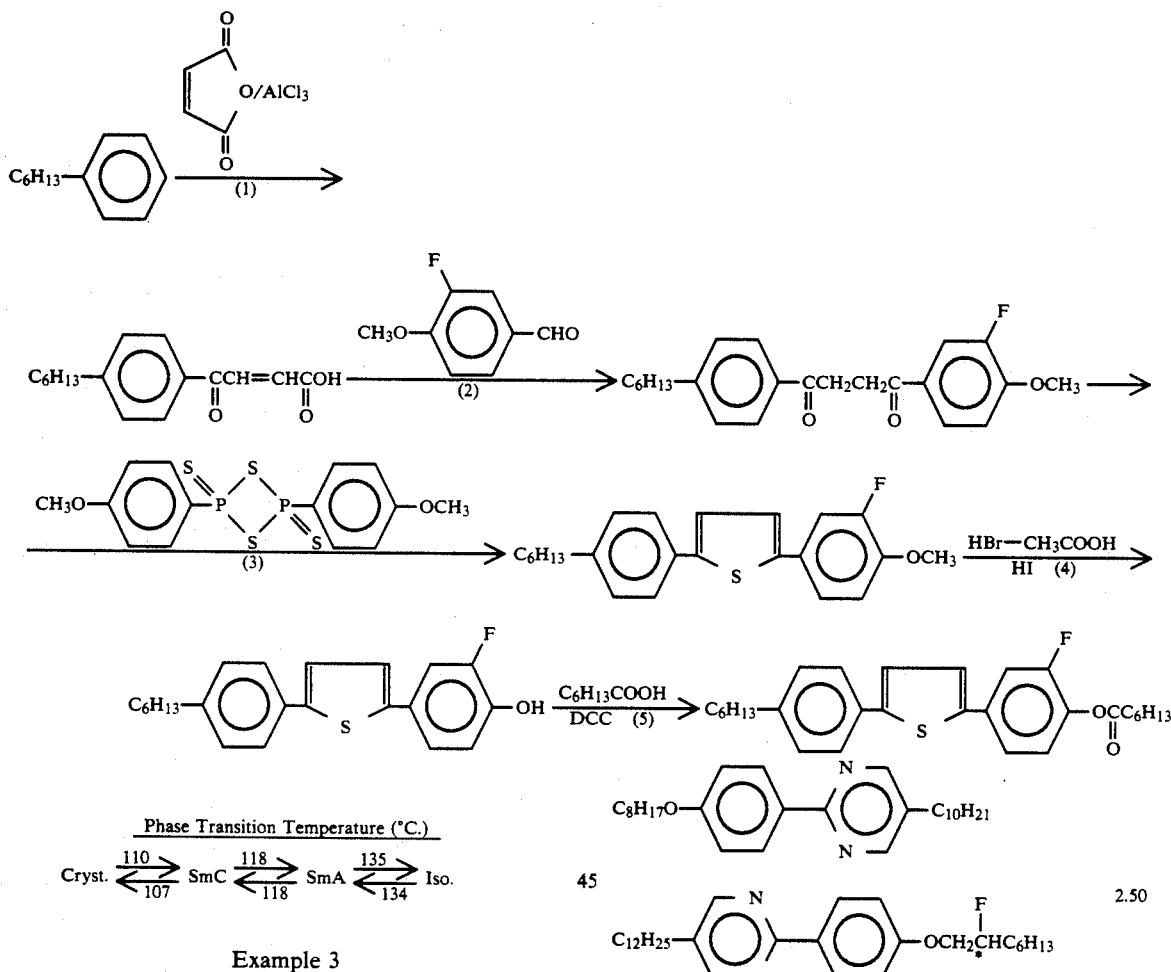

Phase Transition Temperature (°C.)

Cryst. $\underset{107}{\overset{110}{\rightleftarrows}}$ SmC $\underset{118}{\overset{118}{\rightleftarrows}}$ SmA $\underset{134}{\overset{135}{\rightleftarrows}}$ Iso.

Example 3

A liquid crystal composition A was prepared by mixing the following compounds in respectively indicated proportions.

| Structural formula | wt. parts |
|---|---|
| $C_6H_{13}O$—⌬—Py—$C_8H_{17}$ | 54.29 |
| $C_9H_{19}O$—⌬—Py—$C_8H_{17}$ | 27.14 |
| | 13.57 |
| $C_8H_{17}O$—⌬—Py—$C_{10}H_{21}$ | |
| $C_{12}H_{25}$—Py—⌬—$OCH_2\overset{*}{C}H(F)C_6H_{13}$ | 2.50 |
| $C_{10}H_{21}$—Py—⌬—$OCH_2\overset{*}{C}H(F)C_6H_{13}$ | 2.50 |

The liquid crystal composition A was further mixed with the following Example Compound No. I-4 in the proportions indicated below to provide a liquid crystal composition B.

| Ex. Comp. No. | Structural formula | wt. parts |
|---|---|---|
| I-4 | $C_6H_{13}$—⌬—thiophene—⌬(F)—$OCC_6H_{13}(=O)$ | 10 |

| Ex. Comp. No. | Structural formula | wt. parts |
|---|---|---|
| | Composition A | 90 |

Two 0.7 mm-thick glass plates were provided and respectively coated with an ITO file to form an electrode for voltage application, which was further coated with an insulating layer of vapor-deposited $SiO_2$. On the insulating layer, a 0.2%-solution of silane coupling agent (KBM-602, available from Shinetsu Kagaku K.K.) in isopropyl alcohol was applied by spinner coating at a speed of 2000 rpm for 15 seconds and subjected to hot curing treatment at 120° C. for 20 min.

Further, each glass plate provided with an ITO film and treated in the above described manner was coated with a 1.5%-solution of polyimide resin precursor (SP-510, available from Toray K.K.) in dimethylacetoamide by a spinner coater rotating at 2000 rpm for 15 seconds. Thereafter, the coating film was subjected to heat curing at 300° C. for 60 min. to obtain about 250 Å-thick film. The coating film was rubbed with acetate fiber-planted cloth. The thus treated two glass plates were washed with isopropyl alcohol. After alumina beads with an average particle size of 2.0 microns were dispersed on one of the glass plates, the two glass plates were applied to each other with a bonding sealing agent (Lixon Bond, available from Chisso K.K.) so that their rubbed directions were parallel to each other and heated at 100° C. for 60 min. to form a blank cell. The cell gap was found to be about 2 microns as measured by a Berek compensator.

Then, the liquid crystal composition B was heated into an isotropic liquid, and injected into the above prepared cell under vacuum and, after sealing, was gradually cooled at a rate of 20° C./hour to 25° C. to prepare a ferroelectric liquid crystal device.

The ferroelectric liquid crystal device was subjected to measurement of the magnitude of spontaneous polarization Ps and an optical response time (time from voltage application until the transmittance change reaches 90% of the maximum under the application of a peak-to-peak voltage Vpp of 20V in combination with right-angle cross-nicol polarizers).

The results are shown below.

| | 10° C. | 30° C. | 45° C. |
|---|---|---|---|
| Response time (μsec) | 488 | 202 | 95 |
| Ps (nC/cm$^2$) | 3.7 | 2.5 | 1.2 |

Example 4

A liquid crystal composition C was prepared by mixing the following compounds in respectively indicated proportions.

| Structural formula | wt. parts |
|---|---|
| 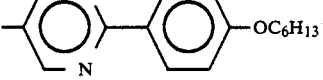 | 10 |
|  | 5 |
|  | 7 |
| 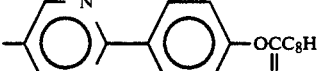 | 7 |
| 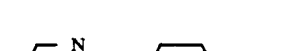 | 6 |
|  | 5 |

| Structural formula | wt. parts |
|---|---|
| C$_7$H$_{15}$—[pyridine]—[phenyl]—[phenyl]—C$_6$H$_{13}$ | 5 |
| C$_4$H$_9$—[cyclohexyl-H]—COO—[phenyl]—[pyridine]—C$_{12}$H$_{25}$ | 8 |
| C$_3$H$_7$—[cyclohexyl-H]—COO—[phenyl]—[pyridine]—C$_{10}$H$_{21}$ | 8 |
| C$_9$H$_{19}$O—[phenyl]—COO—[phenyl]—OC$_5$H$_{11}$ | 20 |
| C$_8$H$_{17}$—[phenyl]—COO—[phenyl]—[phenyl]—OCH$_2$$\overset{*}{C}$H(CH$_3$)C$_2$H$_5$ | 5 |
| C$_8$H$_{17}$—[phenyl]—OCO—[phenyl]—[phenyl]—$\overset{*}{C}$H(CH$_3$)OCOC$_6$H$_{13}$ | 5 |
| C$_6$H$_{13}$—[phenyl]—OCH$_2$—[phenyl]—[phenyl]—C$_7$H$_{15}$ | 6 |
| C$_{12}$H$_{25}$—[pyridine]—[phenyl]—OCH$_2$$\overset{*}{C}$H(F)C$_6$H$_{13}$ | 3 |

The liquid crystal composition C was further mixed with the following Example Compounds in the proportions indicated below to provide a liquid crystal composition D.

| Ex. Comp. No. | Structural formula | wt. parts |
|---|---|---|
| I-2 | C$_4$H$_9$—[phenyl]—[thiophene-S]—[phenyl(F)]—C$_8$H$_{17}$ | 4 |
| I-49 | C$_{12}$H$_{25}$—[thiophene-S]—[phenyl(F)]—OCOC$_4$H$_9$ | 3 |
| I-98 | C$_9$H$_{19}$—[thiophene-S]—[phenyl(F)]—OCH$_2$—[thiophene-S]—C$_{12}$H$_{25}$ | 3 |
| Composition C | | 90 |

A ferroelectric liquid crystal device was prepared in the same manner as in Example 3 except for using the composition D. The ferroelectric liquid crystal device was subjected to measurement of response time and observation of a switching state, etc. In the liquid crystal device, a monodomain with a good and uniform alignment characteristic was observed.

The following results were obtained.

|  | 10° C. | 25° C. | 40° C. |
|---|---|---|---|
| Response time (μsec) | 580 | 280 | 147 |

A clear switching motion was observed during driving and a good bistability was shown when the electric field was removed.

Comparative Example 1

A ferroelectric liquid crystal device was prepared in the same manner as in Example 3 except that the liquid crystal composition C prepared in Example 4 was injected into a cell. The measured values of the response time of the device as follows:

|  | 10° C. | 25° C. | 40° C. |
|---|---|---|---|
| Response time (μsec) | 653 | 317 | 159 |

Example 5

A liquid crystal composition E was prepared by mixing the following compounds in place of Example Compounds (I-2), (I-49) and (I-98) used in Example 4, in respectively indicated proportions.

| Ex. Comp. No. | Structural formula | wt. parts |
|---|---|---|
| I-23 | $C_{11}H_{23}CO$-⟨⟩-S-⟨⟩(F)-$C_4H_9$ | 3 |
| I-74 | $C_6H_{13}$-S-⟨⟩(F)-OCO-⟨H⟩-$C_3H_7$ | 4 |
| I-85 | $C_8H_{17}$-S-⟨⟩-OCO-⟨⟩-$CF_3$ | 2 |
| I-107 | $C_8H_{17}$-⟨⟩(F)-S-⟨⟩(F)-$OC_5H_{11}$ | 5 |
| Composition C | | 86 |

A ferroelectric liquid crystal device was prepared in the same manner as in Example 3 except that the above liquid crystal composition E was used, and the device was subjected to measurement of optical response time and observation of a switching state, etc. In the liquid crystal device, a monodomain with a good and uniform alignment characteristic was observed.

The results of the measurement are shown below.

|  | 10° C. | 25° C. | 40° C. |
|---|---|---|---|
| Response time (μsec) | 615 | 294 | 156 |

Example 6

A liquid crystal composition E was prepared by mixing the following compounds in place of Example Compounds (I-2), (I-49) and (I-98) used in Example 3, in respectively indicated proportions.

| Ex. Comp. No. | Structural formula | wt. parts |
|---|---|---|
| I-54 | $C_5H_{11}$-S-⟨⟩(F)-$OCH_2\overset{*}{C}HC_6H_{13}$(F) | 3 |

-continued

| Ex. Comp. No. | Structural formula | wt. parts |
|---|---|---|
| I-61 | $C_{11}H_{23}$—[thiophene]—[phenyl(F)]—$OCC_6H_{13}$ (C=O) | 5 |
| I-103 | $C_8H_{17}O$—[phenyl]—[thiophene]—[phenyl(F)]—$OCCHOC_2H_5$ (with $CH_3$) | 5 |
| I-111 | $C_5H_{11}$—[thiophene]—[phenyl(F)]—$CO\text{-}O$—[H cyclohexyl]—$C_4H_9$ | 6 |
| Composition C | | 81 |

A ferroelectric liquid crystal device was prepared in the same manner as in Example 3 except that the above liquid crystal composition F was used, and the device was subjected to measurement of optical response time and observation of a switching state, etc. In the liquid crystal device, a monodomain with a good and uniform alignment characteristic was observed.

The results of the measurement are shown below.

|  | 10° C. | 25° C. | 40° C. |
|---|---|---|---|
| Response time (μsec) | 606 | 309 | 158 |

Example 7

A liquid crystal composition G was prepared by mixing the following compounds in respectively indicated proportions.

| Structural formula | wt. parts |
|---|---|
| $C_9H_{19}$—[pyrazine]—[phenyl]—$OC_9H_{19}$ | 6 |
| $C_{10}H_{21}$—[pyrazine]—[phenyl]—$OC_8H_{17}$ | 6 |
| $C_8H_{17}O$—[pyridine]—[phenyl]—$O$-$(CH_2)_3$-$CHC_2H_5$ (with $CH_3$) | 7 |
| $C_{11}H_{23}O$—[pyrazine]—[phenyl]—$O$-$(CH_2)_2$-$CHC_2H_5$ (with $CH_3$) | 14 |
| $C_{10}H_{21}$—[pyridine]—[phenyl]—$C_6H_{13}$ | 8 |
| $C_6H_{13}$—[pyrazine]—[phenyl]—[phenyl]—$C_4H_9$ | 4 |

-continued

| Structural formula | wt. parts |
|---|---|
| $C_8H_{17}$—⬡—⬡(N)—⬡—$OC_5H_{11}$ | 2 |
| $C_3H_7$—H—CO-O—⬡—⬡(N,N)—$C_{12}H_{25}$ | 10 |
| $C_5H_{11}$—H—CO-O—⬡—⬡(N,N)—$C_{12}H_{25}$ | 5 |
| $C_{10}H_{21}O$—⬡—C(S)O—⬡—$OC_8H_{17}$ | 10 |
| $C_6H_{13}$—⬡—CO-O—⬡—⬡—$OCH_2CH(CH_3)C_2H_5$ | 7 |
| $C_3H_7$—H—$CH_2O$—⬡—⬡(N,N)—$C_8H_{17}$ | 7 |
| $C_{10}H_{21}$—⬡—⬡—$OCH_2$—⬡—$C_7H_{15}$ | 5 |
| $C_{12}H_{25}$—⬡(N,N)—⬡—$OCH_2\overset{*}{C}H(F)C_5H_{11}$ | 2 |
| $C_5H_{11}$—H—CO-O—⬡—$OCH_2\overset{*}{C}H(F)C_6H_{13}$ | 2 |
| $C_{12}H_{25}O$—⬡—⬡(N,N)—CO-O-$(CH_2)_3\overset{*}{C}H(CH_3)C_2H_5$ | 2 |
| $C_{12}H_{25}O$—⬡—⬡(N,N)—O-$(CH_2)_3\overset{*}{C}H(CH_3)OC_3H_7$ | 3 |

The liquid crystal composition G was further mixed with the following Example Compounds in the proportions indicated below to provide a liquid crystal composition H.

| Ex. Comp. No. | Structural formula | wt. parts |
|---|---|---|
| I-17 | 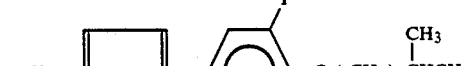 | 3 |
| I-35 | | 3 |
| I-61 | | 3 |
| I-79 | | 2 |
| Composition G | | 89 |

A ferroelectric liquid crystal device was prepared in the same manner as in Example 3 except that the above liquid crystal composition H was used, and the device was subjected to measurement of optical response time and observation of a switching state, etc. In the liquid crystal device, a monodomain with a good and uniform alignment characteristic was observed.

The results of the measurement are shown below.

|  | 10° C. | 25° C. | 40° C. |
|---|---|---|---|
| Response time (μsec) | 556 | 295 | 163 | crystal composition G prepared in Example 7 was injected into a cell. The measured values of the response time of the device were as follows:

|  | 10° C. | 25° C. | 40° C. |
|---|---|---|---|
| Response time (μsec) | 668 | 340 | 182 |

Example 8

A liquid crystal composition J was prepared by mixing the following compounds in place of Example Compounds (I-17), (I-35), (I-61) and (I-79) used in Example 7, the following indicated proportions.

| Ex. Comp. No. | Structural formula | wt. parts |
|---|---|---|
| I-53 |  | 2 |
| I-77 | | 3 |
| I-128 | 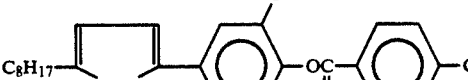 | 2 |
| Composition G | | 93 |

Comparative Example 2

A ferroelectric liquid crystal device was prepared in the same manner as in Example 3 except that the liquid A ferroelectric liquid crystal device was prepared in the same manner as in Example 3 except that the above liquid crystal composition J was used, and the device was subjected to measurement of optical response time and observation of a switching state, etc. In the liquid crystal device, a monodomain with a good and uniform alignment characteristic was observed.

The results of the measurement are shown below.

|  | 10° C. | 25° C. | 40° C. |
|---|---|---|---|
| Response time (μsec) | 595 | 306 | 173 |

Example 9

2-(3-fluoro-4-butyloxyphenyl)-5-(4-hexylphenyl)thiophene (Comparative Example I-128) was prepared in the following manner.

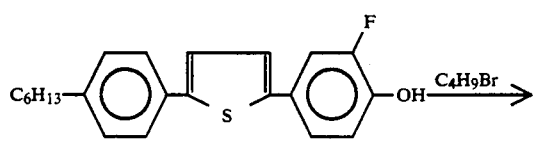

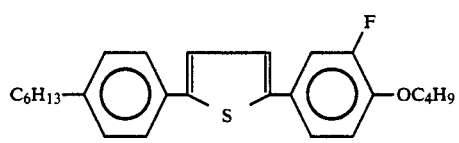

0.24 g of an objective product was prepared in the same manner as in Example 1 except that 0.28 g (2.2×10$^{-3}$ mol) of butane bromide was used in place of 0.47 g (2.2×10$^{-3}$ mol) of hexane iodide in Step 5 of Example 1. (Yield: 29%)

Example 10

2-(3-fluoro-4-decyloxyphenyl)-5-(4-hexylphenyl)thiophene (Comparative Example I-130) was prepared in the following manner.

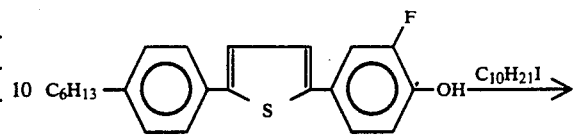

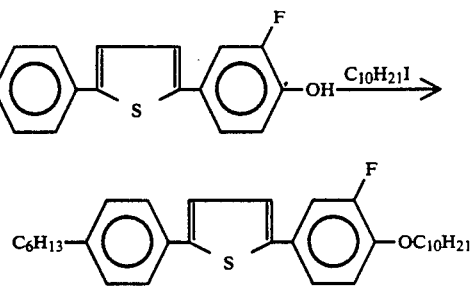

0.48 g of an objective product was prepared in the same manner as in Example 1 except that 0.54 g (2.2×10$^{-3}$ mol) of butane bromide was used in place of 0.47 g (2.2×10$^{-3}$ mol) of hexane iodide in Step 5 of Example 1. (Yield: 49%)

Example 11

2-(3-fluoro-4-butanoyloxyphenyl)-5-(4-hexylphenyl)thiophene (Comparative Example I-127) was prepared in the following manner.

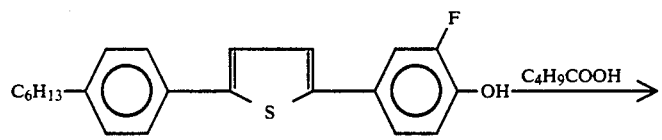

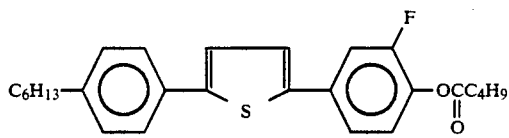

0.26 g of the above compound was prepared in the same manner as in Example 2 except that 0.21 g of pentanoic acid was used in place of 0.26 g (2.0×10$^{-3}$ mol) of heptanoic acid in Step 2 of Example 2 (Yield: 30%).

Phase transition temperatures of compounds obtained in Example 9 to 11 are shown in Table 1.

TABLE 1

| Example | Structural formula | Phase transition temperature (°C.) |
|---|---|---|
| 9 (I-130) | C$_6$H$_{13}$—⌬—S—⌬—OC$_4$H$_9$ (F) | Cryst. ⇄$_{<25}$ S3 ⇄$_{113}^{118}$ S$_A$ ⇄$_{137}^{137}$ Iso. |
| 10 (I-132) | C$_6$H$_{13}$—⌬—S—⌬—OC$_{10}$H$_{21}$ (F) | Cryst. ⇄$_{<-20}$ S3 ⇄$_{90}^{92}$ S$_c$ ⇄$_{110}^{109}$ S$_A$ ⇄$_{125}^{126}$ Iso. |

TABLE 1-continued

| Example | Structural formula | Phase transition temperature (°C.) |
|---|---|---|
| 11 (I-129) | $C_6H_{13}$—⟨phenyl⟩—CH=CH—⟨phenyl-F⟩—$OCC_4H_9$ (with S and =O) | Cryst. $\xleftrightarrow{<25}$ S3 $\xleftrightarrow{130}$ $S_A$ $\xleftrightarrow{147/146}$ Iso.  with $S_C$ at 125, 128 |

Example 12

A blank cell was prepared in the same manner as in Example 7 by using a 2% aqueous solution of polyvinyl alcohol resin (PVA-117, available from Kuraray K.K.) instead of the 1.5%-solution of polyimide resin precursor in dimethylacetomaide on each electrode plate. A ferroelectric liquid crystal device was prepared by filling the blank cell with the liquid crystal composition H prepared in Example 7. The liquid crystal device was subjected to measurement of optical response time in the same manner as in Example 7. The results are shown below.

|  | 10° C. | 25° C. | 40° C. |
|---|---|---|---|
| Response time (μsec) | 612 | 310 | 175 |

Example 13

A blank cell was prepared in the same manner as in Example 13 except for omitting the $SiO_2$ layer to form an alignment control layer composed of the polyimide resin layer alone on each electrode plate. A ferroelectric liquid crystal device was prepared by filling the blank cell with the liquid crystal composition H prepared in Example 7. The liquid crystal device was subjected to measurement of optical response time in the same manner as in Example 7. The results are shown below.

|  | 10° C. | 25° C. | 40° C. |
|---|---|---|---|
| Response time (μsec) | 605 | 303 | 172 |

As is apparent from the above Examples 12 and 13, also in the cases of different device structures, the devices containing the ferroelectric liquid crystal composition H according to the present invention respectively provided a remarkably improved operation characteristic at a lower temperature and also a decreased temperature-dependent of the response speed similar to those in Example 7.

Example 14

A liquid crystal composition K was prepared by mixing the following example compounds in the indicated proportions.

| Structural formula | wt. parts |
|---|---|
| $C_9H_{19}$—(pyrimidine)—(phenyl)—$OC_9H_{19}$ | 6 |
| $C_{10}H_{21}$—(pyrimidine)—(phenyl)—$OC_8H_{17}$ | 6 |
| $C_8H_{17}O$—(phenyl-N)—(phenyl)—$O$(-$CH_2$-)$_5$$\overset{*}{C}H(CH_3)C_2H_5$ | 7 |
| $C_{11}H_{23}O$—(pyrimidine)—(phenyl)—$O$(-$CH_2$-)$_2$$\overset{*}{C}H(CH_3)C_2H_5$ | 14 |
| $C_{10}H_{21}$—(pyridine)—(phenyl)—$C_6H_{13}$ | 8 |
| $C_6H_{13}$—(pyrimidine)—(phenyl)—(phenyl)—$C_4H_9$ | 4 |

-continued
| Structural formula | wt. parts |
|---|---|
| 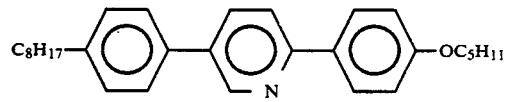 | 2 |
| 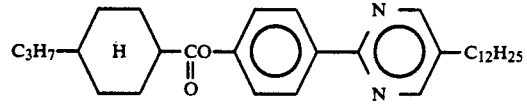 | 10 |
| 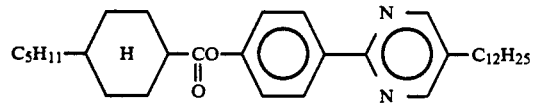 | 5 |
| 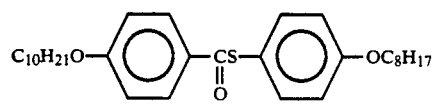 | 10 |
| 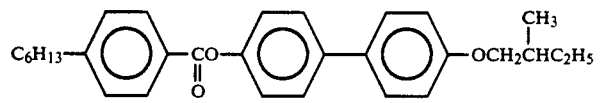 | 7 |
| 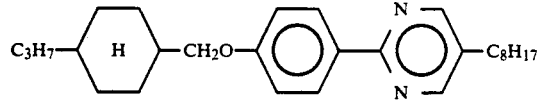 | 7 |
| 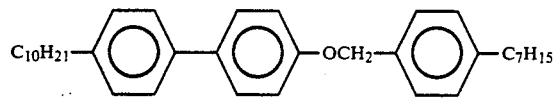 | 5 |
| 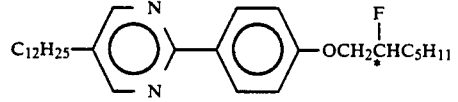 | 2 |
| 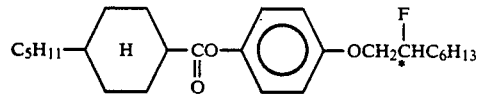 | 2 |
| 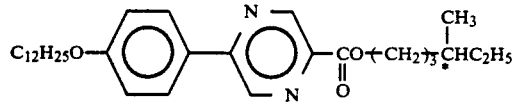 | 2 |
| 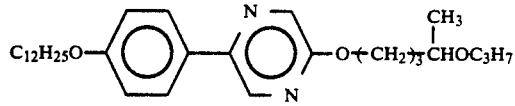 | 3 |
A liquid crystal composition K was further mixed with the following Example Compounds in the proportions indicated below to provide a liquid crystal composition L.

| Ex. Comp. No. | Structural formula | wt. parts |
|---|---|---|
| I-7 | $C_4H_9O$—⟨ ⟩—[S]—⟨ ⟩($F$)—$C_{13}H_{27}$ | 4 |
| I-8 | $C_9H_{17}O$—⟨ ⟩—[S]—⟨ ⟩($F$)—$C_6H_{13}$ | 6 |
| I-93 | $C_8H_{17}$—[S]—⟨ ⟩($F$)—CO—⟨ ⟩($F$) | 2 |
| Composition K | | 88 |

Comparative Example 3

A ferroelectric liquid crystal device was prepared in the same manner as in Example 3 except that the liquid crystal composition K prepared in Example 14 was injected into a cell. The measured values of the response time of the device were as follows:

|  | 10° C. | 25° C. | 40° C. |
|---|---|---|---|
| Response time (μsec) | 668 | 340 | 182 |

Example 15

A liquid crystal composition M was prepared by mixing the following Example Compounds in place of Example Compounds I-7, I-8 and I-93 used in Example 14, in respectively indicated proportions.

| Ex. Comp. No. | Structural formula | wt. parts |
|---|---|---|
| I-118 | $C_8H_{17}$—[S]—⟨ ⟩($F$)—$OCH_2$—⟨H⟩—$C_3H_7$ | 5 |
| I-46 | $C_{10}H_{21}$—[S]—⟨ ⟩($F$)—$OC_8H_{17}$ | 2 |
| I-137 | $C_7H_{15}$—[S]—⟨ ⟩($F$)—⟨ ⟩—$OC_9H_{19}$ | 2 |
| Composition K | | 91 |

A ferroelectric liquid crystal device was prepared in the same manner as in Example 3 except that the liquid crystal composition M was used, and the device was subjected to measurement of optical response time and observation of a switching state, etc. In the liquid crystal device, a monodomain with a good and uniform alignment characteristic was observed.

The following results were obtained.

A ferroelectric liquid crystal device was prepared in the same manner as in Example 3 except that the above liquid crystal composition L was injected into a cell. The measured values of the response time of the device were as follows.

The following results were obtained.

|  | 10° C. | 25° C. | 40° C. |
|---|---|---|---|
| Response time (μsec) | 614 | 329 | 180 |

| | 10° C. | 25° C. | 40° C. |
|---|---|---|---|
| Response time (μsec) | 619 | 323 | 178 |

Example 16

A liquid crystal composition N was prepared by mixing the following Example Compounds in place of Example Compounds I-46, I-118 and I-137 used in Example 15, in respectively indicated proportions.

| Ex. Comp. No. | Structural formula | wt. parts |
|---|---|---|
| I-100 | $C_6H_{13}$—〇—〈S〉—〇—$OC_7H_{15}$ (F) | 3 |
| I-124 | $C_5H_{11}$—〈S〉—〇—$OC_7H_{15}$ (F) | 2 |
| I-139 | $C_8H_{17}$—〈S〉—〇—〈N,N〉—$C_{11}H_{23}$ (F) | 2 |
| Composition K | | 93 |

A ferroelectric liquid crystal device was prepared in the same manner as in Example 3 except that the above liquid crystal composition N was used, and the device was subjected to measurement of optical response time and observation of a switching state, etc.

In the liquid crystal device, a monodomain with a good and uniform alignment characteristic was observed.

| | 10° C. | 25° C. | 40° C. |
|---|---|---|---|
| Response time (μsec) | 562 | 303 | 170 |

Results Of The Invention

As described hereinabove, the present invention, provides a mesomorphic compound which can be used in a liquid crystal composition to attain a good switching characteristic and a decreased temperature dependence of response speed. The present invention also provides a liquid crystal display device and apparatus utilizing the liquid crystal device which show good display characteristics in combination with a light source and a drive circuit.

What is claimed is:

1. A mesomorphic compound represented by the following formula [I]:

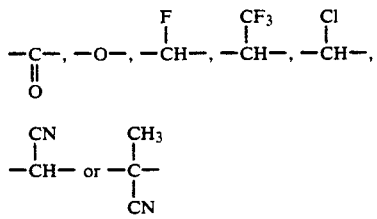

wherein $R^1$ and $R^2$ respectively denote a straight chain or branch chain alkyl group having 1–18 carbon atoms, wherein —$CH_2$— in the alkyl group may be substituted by $$-\overset{F}{\underset{O}{C}}-, -O-, -\overset{F}{\underset{}{CH}}-, -\overset{CF_3}{\underset{}{CH}}-, -\overset{Cl}{\underset{}{CH}}-,$$

$$-\overset{CN}{\underset{}{CH}}- \text{ or } -\overset{CH_3}{\underset{CN}{C}}-$$

on condition that hetero atoms are not adjacent each other, $R^2$ may be hydrogen atom, halogen atom, cyano group and trifluoromethyl group; n is 0 or 1, with the proviso that $A^1$ denotes a single bond,

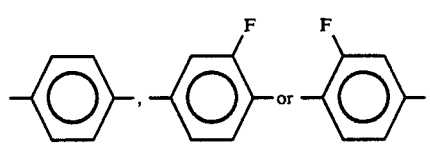

when n is 0, $A^1$ denotes a single bond when n is 1; $A^2$ denotes any one of

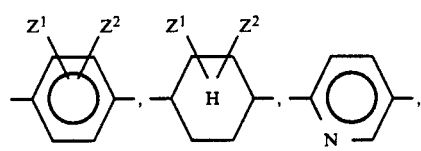

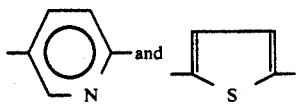 and 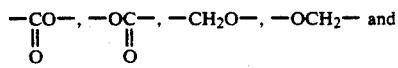

$X^1$, $X^2$, $Z^1$ and $Z^2$ denote independently any one of hydrogen atom, halogen atom, cyano group and trifluoromethyl group, with the proviso that $X^1$, $X^2$, $Z^1$ and $Z^2$ may not all be hydrogen atoms; Y denotes any one of

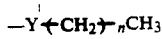

a single bond.

2. A mesomorphic compound according to claim 1, wherein $R^1$ denotes any one of the following groups (i)–(v):

$$-Y\text{\textcent}CH_2\text{\textcent}_nCH_3 \qquad (i)$$

wherein Y denotes any one of a single bond,

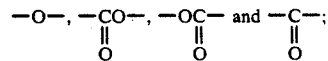

n is an integer of 014 17, preferably 4–16;

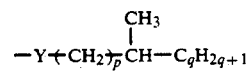 (ii)

(optically active or inactive) wherein Y denotes any one of a single bond,

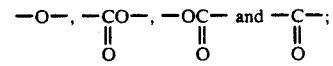

p is an integer of 0–7; q is an integer of 1–10;

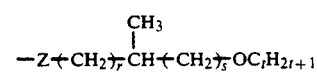 (iii)

(optically active or inactive) wherein Z denotes any one of a single bond,

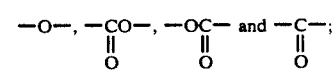

r is an integer of 0–7; s is an integer of 0 or 1; t is an integer of 1–14;

 (iv)

wherein W denotes any one of

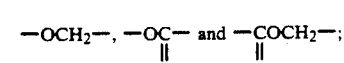

m is an integer of 0–14; and

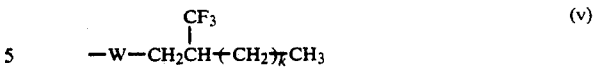 (v)

wherein w denotes any one of

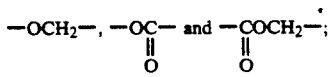

k is an integer of 0–12.

3. A mesomorphic compound according to claim 1 wherein $R^2$ denotes any one of the following groups (i)–(v), hydrogen atom, halogen atom, cyano group and trifluromethyl group:

$$-Y\text{\textcent}CH_2\text{\textcent}_nCH_3 \qquad (i)$$

wherein Y denotes any one of a single bond,

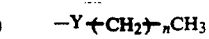

n is an integer of 0–17, preferably 4–16;

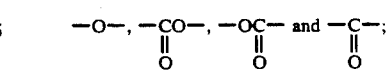 (ii)

wherein Y denotes any one of a single bond,

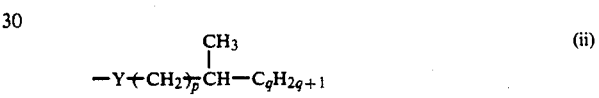

p is an integer of 0–7; q is an integer of 1–10 (optically active or inactive);

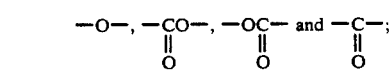 (iii)

wherein Z denotes any one of

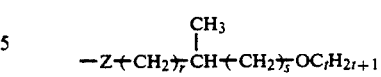

r is an integer of 0–7; s is an integer of 0 or 1; t is an integer of 1–14 (optically active or inactive);

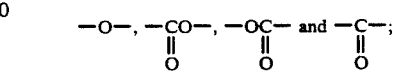 (iv)

wherein W denotes any one of

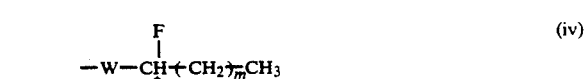

m is an integer of 0–14; and

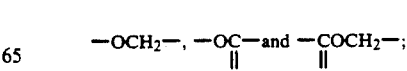

$$-W-CH_2CH(-CH_2-)_k CH_3 \quad \text{with } CF_3 \text{ on } CH$$ (v)

wherein W denotes any one of $$-OCH_2-, \quad -\underset{\underset{O}{\|}}{O}C- \text{ and } -\underset{\underset{O}{\|}}{C}OCH_2-;$$

k is an integer of 0–12.

4. A mesomorphic compound according to claim 1, which is represented by the following Formulae (Ia)–(Id):

(Ia) $R^1-A^3-$[thiophene]$-$[benzene with $X_3, X_4$]$-R^2$ (Ib) $R^1-$[thiophene]$-$[benzene with $X^3, X^4$]$-Y^2-A^2-R^2$ (Ic) $R^1-$[thiophene]$-$[benzene]$-Y^2-A^4-R^2$ (Id) $R^1-$[thiophene]$-$[benzene with $X^3, X^4$]$-R^2$ wherein $R_1$ and $R_2$ respectively denote a straight chain or branch chain alkyl group having 1–18 carbon atoms, wherein $-CH_2-$ in the alkyl group may be substituted by $$-\underset{\underset{O}{\|}}{C}-, \quad -O-, \quad -\underset{\underset{F}{|}}{C}H-, \quad -\underset{\underset{CF_3}{|}}{C}H-, \quad -\underset{\underset{CN}{|}}{C}H-, \quad -\underset{\underset{Cl}{|}}{C}H- \text{ or } -\underset{\underset{CN}{|}}{\overset{\overset{CH_3}{|}}{C}}-$$

on condition that hetero atoms are not adjacent each other, $R^2$ may be hydrogen atom, halogen atom, cyano group and trifluoromethyl group; $A^2$ denotes any one of

[benzene with $Z^1, Z^2$], [cyclohexane with $Z^1, Z^2$, H], [pyridine],

[pyridine] and [thiophene]

$X^1, X^2, Z^1$ and $Z^2$ denote independently any one of hydrogen atom, halogen atom, cyano group and trifluoromethyl group, with the proviso that $X^1, X^2, Z^1$ and $Z^2$ may not all be hydrogen atoms; Y denotes any one of $$-\underset{\underset{O}{\|}}{C}O-, \quad -\underset{\underset{O}{\|}}{O}C-, \quad -CH_2O-, \quad -OCH_2-$$

and a single bond.

$A^3$ denotes

[benzene], [benzene with F], or [benzene with F];

$A^4$ denotes

[benzene with $Z^1, Z^2$], [cyclohexane with $Z^1, Z^2$, H];

$X^3$ and $X^4$ denotes fluorine atom, cyano group, trifluoromethyl group or hydrogen atom, preferably fluorine atom (with the proviso that both $X^3$ and $X^4$ are not hydrogen atoms);

$Y^2$ denotes $$-\underset{\underset{O}{\|}}{O}C-, \quad -OCH_2-$$

or a single bond, preferably $$-\underset{\underset{C}{\|}}{O}C-$$

or a single bond; $Z^3$ and $Z^4$ denote fluorine atom, cyano group, trifluoromethyl group or hydrogen atom, preferably fluorine atom, trifluoromethyl group or hydrogen atom, with the proviso that both $Z^3$ and $Z^4$ are not hydrogen atoms.

5. A mesomorphic compound according to claim 4, wherein $R^1$ denotes any one of the following groups (i)–(v):

$$-Y(-CH_2-)_n CH_3 \quad \text{tm (i)}$$

wherein Y denotes any one of a single bond, $$-O-, \quad -\underset{\underset{O}{\|}}{C}O-, \quad -\underset{\underset{O}{\|}}{O}C- \text{ and } -\underset{\underset{O}{\|}}{C}-;$$

n is an integer of 0–17, preferably 4–16;

$$-Y(-CH_2-)_p\underset{\underset{CH_3}{|}}{C}H-C_q2_{q+1} \quad \text{(ii)}$$

(optically active or inactive) wherein Y denotes any one of a single bond,

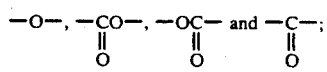

p is an integer of 0–7; q is an integer of 1–10;

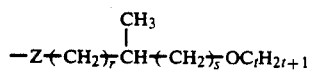

(optically active or inactive) wherein Z denotes any one of a single bond,

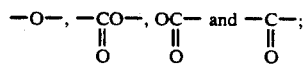

r is an integer of 0–7; s is an integer of 0 or 1; t is an integer of –14;

wherein W denotes any one of

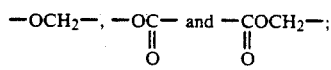

m is an integer of 0–14; and

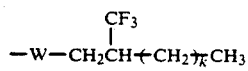

wherein w denotes any one of

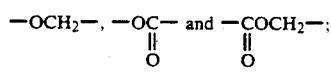

k is an integer of 0–12.

6. A mesomorphic compound according to claim 4, wherein $R^2$ denotes any one of the following groups (i)-(v), hydrogen atom, halogen atom, cyano group and trifluromethyl group:

wherein Y denotes any one of a single bond,

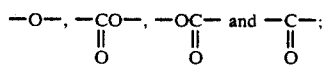

n is an integer of 0–17, preferably 4–16;

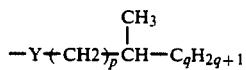

wherein Y denotes any one of a single bond,

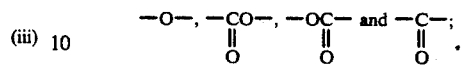

p is an integer of 0–7; q is an integer of 1–10 (optically active or inactive);

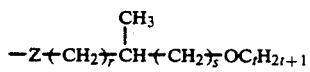

wherein Z denotes any one of

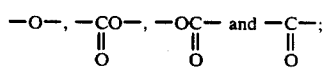

r is an integer of 0–7; s is an integer of 0 or 1; t is an integer of 1–14 (optically active or inactive);

wherein W denotes any one of

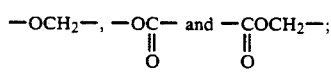

m is an integer of 0–14; and

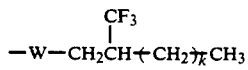

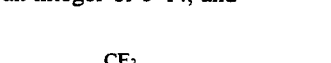

wherein w denotes any one of

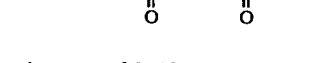

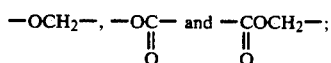

k is an integer of 0–12.

7. A liquid crystal composition comprising 1–80% by a weight of one of a mesomorphic compound of any one of claims 1–6 and a second mesomorphic compound.

8. A liquid crystal composition according to claim 7, which contains 1–60% by weight of the mesomorphic compound.

9. A liquid crystal composition according to claim 8, which contains 1–40% by weight of the mesomorphic compound.

10. A liquid crystal composition according to claim 7, wherein the second mesomorphic compound is selected from the group consisting of the following Formulae (II)–(XI):

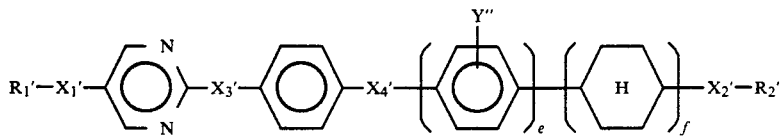

wherein e denotes 0 to 1 and f denotes 0 or 1 with proviso that e+f=0 or 1; Y' denotes H, halogen, CH₃ or CF₃; X₁' and X₂' denote a single bond,

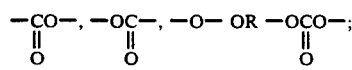

and X₃' and X₄' denote a single bond,

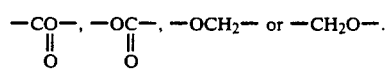

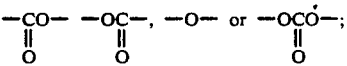

X₃' and X₄' denote a single bond,

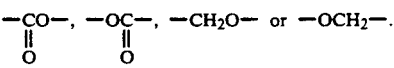

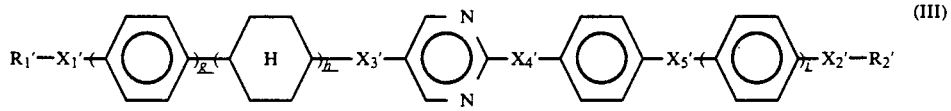

wherein g and h denote 0 or 1 with the proviso that g+h=1; i denotes 0 or 1; X₁' and X₂' denote a single bond,

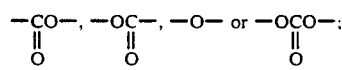

and X₃', X₄', and X₅' denote a single bond,

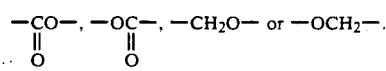

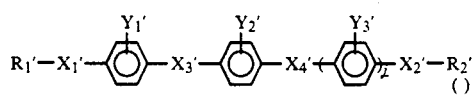

wherein j denotes 0 or 1; Y₁', Y₂', Y₂', and Y₃' denote H, halogen, CH₃ or CF₃; X₁' and X₂' denote a single bond,

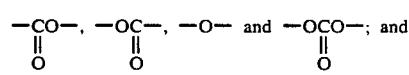

X₃' and X₄' denote a single bond,

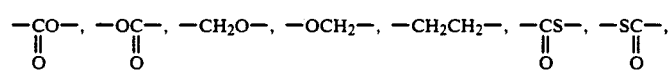

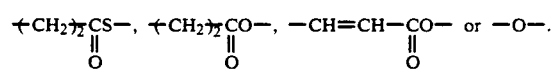

Herein, R₁' and R₂' denote a linear or branched alkyl group having 1-18 carbon atoms capable of including one or two or more non-neighboring methylene groups which can be replaced with —CHX— (wherein X is halogen) and capable of further including one or two or more non-neighboring methylene groups other than those directly connected to X₁' or X₂' which can be replaced with at least one species of

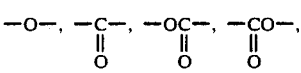

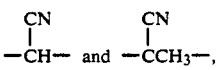

with proviso that R₁' and R₂' do not connect to a ring structure when R₁' and R₂' denote a halogenated alkyl group containing one methylene group replaced with

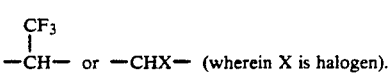

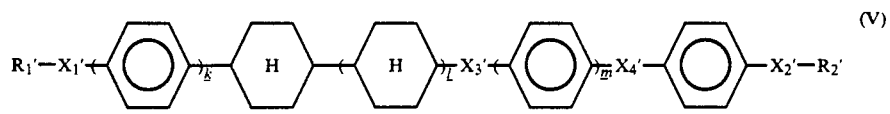

wherein k, l, and m denote 0 or 1 with the proviso that k+l+m=0, 1 or 2; X₁' and X₂' denote a single bond, -continued (VI)

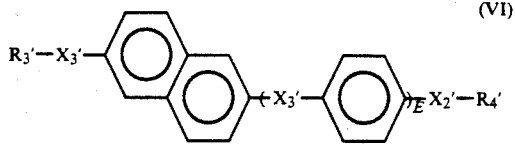

wherein E denotes 0 or 1; $X_2'$ denote a single bond,

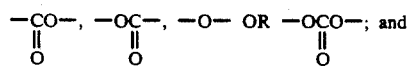

$X_3'$ denotes a single bond,

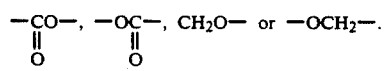

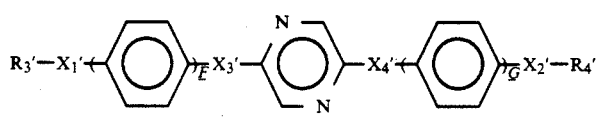

wherein F and G denote 0 or 1; $X_1'$ and $X_2'$ denote a single bond,

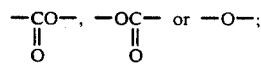

and $X_3'$ and $X_4'$ denote a single bond,

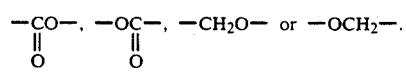

Herein, $R_3'$ and $R_4'$ denote a linear or branched alkyl group having 1-18 carbon atoms capable of including one or two or more non-neighboring methylene groups which can be replaced with —CHX— (wherein X is halogen) and capable of further including one or two or more non-neighboring methylene groups other than those directly connected to $X_1'$ or $X_2'$ which can be replaced with at least one species of

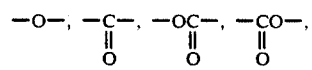

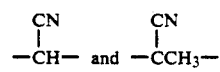

with proviso that $R_3'$ and $R_4'$ do not connect to a ring structure when $R_3'$ and $R_4'$ denote a halogenated alkyl group containing one methylene group replaced with —CHX— (wherein X is halogen).

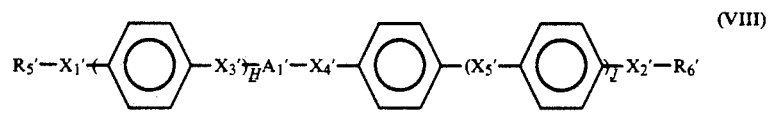

wherein H and J denote 0 or 1 with proviso that H+J=0 or 1; $X_1'$ and $X_2'$ denote a single bond,

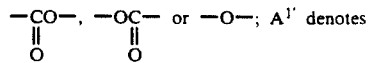

—CO—, —OC—, or —O—; $A_1'$ denotes
 ‖        ‖
 O        O

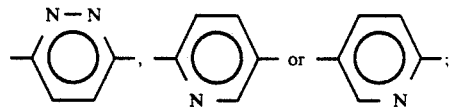

and $X_3'$ and denote a single bond,

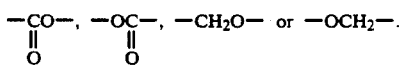

(VII)

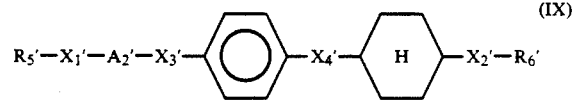

(IX)

wherein $X_1'$ and $X_2'$ denote a single bond,

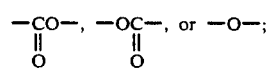

$A_2'$ denotes

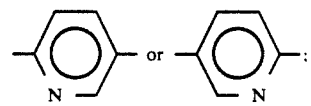

and $X_3'$ and $X_4'$ denote a single bond,

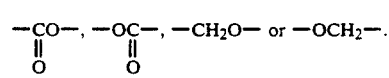

(X)

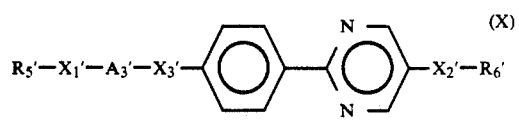

wherein $X_1'$ and $X_2'$ denote a single bond, (VIII)

—CO—, —OC—, or —O—;
 ‖        ‖
 O        O

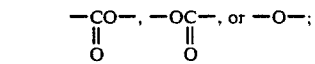

$A_3'$ denotes

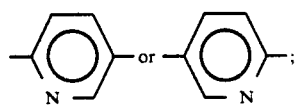

and X₃' denotes a single bond,

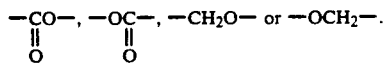

X₃' denotes a single bond,

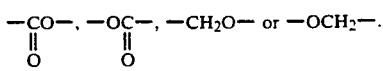

Herein, R₅' and R₆' denote a linear or branched alkyl group having 1-18 carbon atoms capable of including one or two more non-neighboring methylene groups

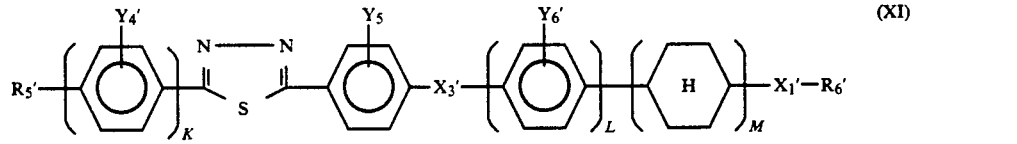

wherein K, L and M independently denote 0 or 1 with proviso that K+L+M=0 or 1; Y₄', Y₅' and Y₆' denote H or F; X₁' denotes a single bond,

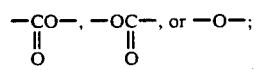

other than those directly connected to X₁' or X₂' which can be replaced with at least one species of

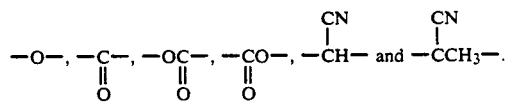

11. A liquid crystal composition according to claim 8, wherein the second mesomorphic compound is selected from the group consisting of the following Formulae (IIa-d), (IIIa-c), (IVa,b) (Va-f), (VIa,b), (VIIa,b), (VIIIa-c), (IXa,b), (Xa-g) and (XIa-d):

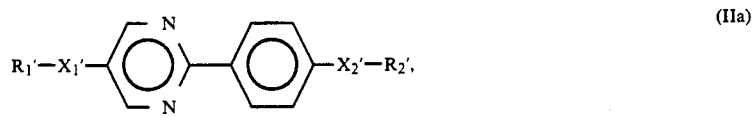

(IIa)

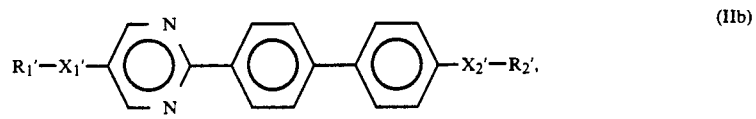

(IIb)

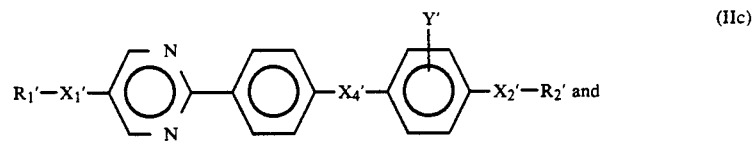

(IIc)

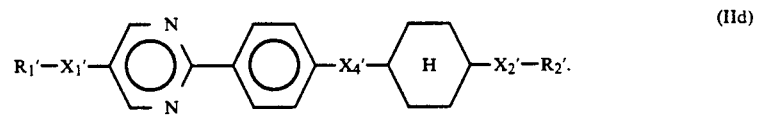

(IId)

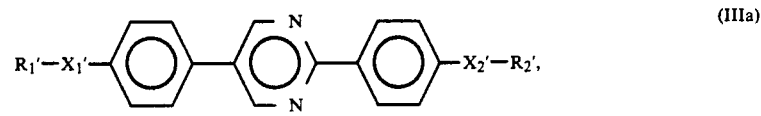

(IIIa)

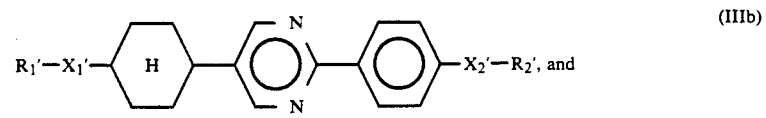

(IIIb)

-continued
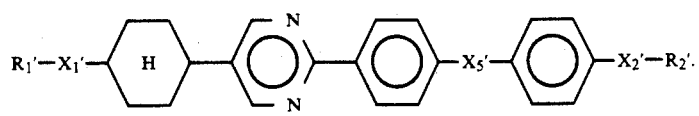 (IIIc)
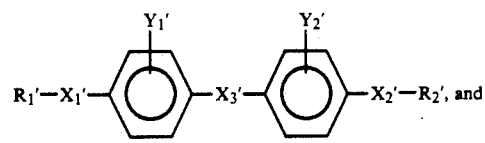 (IVa)
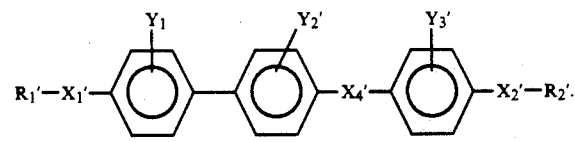 (IVb)
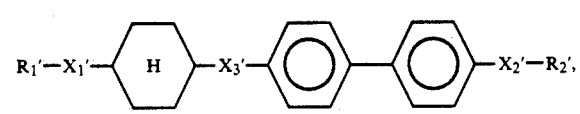 (Va)
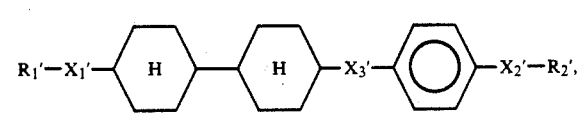 (Vb)
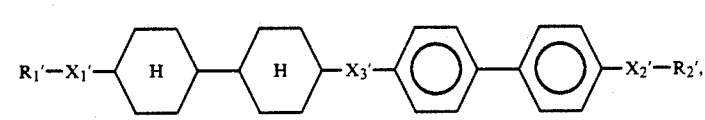 (Vc)
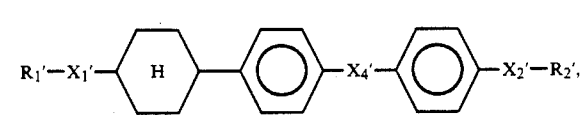 (Vd)
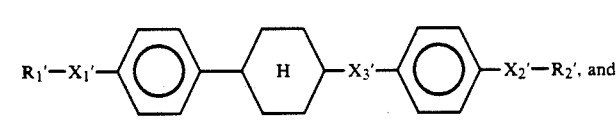 (Ve)
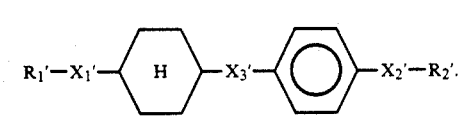 (Vf)
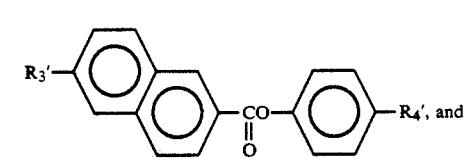 (VIa)
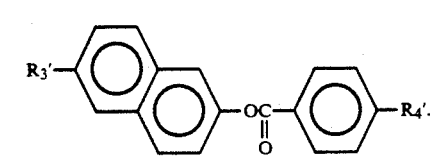 (VIb)
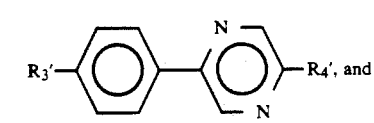 (VIIa)

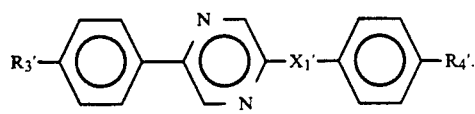 (VIIb)
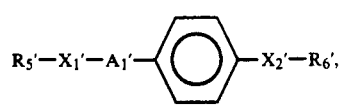 (VIIIa)
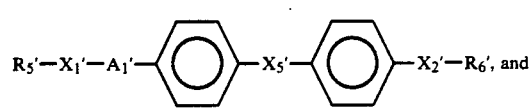 (VIIIb)
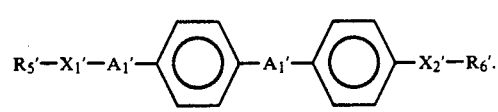 (VIIIc)
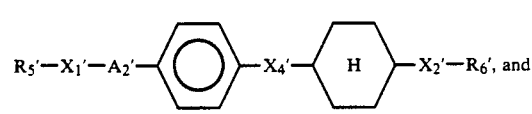 (IXa)
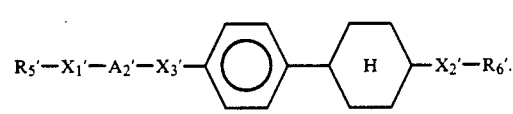 (IXb)
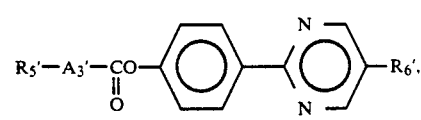 (Xa)
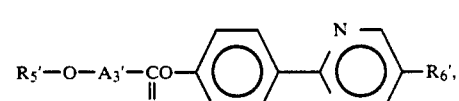 (Xb)
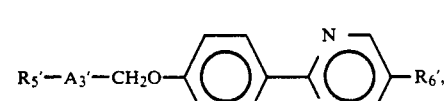 (Xc)
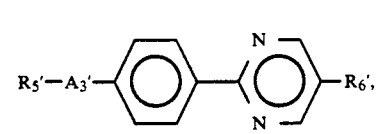 (Xd)
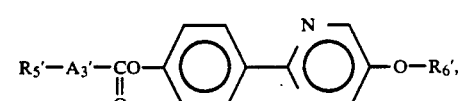 (Xe)
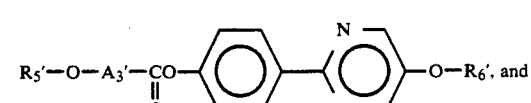 (Xf)
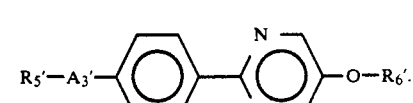 (Xg)

-continued

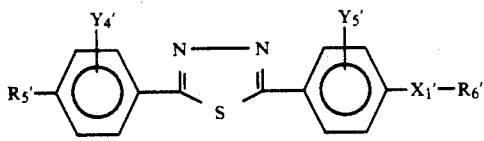
(XIa)

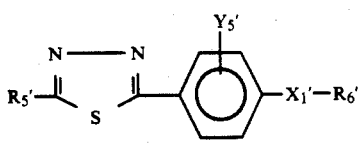
(XIb)

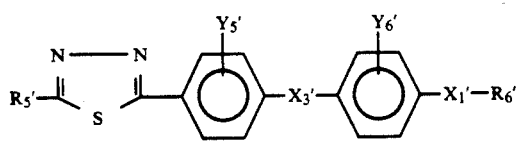
(XIc)

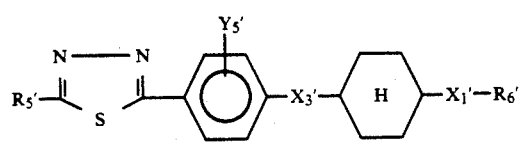
(XId)

12. A liquid crystal composition according to claim 11, wherein (a) $R_1'$ and $R_2'$ denote any one of the following groups (i)–(ix), (b) $R_3'$ and $R_4'$ denote any one of the following groups (i)–(v), (viii) or (ix) and (c) $R_4'$ and $R_6'$ denote any one of the following groups (i)–(iii), (v), (viii) or (ix):

i) a linear alkyl group having 1–15 carbon atoms:

ii)

(optically active or inactive); wherein p denotes an integer of 0–5 and q denotes an integer of 1–11;

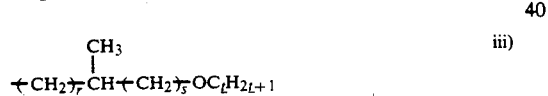
iii)

(optically active or inactive); wherein r denotes an integer of 0–6, s denotes 0 or 1, and t denotes an integer of 1–14;

iv)

wherein u denotes 0 or 1 and v denotes an integer of 1–16;

(v)

(optically active or inactive) wherein w denotes an integer of 1–15;

vi)

wherein X denotes an integer of 0–2 and y denotes an integer of 1–15;

vii)

wherein z denotes an integer of 1–15;

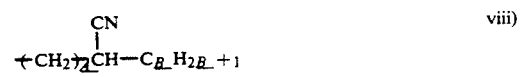
viii)

(optically active or inactive); wherein A denotes an integer of 0–2 and B denotes an integer of 1–15; and

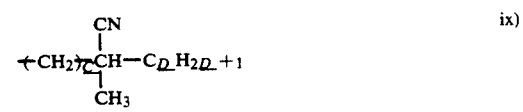
ix)

(optically active or inactive); wherein C denotes an integer of 0–2 and D denotes an integer of 1–15.

13. A liquid crystal composition according to claim 9, wherein the second mesomorphic compound is selected from the group consisting of the following Formulae (IIaa-dc), (IIIaa-cb), (IVaa-bf), (Vaa-fa), (VIIaa-bb), (VIIIaa-cc), (IXaa-bb), (XIaa-db):

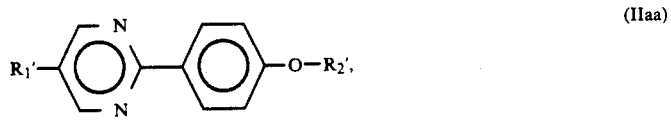
(IIaa)

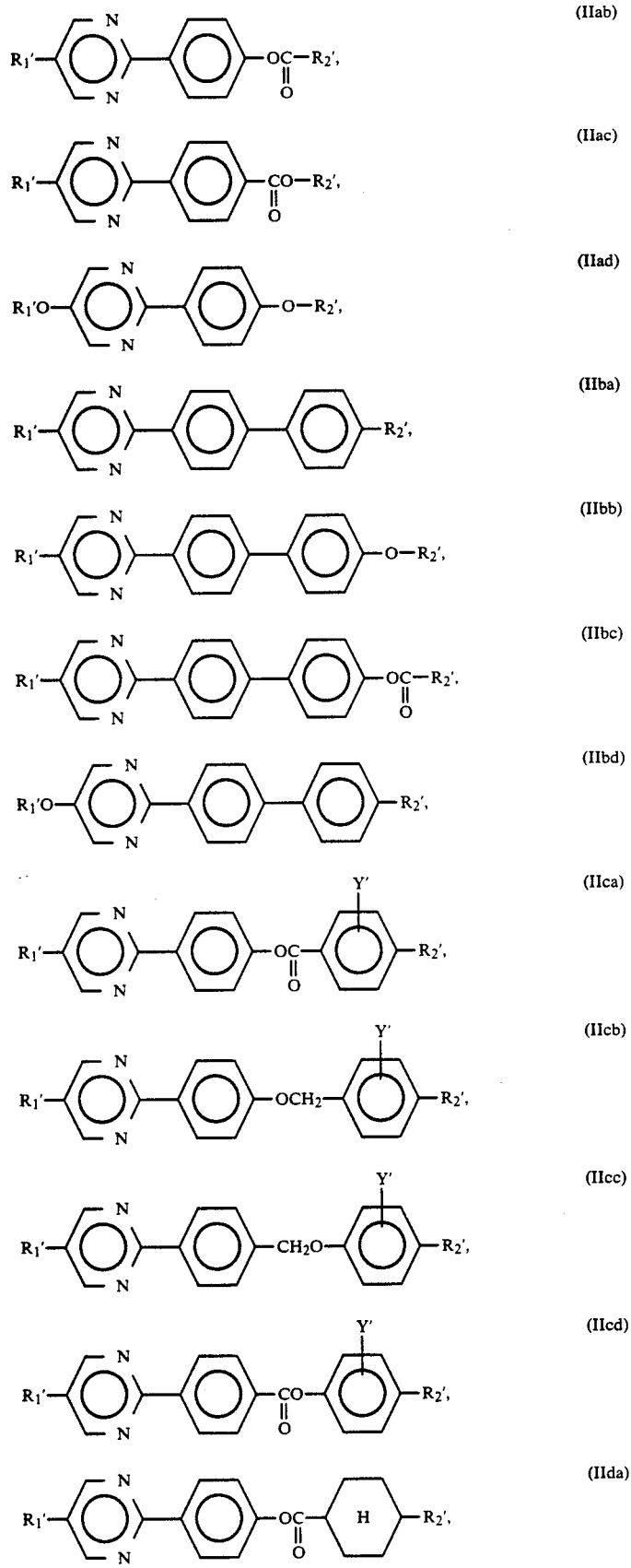

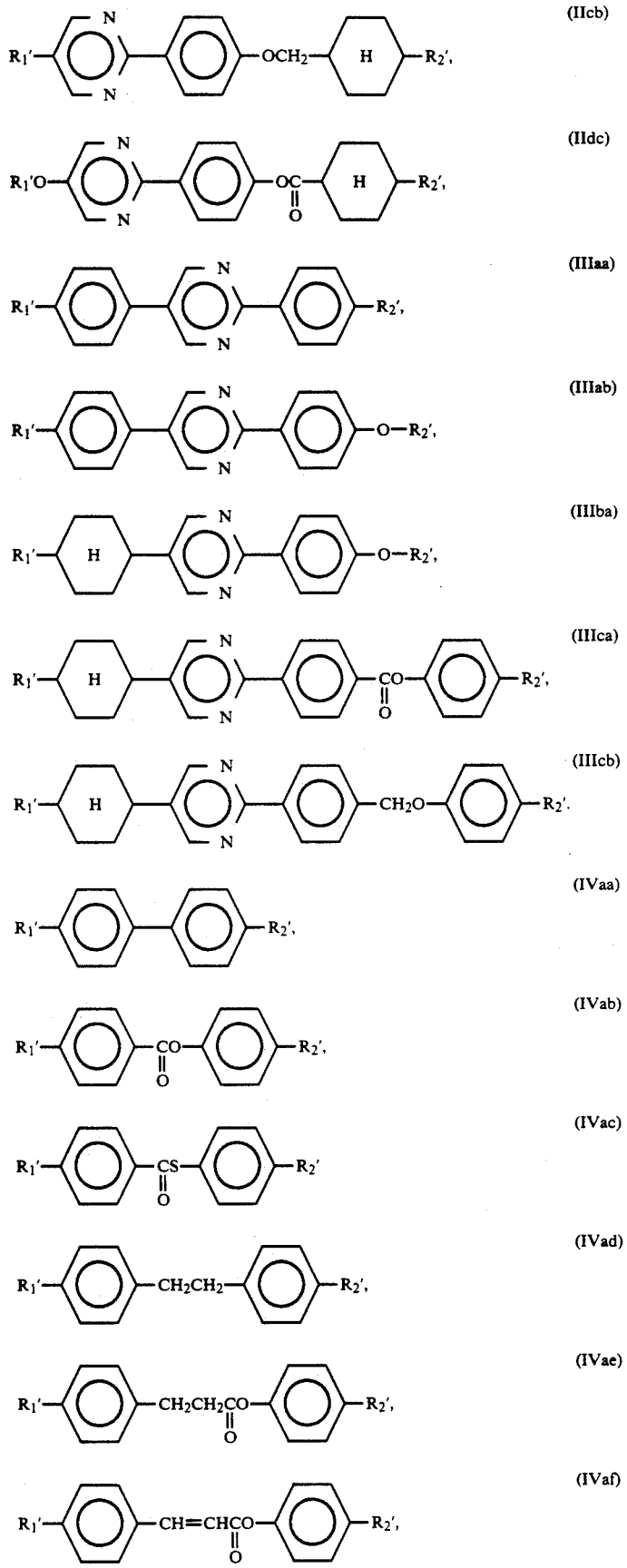

-continued
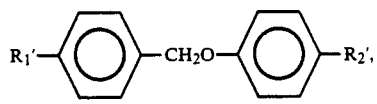 (IVag)
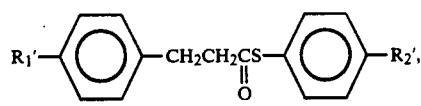 (IVah)
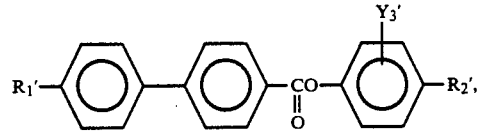 (IVba)
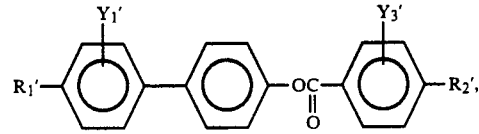 (IVbb)
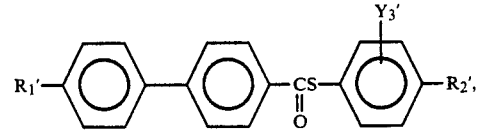 (IVbc)
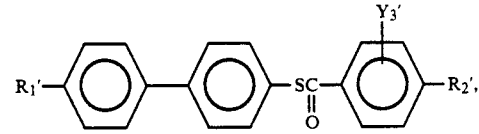 (IVbd)
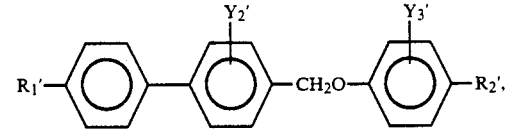 (IVbe)
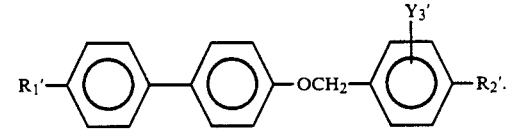 (IVbf)
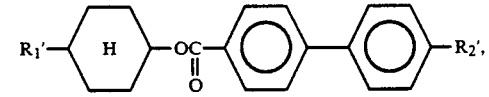 (Vaa)
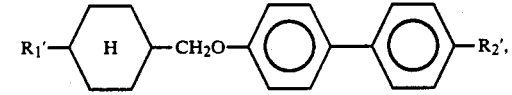 (Vab)
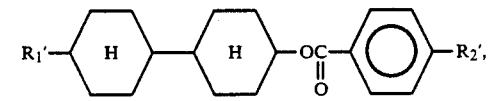 (Vba)
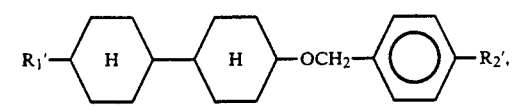 (Vbb)

-continued
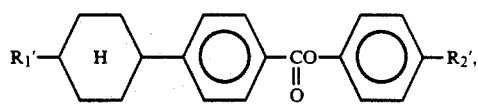
(Vda)
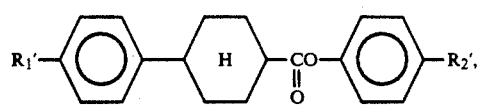
(Vea)
and
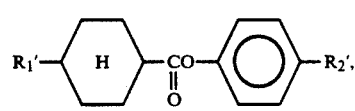
(Vfa)
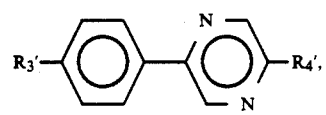
(VIIaa)
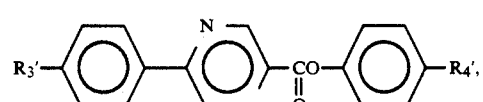
(VIIba)
and
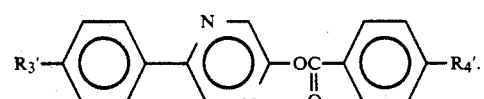
(VIIbb)
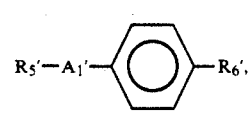
(VIIIaa)
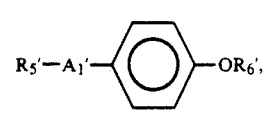
(VIIIab)
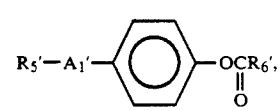
(VIIIac)
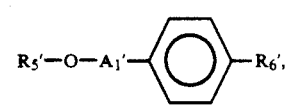
(VIIIad)
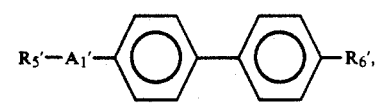
(VIIIba)
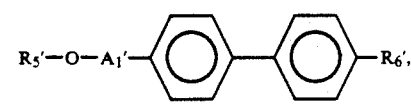
(VIIIbb)
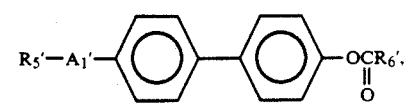
(VIIIbc)

-continued
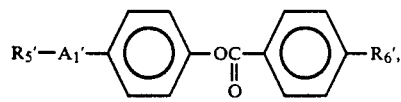 (VIIIbd)
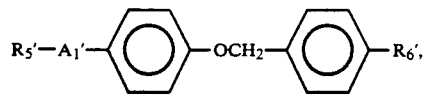 (VIIIbe)
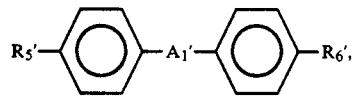 (VIIIca)
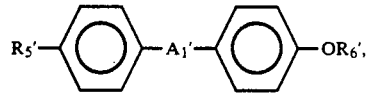 (VIIIcb)
and
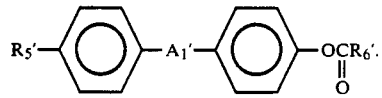 (VIIIcc)
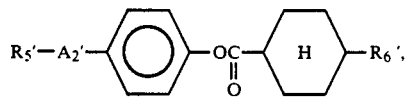 (IXaa)
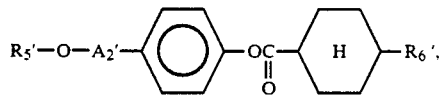 (IXab)
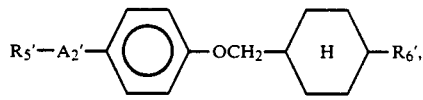 (IXac)
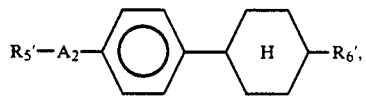 (IXba)
and
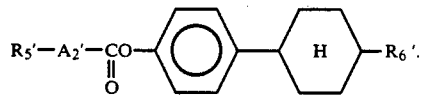 (IXbb)
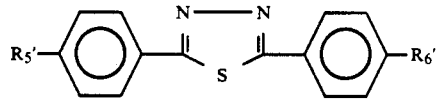 (XIaa)
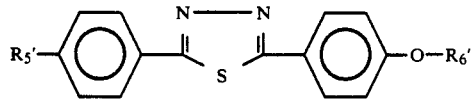 (XIab)
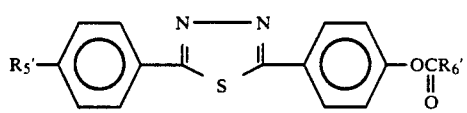 (XIac)

-continued

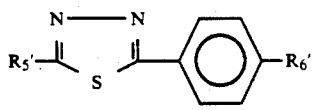
(XIba)

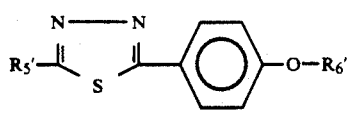
(XIbb)

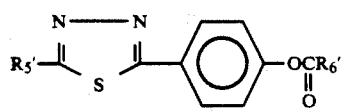
(XIbc)

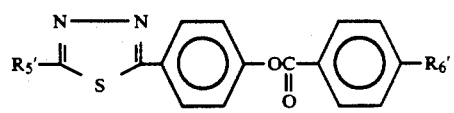
(XIca)

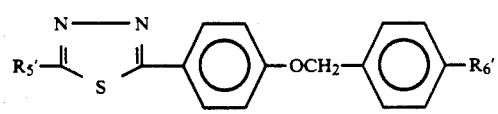
(XIcb)

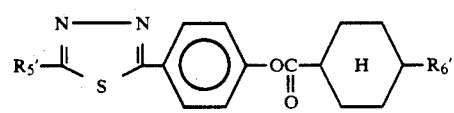
(XIda)

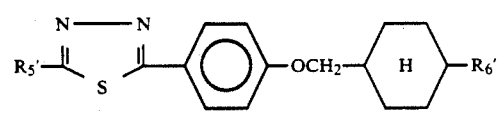
(XIdb)

14. A cell comprising a pair of base plates having opposed electrodes and a mesomorphic compound according to any one of claims 1-6 disposed therebetween.

15. A liquid crystal device comprising a cell of claim 14 and an alignment control layer.

16. A liquid crystal apparatus comprising a device of claim 15 and a circuit for driving a liquid crystal.

17. A cell comprising a pair of base plates having opposed electrodes and a liquid crystal composition according to claim 7 disposed therebetween.

18. A cell according to claim 17, wherein the composition contains 1-60% by weight of the mesomorphic compound.

19. A cell according to claim 18, wherein the composition contains 1-40% by weight of the mesomorphic compound.

20. A cell according to claim 18, wherein the second mesomorphic compound is selected from the group consisting of the following Formulae (II)-(XI):

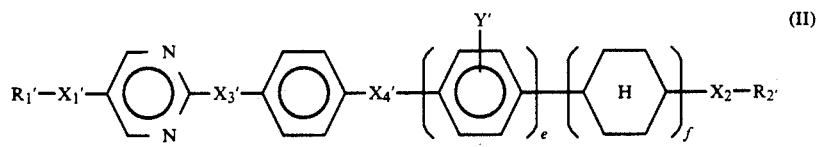
(II)

wherein e denotes 0 to 1 and f denotes 0 or 1 with proviso that e+f=0 or 1; Y' denotes H, halogen, CH$_3$ or CF$_3$; X$_1$' and X$_2$' denote a single bond,

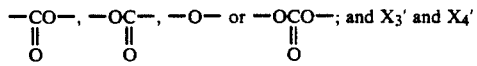

denote a single bond,

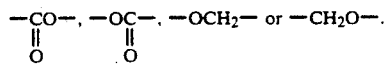

-continued

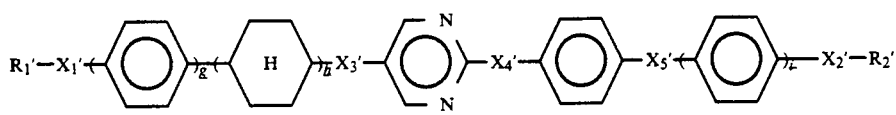

wherein g and h denote 0 or 1 with the proviso that g+h=1; i denotes 0 or 1; $X_1'$ and $X_2'$ denote a single bond,

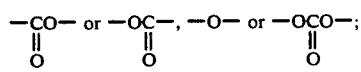

and $X_3'$, $X_4'$, and $X_5'$ denote a single bond,

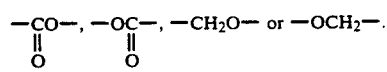

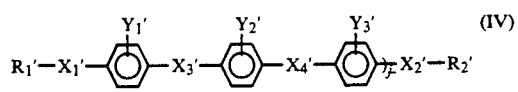

wherein j denotes 0 or 1; $Y_1'$, $Y_2'$, $Y_2'$, and $Y_3'$ denote H, halogen, $CH_3$ or $CF_3$; $X_1'$ and $X_2'$ denote a single bond, $$-\underset{\underset{O}{\|}}{C}O-, -O\underset{\underset{O}{\|}}{C}-, -O- \text{ and } -O\underset{\underset{O}{\|}}{C}O-;\text{ and}$$

$X_3'$ and $X_4'$ denote a single bond, $$-\underset{\underset{O}{\|}}{C}O-, -O\underset{\underset{O}{\|}}{C}-, -CH_2O-, -OCH_2-, -CH_2CH_2-,$$

$$-\underset{\underset{O}{\|}}{C}S-, -S\underset{\underset{O}{\|}}{C}-, -(\text{CH}_2)_2\underset{\underset{O}{\|}}{C}S-, -(\text{CH}_2)_2\underset{\underset{O}{\|}}{C}O-, -CH=CH-\underset{\underset{O}{\|}}{C}O- \text{ or } -O-.$$

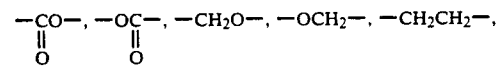

wherein k, l, and m denote 0 or 1 with the proviso that k+l+m=0, 1 or 2; $X_1'$ and $X_2'$ denote a single bond, $$-\underset{\underset{O}{\|}}{C}O-, -O\underset{\underset{O}{\|}}{C}-, -O- \text{ or } -O\underset{\underset{O}{\|}}{C}O-;$$

$X_3'$ and $X_4'$ denote a single bond, $$-\underset{\underset{O}{\|}}{C}O-, -O\underset{\underset{O}{\|}}{C}-, -CH_2O- \text{ or } -OCH_2-.$$

Herein, $R_1'$ and $R_2'$ denote a linear or branched alkyl group having 1-18 carbon atoms capable of including one or two or more non-neighboring methylene groups which can be replaced with —CHX— (wherein X is halogen) and capable of further including one or two or more non-neighboring methylene groups other than those directly connected to $X_1'$ or $X_2'$ which can be replaced with at least one species of $$-O-, -\underset{\underset{O}{\|}}{C}-, -O\underset{\underset{O}{\|}}{C}-, -\underset{\underset{O}{\|}}{C}O-, -\underset{\underset{CN}{|}}{C}H- \text{ and } -\underset{\underset{CN}{|}}{C}CH_3-,$$

with proviso that $R_1'$ and $R_2'$ do not connect to a ring structure when $R_1'$ and $R_2'$ denote a halogenated alkyl group containing one methylene group replaced with $$-\underset{\underset{CF_3}{|}}{C}H- \text{ or } -CHX- \text{ (wherein X is halogen)}.$$

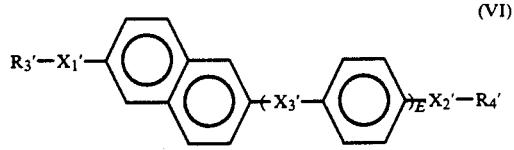

wherein E denotes 0 or 1; $X_2'$ denote a single bond, $$-\underset{\underset{O}{\|}}{C}O-, -O\underset{\underset{O}{\|}}{C}-, -O- \text{ OR } -O\underset{\underset{O}{\|}}{C}O-;\text{ and}$$

$X_3'$ denotes a single bond, $$-\underset{\underset{O}{\|}}{C}O-, -O\underset{\underset{O}{\|}}{C}-, CH_2O- \text{ or } -OCH_2-.$$

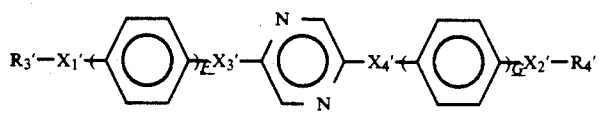
(VII)

wherein F and G denote 0 or 1; $X_1'$ and $X_2'$ denote a single bond,

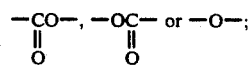

and $X_3'$ and $X_4'$ denote a single bond,

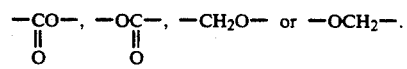

Herein, $R_3'$ and $R_4'$ denote a linear or branched alkyl group having 1–18 carbon atoms capable of including one or two or more non-neighboring methylene groups which can be replaced with —CHX— (wherein X is halogen) and capable of further including one or two or more non-neighboring methylene groups other than those directly connected to $X_1'$ or $X_2'$ which can be replaced with at least one species of

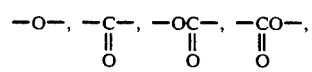

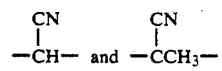

with proviso that $R_3'$ and $R_4'$ do not connect to a ring structure when $R_3'$ and $R_4'$ denote a halogenated alkyl group containing one methylene group replaced with —CHX— (wherein X is halogen).

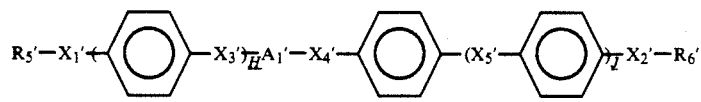
(VIII)

wherein H and J denote 0 or 1 with proviso that H+J=0 or 1; $X_1'$ and $X_2'$ denote a single bond,

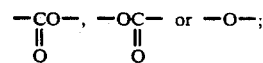

$A_1'$ denotes

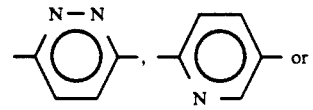

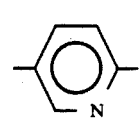

and $X_3'$ denote a single bond,

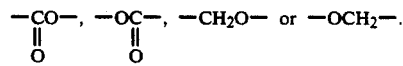

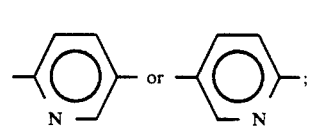
(IX)

wherein $X_1'$ and $X_2'$ denote a single bond,

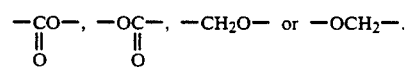

$A_2'$ denotes;

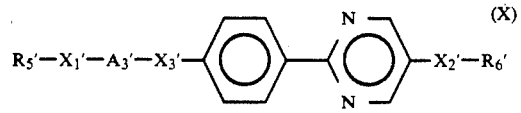

and $X_3'$ and $X_4'$ denote a single bond,

—CO—, —OC—, —CH$_2$O— or —OCH$_2$—.
   ‖        ‖
   O        O

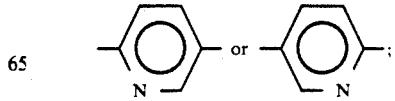
(X)

wherein $X_1'$ and $X_2'$ denote a single bond,

—CO—, —OC—, or —O—; $A_3'$ denotes
   ‖        ‖
   O        O and $X_3'$ denotes a single bond, —CO—, —OC—, —CH₂O— or —OCH₂—.
          ‖           ‖
          O           O

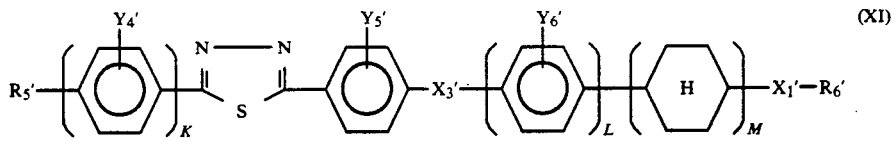

wherein K, L and M independently denote 0 or 1 with proviso that K+L+M=0 or 1; $Y_4'$, $Y_5'$ and $Y_6'$ denote H or F; $X_1'$ denotes a single bond, —CO—, —OC—, or —O—;
  ‖       ‖
  O       O $X_3'$ denotes a single bond, —CO—, —OC—, —CH₂O— or —OCH₂—.
  ‖       ‖
  O       O Herein, $R_5'$ and $R_6'$ denote a linear or branched alkyl group having 1-18 carbon atoms capable of including one or two more non-neighboring methylene groups other than those directly connected to $X_1'$ or $X_2'$ which can be replaced with at least one species of $$-O-, -\underset{\underset{O}{\|}}{C}-, -O\underset{\underset{O}{\|}}{C}-, -\underset{\underset{O}{\|}}{C}O-, -\underset{CH}{\overset{CN}{|}}- \text{ and } -\underset{CCH_3}{\overset{CN}{|}}-$$

21. A cell according to claim 19, wherein the second mesomorphic compound is selected from the group consisting of the following Formulae (IIa-d), (IIIa-c), (IVa,b) (Va-f), (VIa,b), (VIIa,b), (VIIIa-c), (IXa,b), (Xa-g) and (XIa-d):

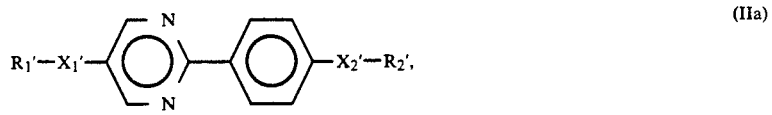 (IIa)

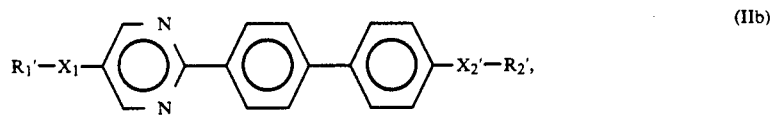 (IIb)

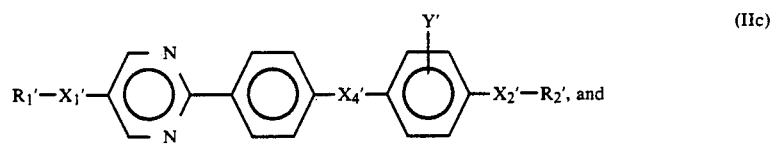 (IIc)

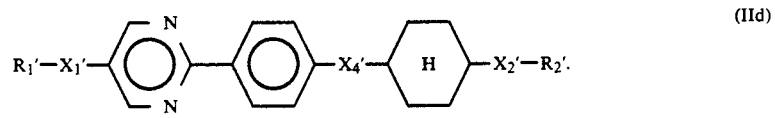 (IId)

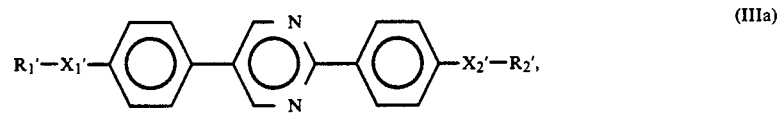 (IIIa)

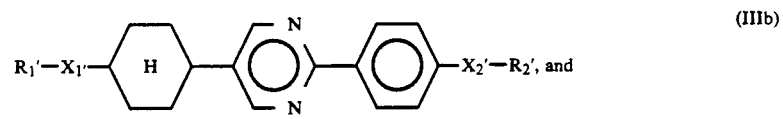 (IIIb)

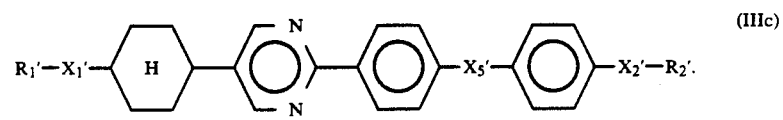 (IIIc)

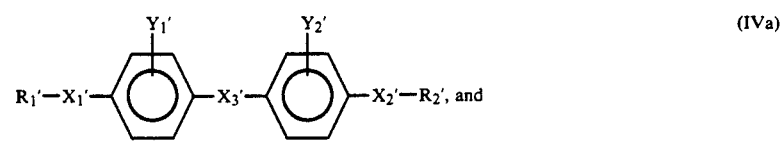 (IVa)

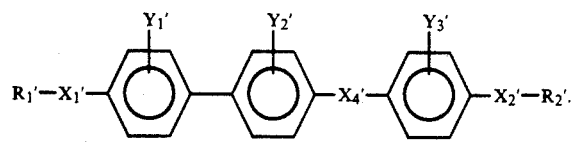 (IVb)
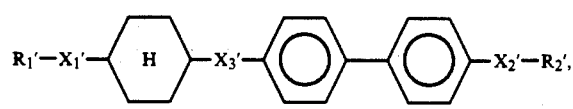 (Va)
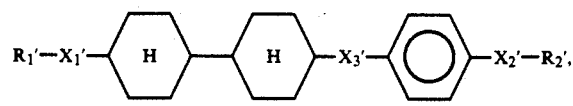 (Vb)
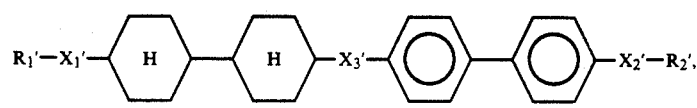 (Vc)
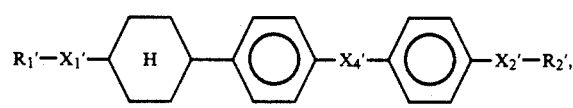 (Vd)
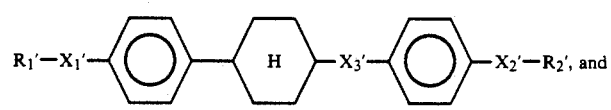 (Ve)
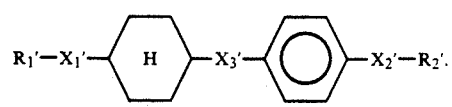 (Vf)
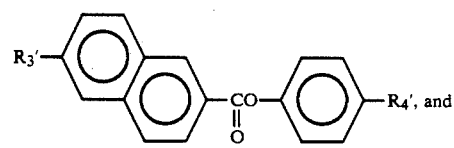 (VIa)
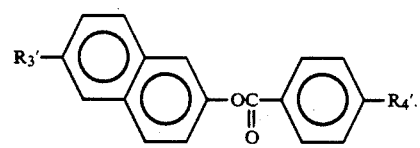 (VIb)
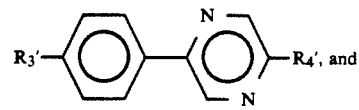 (VIIa)
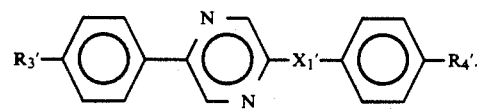 (VIIb)
 (VIIIa)

-continued
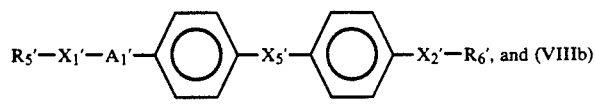 (VIIIb)
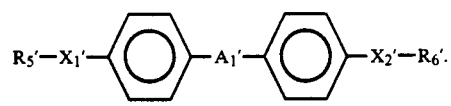 (VIIIc)
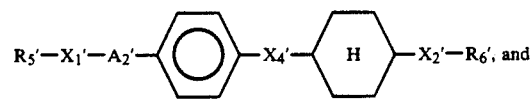 (IXa)
 (IXb)
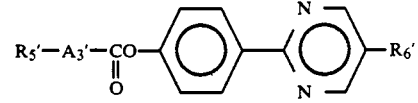 (Xa)
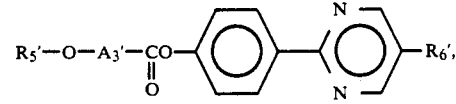 (Xb)
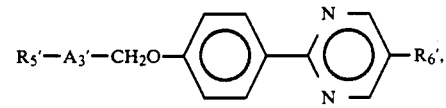 (Xc)
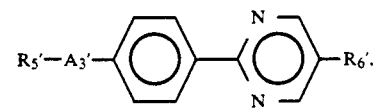 (Xd)
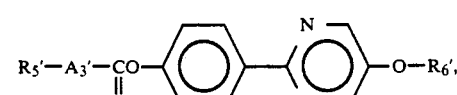 (Xe)
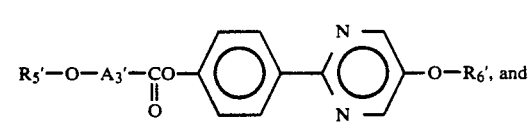 (Xf)
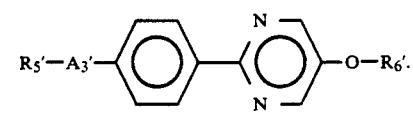 (Xg)
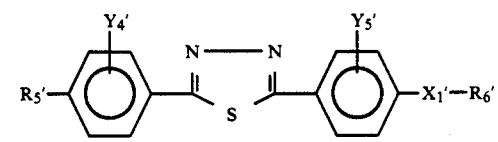 (XIa)
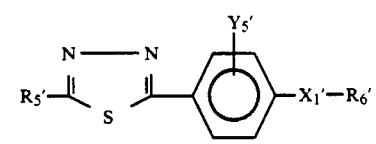 (XIb)

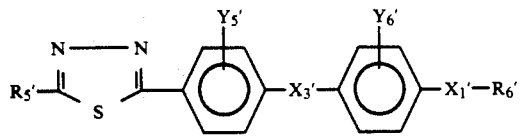
(XIc)
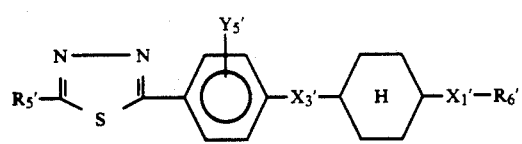
(XId)
22. A cell according to claim 19, wherein the second mesomorphic compound is selected from the group consisting of the following Formulae (IIaa-dc), (IIIaa-cb), (IVaa-bf), (Vaa-fa), (VIIaa-bb), (VIIIaa-cc), (IXaa-bb), (XIaa-db):
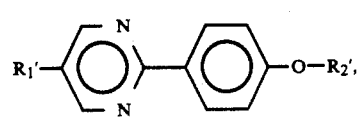
(IIaa)
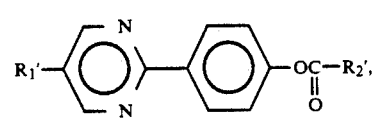
(IIab)
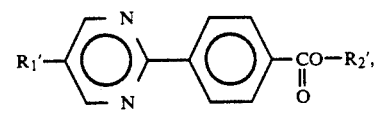
(IIac)
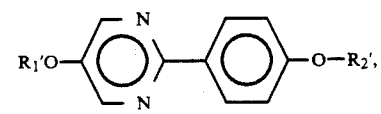
(IIad)
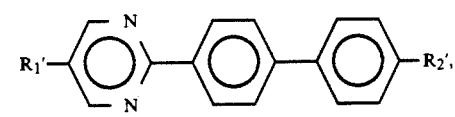
(IIba)
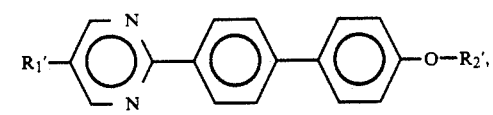
(IIbb)
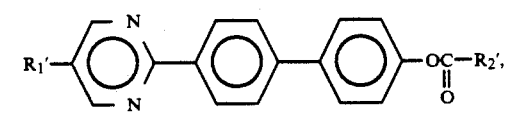
(IIbc)
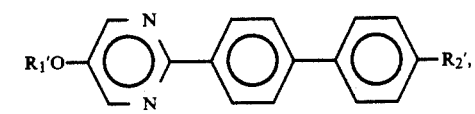
(IIbd)
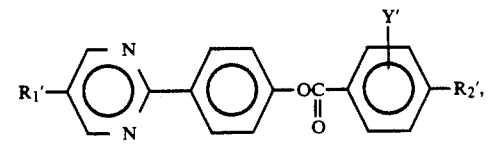
(IIca)

-continued
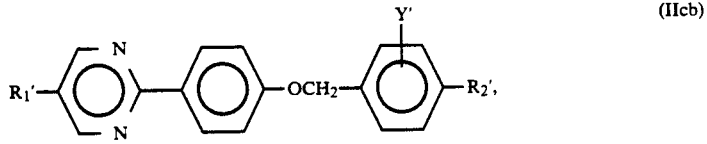 (IIcb)
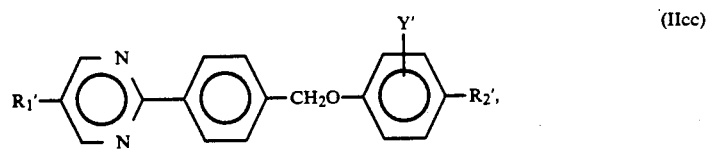 (IIcc)
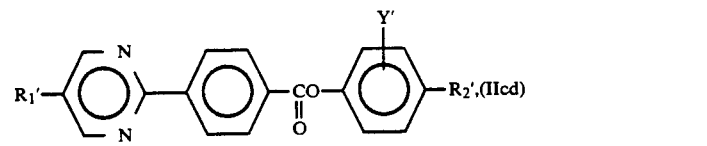 (IIcd)
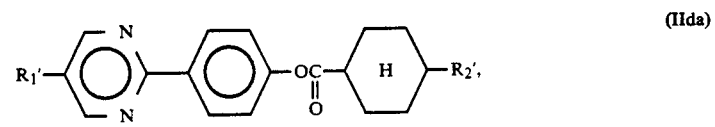 (IIda)
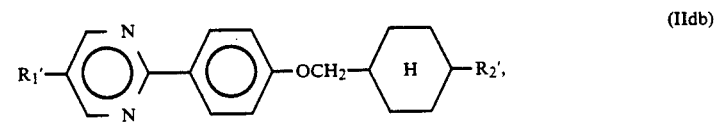 (IIdb)
and
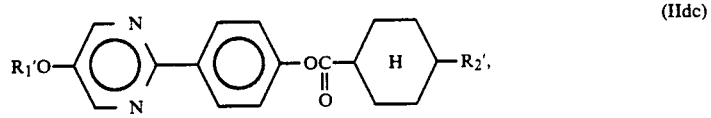 (IIdc)
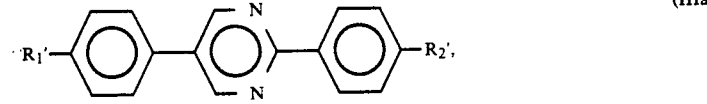 (IIIaa)
 (IIIab)
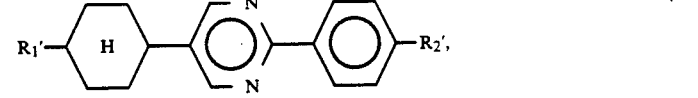 (IIIba)
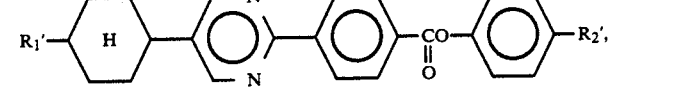 (IIIca)
and
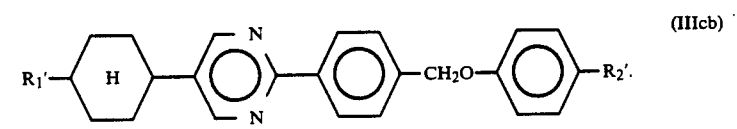 (IIIcb)
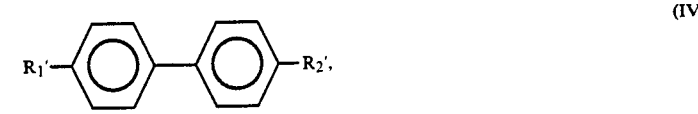 (IVaa)

-continued
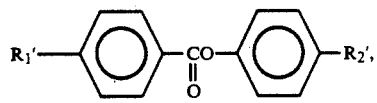 (IVab)
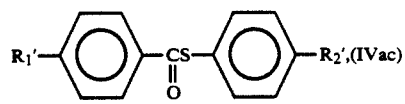 (IVac)
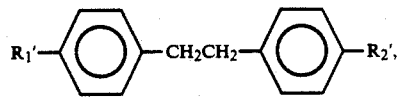 (IVad)
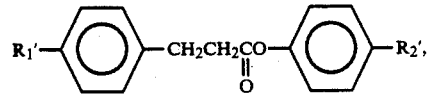 (IVae)
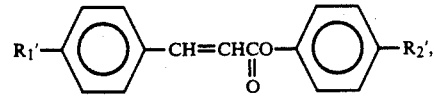 (IVaf)
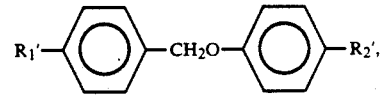 (IVag)
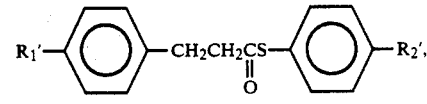 (IVah)
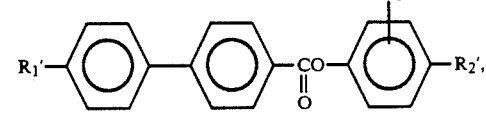 (IVba)
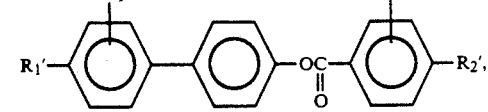 (IVbb)
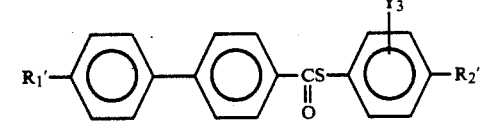 (IVbc)
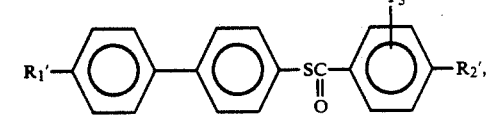 (IVbd)
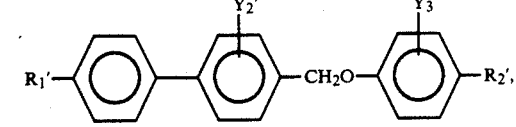 (IVbe)

-continued
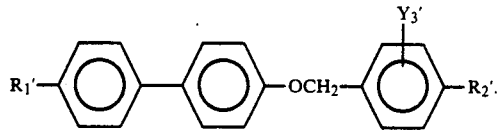 (IVbf)
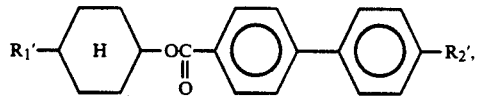 (Vaa)
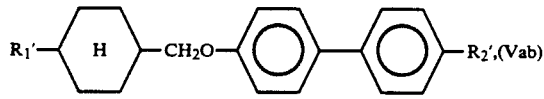 (Vab)
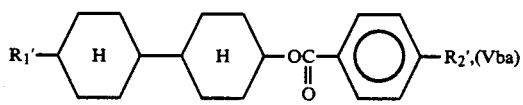 (Vba)
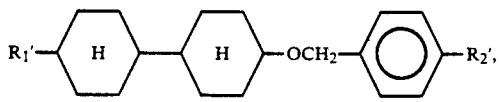 (Vbb)
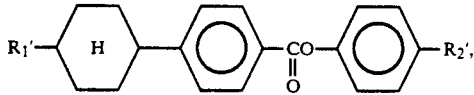 (Vda)
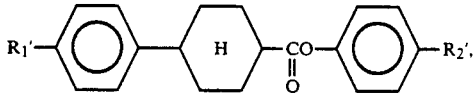 (Vea)
and
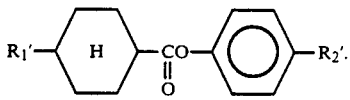 (Vfa)
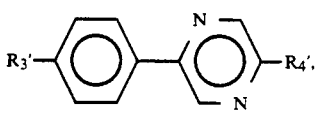 (VIIaa)
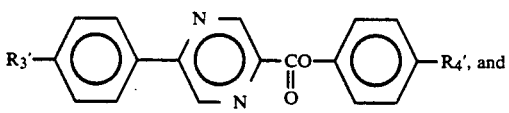 (VIIba)
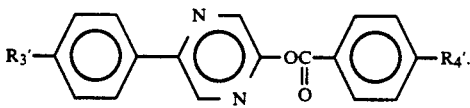 (VIIbb)
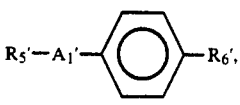 (VIIIaa)
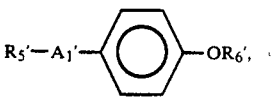 (VIIIab)

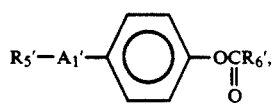 (VIIIac)
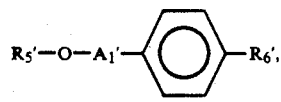 (VIIIad)
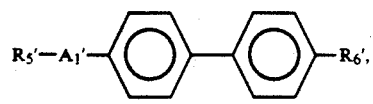 (VIIIba)
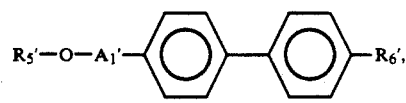 (VIIIbb)
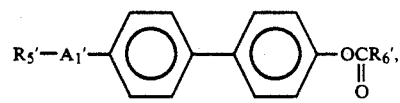 (VIIIbc)
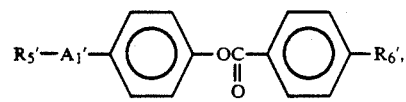 (VIIIbd)
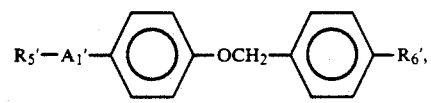 (VIIIbe)
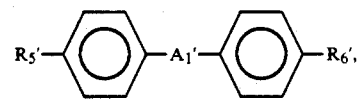 (VIIIca)
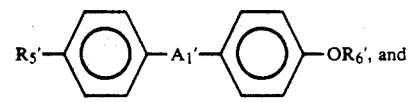 (VIIIcb)
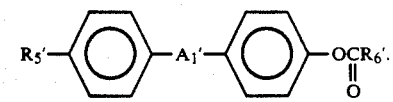 (VIIIcc)
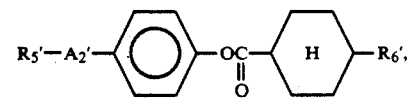 (IXaa)
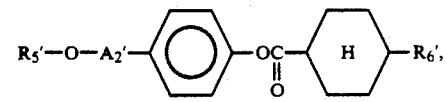 (IXab)
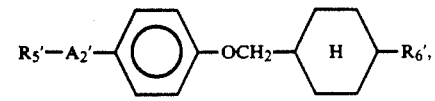 (IXac)
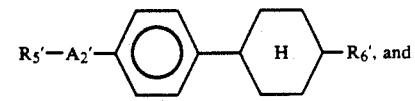 (IXba)

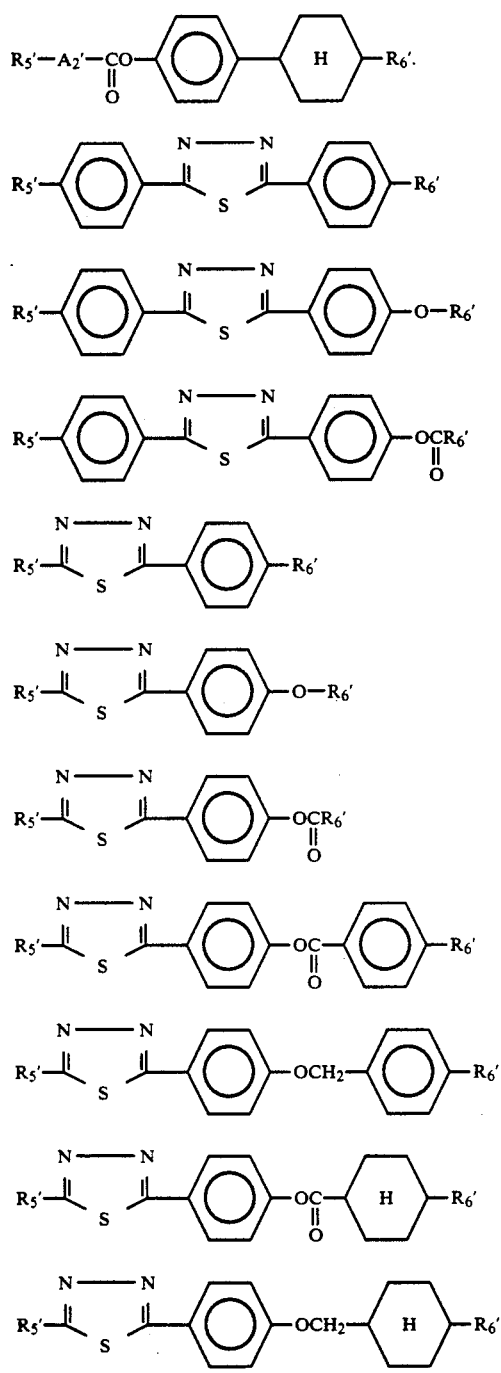
23. A liquid crystal device comprising a cell of claim 17 and an alignment control layer.
24. A liquid crystal apparatus comprising a device of claim 23 and a circuit for driving a liquid crystal.
* * * * *

UNITED STATES PATENT AND TRADEMARK OFFICE
CERTIFICATE OF CORRECTION

PATENT NO. : 5,244,595
DATED : September 14, 1993
INVENTOR(S) : YOKO YAMADA, ET AL.

Page 1 of 12

It is certified that error appears in the above-identified patent and that said Letters Patent is hereby corrected as shown below:

ON TITLE PAGE

In [56] References Cited, under FOREIGN PATENT DOCUMENTS:
"2255635  10/1990  Japan" should read
--2-255635  10/1990  Japan--.

In [57] Abstract:
Line 1, "1." should be deleted.
Line 2, "8 I]:" should read --[I]:--.
Line 16, "be all" should read --all be--.

COLUMN 1

Line 56, "pants." should read --points.--.
Line 68, "bistabile," should read --bistable,--.

COLUMN 2

Line 20, "filed" should read --field--.

COLUMN 5

Line 33, "--CO--" should read -- --CO--, --OC-- --.
              ‖                        ‖       ‖
              O                        O       O

COLUMN 6

Line 35, "  " should read -- 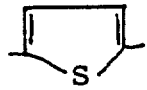 ;--.

UNITED STATES PATENT AND TRADEMARK OFFICE
CERTIFICATE OF CORRECTION

PATENT NO. : 5,244,595
DATED : September 14, 1993
INVENTOR(S) : YOKO YAMADA, ET AL.

It is certified that error appears in the above-identified patent and that said Letters Patent is hereby corrected as shown below:

COLUMN 6

Line 38, "denotes" should read --denote--.

COLUMN 7

Line 19, "  " should read --  --.

Line 55, " " should read -- --.

COLUMN 33

Formula (I-5), "(I-5)" should read --(I-125)--.
Formula (I-6), "(I-6)" should read --(I-126)--.
Formula (I-7), "(I-7)" should read --(I-127)--.
Formula (I-8), "(I-8)" should read --(I-128)--.
Formula (I-9), "(I-9)" should read --(I-129)--.
Formula (I-31), "(I-31)" should read --(I-131)--.
Formula (I-2), "(I-2)" should read --(I-132)--.
Formula (I-3), "(I-3)" should read --(I-133)--.
Formula (I-4), "(I-4)" should read --(I-134)--.

COLUMN 35

Formula (I-5), "(I-5)" should read --(I-135)--.
Formula (I-6), "(I-6)" should read --(I-136)--.
Formula (I-7), "(I-7)" should read --(I-137)--.
Formula (I-8), "(I-8)" should read --(I-138)--.
Formula (I-9), "(I-9)" should read --(I-139)--.

--

UNITED STATES PATENT AND TRADEMARK OFFICE
CERTIFICATE OF CORRECTION

PATENT NO. : 5,244,595
DATED : September 14, 1993
INVENTOR(S) : YOKO YAMADA, ET AL.

It is certified that error appears in the above-identified patent and that said Letters Patent is hereby corrected as shown below:

COLUMN 37

Formula (IIb), "$R_1'-X_1$" should read --$R_1' - X_1'$--.

COLUMN 39

Line 1, "denotes" (second occurrence) should read --denote--.

COLUMN 40

Line 12, "R2'" should read --$R_2'$--.

COLUMN 41

Line 67, "0-15;" should read --1-15;--.

COLUMN 42

Line 8, "1-15" should read --1-15.--.

COLUMN 44

Formula (IIIc), "(IIIc)" should read --(VIIIc)--.

COLUMN 46

Line 34, "and" should read --to--.

COLUMN 51

Formula (IVaf), "$R_1$" should read --$R_1'$--.

UNITED STATES PATENT AND TRADEMARK OFFICE
CERTIFICATE OF CORRECTION

PATENT NO. : 5,244,595
DATED : September 14, 1993
INVENTOR(S) : YOKO YAMADA, ET AL.

It is certified that error appears in the above-identified patent and that said Letters Patent is hereby corrected as shown below:

COLUMN 55

Line 51, "substrate" should read --substrates--.
Line 68, "E.g.," should read --e.g.,--.

COLUMN 56

Line 40, "cations" should read --cation--.
Line 59, "change." should read --changed.--.

COLUMN 58

Line 24, "CHCOH" should read --CHCOH,--.

COLUMN 60

Line 21, "following" should read --followed--.
Line 31, "49%." should read --49%).--.
Lines 37 to 68 should be deleted.

COLUMN 61

Lines 1 to 5 should be deleted.

UNITED STATES PATENT AND TRADEMARK OFFICE
CERTIFICATE OF CORRECTION

PATENT NO. : 5,244,595
DATED : September 14, 1993
INVENTOR(S) : YOKO YAMADA, ET AL.

It is certified that error appears in the above-identified patent and that said Letters Patent is hereby corrected as shown below:

COLUMNS 61-62

Lines 38-45, ""

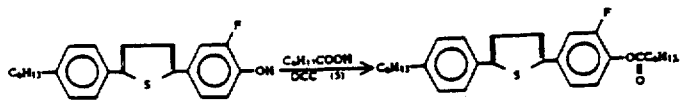

should read

--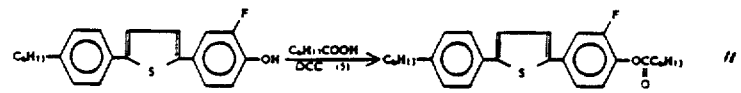

Production of  Step 1) to 4)

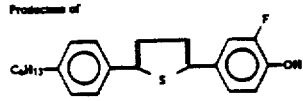

The above compound was synthesized in the same manner as Step (1) to (4) in Example 1.

Production of  Step 5)

0.71 g (2.0 × 10$^{-3}$ mol) of

0.26 g (2.0 × 10$^{-3}$ mol) of heptanoic acid, 0.42 g of N,N'-dicyclohexylcarbodiimide and 40 mg of 4-pyrrolidinopyridine were dissolved in 20 ml of dichloromethane, followed by reaction under stirring for a day at room temperature. An unsolved material was filtered off, followed by distilling-off of the solvent, purification by silica gel column chromatography (eluent:hexane/toluene=1/1) and recrystallization from a mixture solvent of methanol and toluene to obtain 0.32 g of an objective product (Yield: 34%).

Phase Transition Temperature (°C)

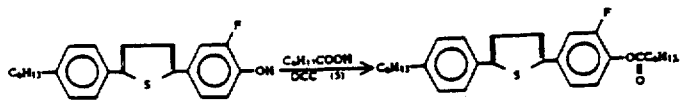 --.

UNITED STATES PATENT AND TRADEMARK OFFICE
CERTIFICATE OF CORRECTION

PATENT NO. : 5,244,595
DATED : September 14, 1993
INVENTOR(S) : YOKO YAMADA, ET AL.

It is certified that error appears in the above-identified patent and that said Letters Patent is hereby corrected as shown below:

COLUMN 67

Line 53, "as" should read --were as--.

COLUMN 68

Line 52, "composition E" should read --composition F--.

COLUMN 76

Line 21, "butane bromide" should read --decane iodide--.

COLUMN 77

Line 17, "dimethylacetomaide" should read --dimethylacetoamide--.

COLUMN 78

TABLE 1-continued, "S3 $\xleftrightarrow{130}$ $S_A$" should read --"S3 $\longleftrightarrow$ $S_A$--.

COLUMN 81

Line 27, "above" should be deleted.

COLUMN 83

Line 48, "served." should read --served. ¶ The results of the measurement are shown below.--.

UNITED STATES PATENT AND TRADEMARK OFFICE
CERTIFICATE OF CORRECTION

PATENT NO. : 5,244,595
DATED : September 14, 1993
INVENTOR(S) : YOKO YAMADA, ET AL.

It is certified that error appears in the above-identified patent and that said Letters Patent is hereby corrected as shown below:

COLUMN 85

Line 30, "014 17," should read --0-17,--.

COLUMN 86

Line 7, "w" should read --W--.
Line 18, "trifluromethyl" should read --trifluoromethyl--.

COLUMN 87

Line 39, "$R_1$ and $R_2$" should read --$R^1$ and $R^2$--.

COLUMN 88

Line 7, "." should read --;--.
Line 53, "$-Y \!-\!\!\left(CH_2\right)_n\!CH_3 tm(i)$" should read
-- $-Y \!-\!\!\left(CH_2\right)_n\!CH_3 \quad (i)$--.
Line 65, "$C_{q2q+1}$" should read --$C_qH_{q+1}$--.

COLUMN 89

Line 23, "-14;" should read --1-14;--.
Line 44, "w" should read --W--.
Line 56, "trifluromethyl" should read --trifluoromethyl--.

COLUMN 90

Line 4, "$\left(CH2\right)_p$" should read --$\left(CH_2\right)_p$--.
Line 46, "w" should read --W--.
Line 55, "a" (first occurrence) should be deleted.

UNITED STATES PATENT AND TRADEMARK OFFICE
CERTIFICATE OF CORRECTION

PATENT NO. : 5,244,595
DATED : September 14, 1993
INVENTOR(S) : YOKO YAMADA, ET AL.

It is certified that error appears in the above-identified patent and that said Letters Patent is hereby corrected as shown below:

COLUMN 91

Line 2, "Y"" should read --Y'--.
Line 17, "." should read --;--.
Line 37, "." should read --;--.
Line 42, "$R_2$'" should read --$R_2$'--.
       ( )
Line 58, "." should read --;--.

COLUMN 92

Line 16, "." should read --;--.
Line 29, "Herein" should read --herein--.
Line 50, "." should read --;--.

COLUMN 93

Line 9, "denote" should read --denotes--.
Line 11, "OR" should read --or--.
Line 17, "." should read --;--.
Line 35, "." should read --;--.
Line 38, "Herein" should read --herein-- and
         "R4'" should read --$R_4$'--.
Line 57, "." should read --;--.

COLUMN 94

Line 2, "$A^{1\prime}$" should read --$A_1$'--.
Line 12, "." should read --;--.
Line 47, "." should read --;--.

UNITED STATES PATENT AND TRADEMARK OFFICE
CERTIFICATE OF CORRECTION

PATENT NO. : 5,244,595
DATED : September 14, 1993
INVENTOR(S) : YOKO YAMADA, ET AL.

It is certified that error appears in the above-identified patent and that said Letters Patent is hereby corrected as shown below:

COLUMN 95

Line 10, "." should read --;--.
Formula (XI), "$Y_5$" should read --$Y_5'$--.

COLUMN 96

Line 1, "." should read --;--.
Line 6, "Herein" should read --herein--.
Line 8, "two" should read --two or--.

COLUMN 97

Formula (IVb), "$Y_1$" should read --$Y_1'$--.

COLUMN 99

Formula (VIIc), "$R_5' - X_1' - A_1' -\bigcirc- A_1' -\bigcirc- X_2' - R_6'$ ."

should read --$R_5' - X_1' -\bigcirc- A_1' -\bigcirc- X_2' - R_6'$ .--.

COLUMN 101

Line 28, "$R_4'$" should read --$R_5'$--.

COLUMN 102

Line 30, "$\begin{array}{c}CF_3\\|\\H\end{array}$" should read --$\begin{array}{c}CF_3\\|\\CH\end{array}$--.

Line 33, "X" should read --x--.

UNITED STATES PATENT AND TRADEMARK OFFICE
CERTIFICATE OF CORRECTION

PATENT NO. : 5,244,595
DATED : September 14, 1993
INVENTOR(S) : YOKO YAMADA, ET AL.

It is certified that error appears in the above-identified patent and that said Letters Patent is hereby corrected as shown below:

COLUMN 105

Formula (IIcb), "(IIcb)" should read --(IIdb)--.
Formula (IIIba), "—O—$R_2'$," should read -- —$R_2'$,--.

COLUMN 107

Formula (IVbc), "(IVbc)" should read --(IVbe)--.

COLUMN 113

Line 62, "—CO—, —OC—, —$OCH_2$— or —$CH_2O$—," should be deleted.
            ‖        ‖
            O        O

COLUMN 114

Line 47, "$X_2$ should read --$X_2'$--.
Line 62, insert: -- —CO—, —OC—, —$OCH_2$— or —$CH_2O$—,--.
                       ‖       ‖
                       O       O

COLUMN 115

Formula (IV), " 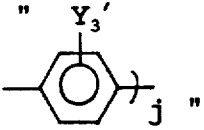 should read 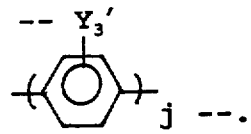 --.

Line 26, "$Y_2'$," (second occurrence) should be deleted.
Line 56, "$X_3'$" should read --and $X_3'$--.

UNITED STATES PATENT AND TRADEMARK OFFICE
CERTIFICATE OF CORRECTION

PATENT NO. : 5,244,595
DATED : September 14, 1993
INVENTOR(S) : YOKO YAMADA, ET AL.

It is certified that error appears in the above-identified patent and that said Letters Patent is hereby corrected as shown below:

COLUMN 116

Line 13, "R2'" should read --$R_2'$--.
Line 56, "$X_2'$" should read --$X_1'$ and $X_2'$--.

COLUMN 117

Line 21, "R4'" should read --$R_4'$--.
Line 57, "$A^{1\prime}$" should read --$A_1'$--.

Line 65, "$\underset{N}{\rangle}$" should read --$\underset{N}{\rangle}$;--.

COLUMN 118

Line 25, "denotes;" should read --denotes--.

COLUMN 120

Formula (IIb), "$R_1'-X_1$" should read --$R_1'-X_1'$--.

COLUMN 123

Formula (VIIIb), "and (VIIIb)" should read
          --and                    (VIIIb)--.

COLUMN 127

Formula (IIcd), "$R_2'$,(IIcd)" should read
          --$R_2'$,                  (IIcd)--.
Formula (IIdc), "$R_2'$," should read --$R_2'$.--.

UNITED STATES PATENT AND TRADEMARK OFFICE
CERTIFICATE OF CORRECTION

PATENT NO. : 5,244,595
DATED : September 14, 1993
INVENTOR(S) : YOKO YAMADA, ET AL.

It is certified that error appears in the above-identified patent and that said Letters Patent is hereby corrected as shown below:

COLUMN 129

Formula (IVac), "$R_2'$, (IVac)" should read --$R_2'$, (IVac)--.

COLUMN 131

Formula (Vab), "$R_2'$, (Vab)" should read --$R_2'$, (Vab)--.
Formula (Vba), "$R_2'$, (Vba)" should read --$R_2'$, (Vba)--.

COLUMN 133

Formula (VIIIbc), "(VIIIbc)" (second occurrence) should read --(VIIIbe)--.

Signed and Sealed this

Eleventh Day of October, 1994

Attest:

BRUCE LEHMAN

*Attesting Officer*    *Commissioner of Patents and Trademarks*